United States Patent
Kawabe et al.

(10) Patent No.: US 10,972,718 B2
(45) Date of Patent: Apr. 6, 2021

(54) IMAGE GENERATION APPARATUS, IMAGE GENERATION METHOD, DATA STRUCTURE, AND PROGRAM

(71) Applicant: NIPPON TELEGRAPH AND TELEPHONE CORPORATION, Chiyoda-ku (JP)

(72) Inventors: Takahiro Kawabe, Atsugi (JP); Taiki Fukiage, Atsugi (JP); Shinya Nishida, Atsugi (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 120 days.

(21) Appl. No.: 16/332,265

(22) PCT Filed: Sep. 5, 2017

(86) PCT No.: PCT/JP2017/032597
§ 371 (c)(1),
(2) Date: Mar. 11, 2019

(87) PCT Pub. No.: WO2018/056086
PCT Pub. Date: Mar. 29, 2018

(65) Prior Publication Data
US 2019/0208186 A1    Jul. 4, 2019

(30) Foreign Application Priority Data

Sep. 23, 2016  (JP) .............................. JP2016-185084
Apr. 28, 2017  (JP) .............................. JP2017-089681

(51) Int. Cl.
*G06K 9/00*     (2006.01)
*H04N 13/31*    (2018.01)
(Continued)

(52) U.S. Cl.
CPC ............. *H04N 13/31* (2018.05); *G06T 7/593* (2017.01); *H04N 13/268* (2018.05);
(Continued)

(58) Field of Classification Search
CPC ..................... G06T 7/593; G06T 2207/10012
See application file for complete search history.

(56) References Cited

U.S. PATENT DOCUMENTS 5,682,437 A  * 10/1997  Okino ................ H04N 13/128
                                              382/100
5,784,097 A  *  7/1998  Iinuma .................... G06T 15/00
                                              348/43
(Continued)

FOREIGN PATENT DOCUMENTS

CN    102104786 A    6/2011
CN    103763539 A    4/2014
(Continued)

OTHER PUBLICATIONS

Visual comfort of binocular and #D displays, Frank L. Kooi et al., Elsevier, Displays 25, 2004, pp. 99-108 (Year: 2004).*
(Continued)

*Primary Examiner* — Jayesh A Patel
(74) *Attorney, Agent, or Firm* — Oblon, McClelland, Maier & Neustadt, L.L.P.

(57) ABSTRACT

To allow an observer wearing stereoscopic equipment to perceive a stereo image and an observer not wearing stereoscopic equipment to perceive a clear image. Based on an original image, an image containing phase-modulated components a and an image containing phase-modulated components b are generated. The image containing phase-modulated components a and the image containing phase-modulated components b are for one who sees the original image or a subject represented by the original image and the
(Continued)

image containing phase-modulated components a with one eye and sees the original image or the subject and the image containing phase-modulated components b with the other eye to perceive a stereo image, and one who sees the original image or the subject, the image containing phase-modulated components a, and the image containing phase-modulated components b with the same eye(s) to perceive the original image. The phase-modulated components a are generated by shifting the phase of spatial frequency components of the original image by a first phase, and the phase-modulated components b are generated by shifting the phase of the spatial frequency components of the original image by a second phase being a different phase than the first phase.

38 Claims, 16 Drawing Sheets

(51) Int. Cl.
  *H04N 13/30* (2018.01)
  *G06T 7/593* (2017.01)
  *H04N 13/268* (2018.01)
  *H04N 13/324* (2018.01)
  *H04N 13/398* (2018.01)

(52) U.S. Cl.
  CPC ........... *H04N 13/30* (2018.05); *H04N 13/324* (2018.05); *H04N 13/398* (2018.05); *G06T 2207/10012* (2013.01)

(56) References Cited

U.S. PATENT DOCUMENTS

| | | | |
|---|---|---|---|
| 5,875,055 A | 2/1999 | Morishima et al. | |
| 5,930,360 A * | 7/1999 | Okino | H04H 60/15 380/213 |
| 6,614,927 B1* | 9/2003 | Tabata | H04N 13/261 382/154 |
| 9,854,223 B2* | 12/2017 | Ohbitsu | H04N 13/204 |
| 2006/0203085 A1* | 9/2006 | Tomita | H04N 13/327 348/51 |
| 2010/0033554 A1* | 2/2010 | Kobayashi | H04N 13/324 348/43 |
| 2011/0050864 A1* | 3/2011 | Bond | H04N 13/261 348/51 |
| 2011/0096147 A1* | 4/2011 | Yamazaki | H04N 13/261 348/43 |
| 2011/0273531 A1* | 11/2011 | Ito | H04N 13/261 348/43 |
| 2013/0070053 A1* | 3/2013 | Miyoshi | H04N 13/178 348/46 |
| 2013/0156338 A1* | 6/2013 | Yamazaki | G06T 5/002 382/264 |
| 2013/0229497 A1* | 9/2013 | Delacoux | H04N 5/073 348/47 |
| 2013/0249904 A1* | 9/2013 | Kobayashi | H04N 13/302 345/419 |
| 2014/0118491 A1* | 5/2014 | Tourapis | H04N 13/161 348/43 |
| 2014/0198188 A1* | 7/2014 | Izawa | H04N 13/106 348/49 |
| 2014/0293081 A1* | 10/2014 | Wu | G06T 7/593 348/222.1 |
| 2015/0181196 A1* | 6/2015 | Izawa | H04N 9/07 348/46 |
| 2015/0189144 A1* | 7/2015 | Yoshii | G06T 7/40 348/46 |
| 2015/0245007 A1* | 8/2015 | Hyodo | H04N 13/122 382/154 |
| 2017/0078642 A1 | 3/2017 | Yamazaki et al. | |

FOREIGN PATENT DOCUMENTS

| | | | |
|---|---|---|---|
| EP | 2 152 011 A2 | 2/2010 | |
| EP | 2152011 A2 * | 2/2010 | ........... H04N 13/261 |
| JP | 08331598 A * | 12/1996 | |
| JP | 2010-63083 A | 3/2010 | |

OTHER PUBLICATIONS

Japanese Office Action dated Jun. 16, 2020 in Patent Application No. 2018-540966 (with English translation), 13 pages.
Combined Chinese Office Action and Search Report dated May 20, 2020 in Chinese Patent Application No. 201780056918.X, (with English translation and English translation of Category of Cited Documents), citing documents AO and AP therein, 37 pages.
International Search Report dated Nov. 21, 2017 in PCT/JP2017/032597 filed Sep. 5, 2017.
Piotr Didyk, et al., "A Perceptual Model for Disparity," ACM Transactions on Graphics, vol. 30, No. 4, Article 96, Jul. 2011, pp. 96:1-96:10.
Steven Scher, et al., "3D+2DTV: 3D Displays with No Ghosting for Viewers Without Glasses," ACM Transactions on Graphics, vol. 32, No. 3, Article 21, Jun. 2013, pp. 21:1-21:10.
Peter J. Burt, et al., "The Laplacian Pyramid as a Compact Image Code," IEEE Transactions on Communications, vol. 31, No. 4, Apr. 1983, pp. 532-540.
Piotr Didyk, et al., "Joint View Expansion and Filtering for Automultiscopic 3D Displays," ACM Transactions on Graphics, vol. 32, 2013, 8 Pages.
Extended European Search Report dated Mar. 13, 2020 in European Patent Application No. 17852863.4, citing documents AA through AC and AO therein, 11 pages.

* cited by examiner

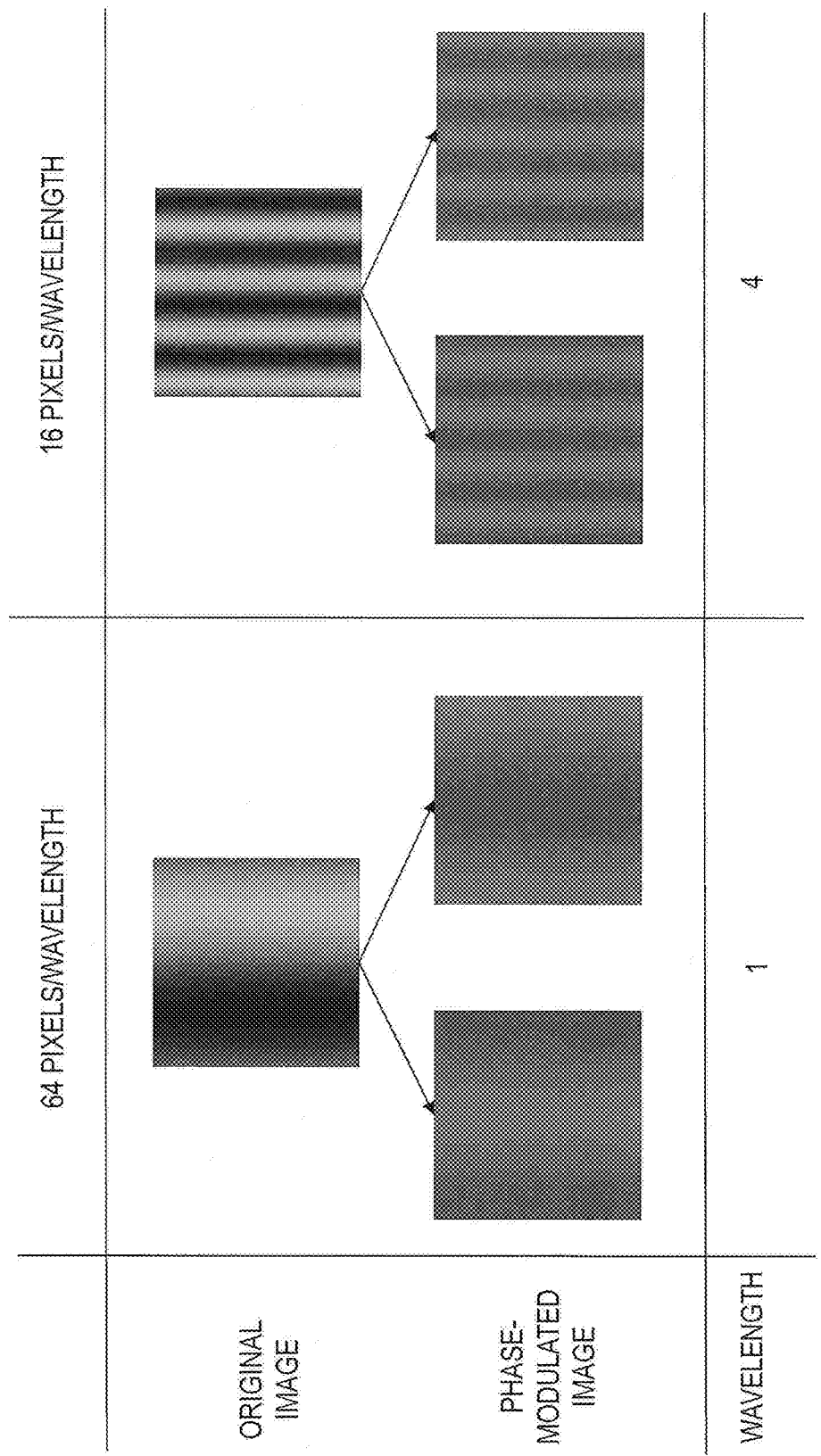

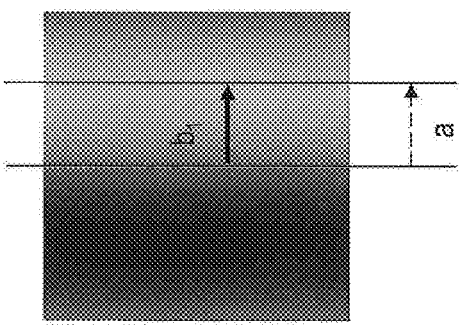
FIG. 3A  $b_1 = a$
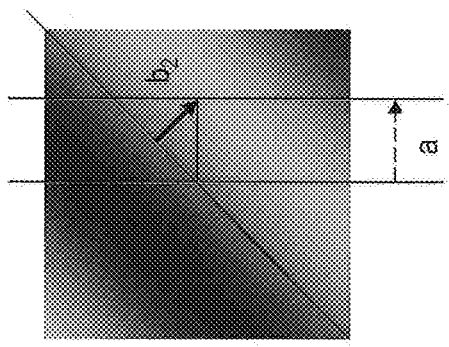
FIG. 3B  $b_2 = a \cos 0.25\pi$
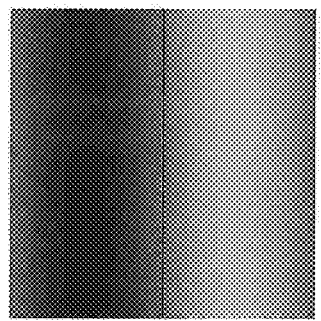
FIG. 3C  $b_3 = 0$

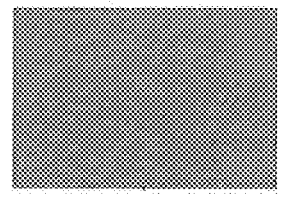
FIG. 13A
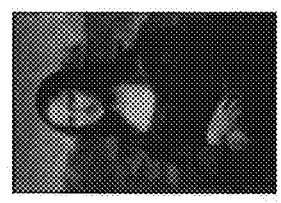
FIG. 13B
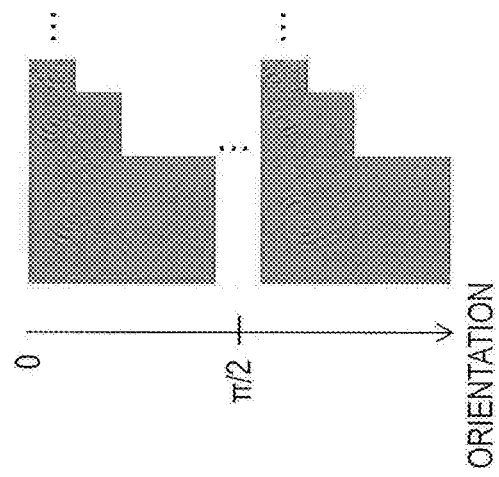
FIG. 13C
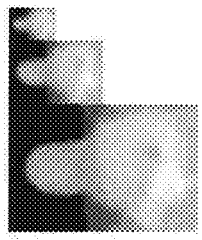
FIG. 13D
FIG. 13E
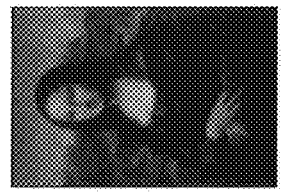
FIG. 13F
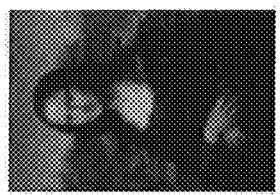
FIG. 13G

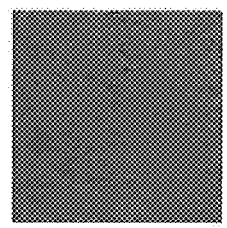
FIG. 14E
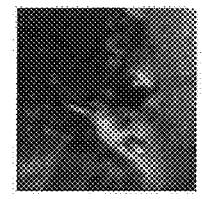
FIG. 14G
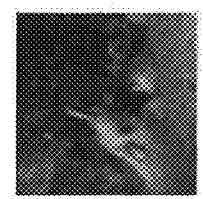
FIG. 14F
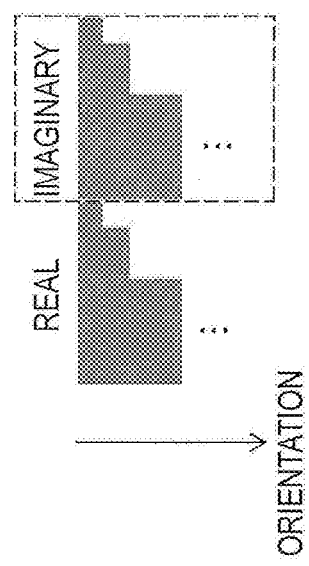
FIG. 14C
FIG. 14D
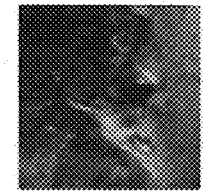
FIG. 14A
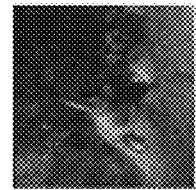
FIG. 14B

IMAGE GENERATION APPARATUS, IMAGE GENERATION METHOD, DATA STRUCTURE, AND PROGRAM

TECHNICAL FIELD

The present invention relates to techniques for presenting an image with an apparent depth.

BACKGROUND ART

A binocular image presentation scheme is an effective way to give an apparent depth to an image. This scheme presents pieces of image information that are slightly shifted from one another to the right and left eyes of an observer, respectively. Such a shift is called binocular parallax. The binocular parallax is interpreted as depth in the observer's brain, as a result of which a planer image is perceived as if having a depth (that is, as a stereo image).

There are various approaches to binocular image presentation scheme (see Non-patent Literatures 1 and 2, for instance).

In a time division approach, the transmittances of the right and left lenses of goggles having liquid crystal shutters worn by the observer are manipulated to temporally toggle the image information being input to each eye. In synchronization with the toggling, images with a binocular parallax are displayed while being temporally toggled, thereby presenting images with a parallax to the observer's right and left eyes.

In a polarization approach, two polarizing plates having polarization directions orthogonal to each other are positioned in front of the lenses of two projectors, respectively. The observer wears goggles with two polarizing plates having the same polarization directions as those of the projector polarizing plates (two polarizing plates with polarization directions orthogonal to each other). Under these conditions, images having a binocular parallax relative to each other are projected from the two projectors so that images with a parallax can be presented to the observer's right and left eyes.

In an anaglyph approach, two images with a binocular parallax are set in color channels different from each other and are displayed as a single image (an anaglyph image). The observer views the anaglyph image wearing goggles having color filters of the same color channels as those of the images. This can present images with a parallax to the observer's right and left eyes.

PRIOR ART LITERATURE

Non-Patent Literature

Non-patent Literature 1: Didyk, P., Ritschel, T., Eisemann, E., Myszkowski, K., & Seidel, H.-P, "A Perceptual Model for Disparity," Jul. 4, 2011, ACM, In ACM SIGGRAPH 2011 Papers, pp. 96:1-96:10.

Non-patent Literature 2: Scher, S., Liu, J., Vaish, R., Gunawardane, P., & Davis, J., "3D+2DTV: 3D Displays with No Ghosting for Viewers Without Glasses," Jun. 3, 2013, ACM Trans. Graph., 32(3), 21:1-21:10.

SUMMARY OF THE INVENTION

Problems to be Solved by the Invention

In the conventional approaches, however, an observer wearing stereoscopic equipment such as stereoscopic goggles can see a clear stereo image, but an observer not wearing stereoscopic equipment cannot see a clear image.

In the time division approach, for example, when an observer without goggles views an image like the one described above, pieces of image information for regions with a binocular parallax are combined in the observer's brain, causing a perception of a doubly blurred image. A similar phenomenon also occurs in the polarization approach. Also in the anaglyph approach, when an observer not wearing goggles views an anaglyph image, images of the different color channels doubly overlap in regions with the binocular parallax and deviation from the original image is increased.

An object of the present invention is to allow an observer wearing stereoscopic equipment to perceive a stereo image and an observer not wearing stereoscopic equipment to perceive a clear image.

Means to Solve the Problems

Based on an original image, an image containing phase-modulated components a and an image containing phase-modulated components b are generated. The image containing phase-modulated components a and the image containing phase-modulated components b are for one who sees the original image or a subject represented by the original image and the image containing phase-modulated components a with one eye and sees the original image or the subject and the image containing phase-modulated components b with the other eye to perceive a stereo image, and one who sees the original image or the subject, the image containing phase-modulated components a, and the image containing phase-modulated components b with the same eye(s) to perceive the original image. The phase-modulated components a are generated by shifting the phases of spatial frequency components of the original image by a first phase, and the phase-modulated components b are generated by shifting the phases of spatial frequency components of the original image by a second phase being a different phase than the first phase.

Effects of the Invention

The present invention can allow an observer wearing stereoscopic equipment to perceive a stereo image and an observer not wearing stereoscopic equipment to perceive a clear image.

BRIEF DESCRIPTION OF THE DRAWINGS

FIG. 2 is a diagram for describing a principle.
FIGS. 3A to 3C are diagrams for describing principles.

FIG. 13 is a diagram for illustrating images under processing.

FIG. 14 is a diagram for illustrating images under processing.

DETAILED DESCRIPTION OF THE EMBODIMENTS

Embodiments of the present invention are described below.

First Embodiment

Using drawings, a first embodiment is described.
<Basic Principle>

This embodiment achieves a desired binocular parallax by utilizing phase change, rather than position change. Since a position change can be redefined as a phase change of a spatial frequency domain component, a binocular parallax can be converted to a phase difference (a phase parallax). A phase parallax in a certain direction in each spatial frequency domain component is determined as a function of its orientation and spatial frequency. Accordingly, when a certain binocular parallax is desired, it can be converted to a phase change of each spatial frequency domain component, which depends on its orientation and spatial frequency. In this embodiment, phase-modulated images which are based on elements generated by changing the phase of an "original image" in the positive direction and the negative direction, respectively (an image containing phase-modulated components a and an image containing phase-modulated components b) are added to the "original image" to generate an image A and an image B, which are then presented to the right and left eyes, respectively. This can give a phase parallax to an observer wearing "stereoscopic equipment" such as goggles, making the observer perceive an image with an apparent depth. Meanwhile, by utilizing the fact that spatial patterns based on the opposite phase changes are perceived as being averaged in the binocular image presentation approach, an observer not wearing the "stereoscopic equipment" is made to perceive a clear "original image".

Figure 1:
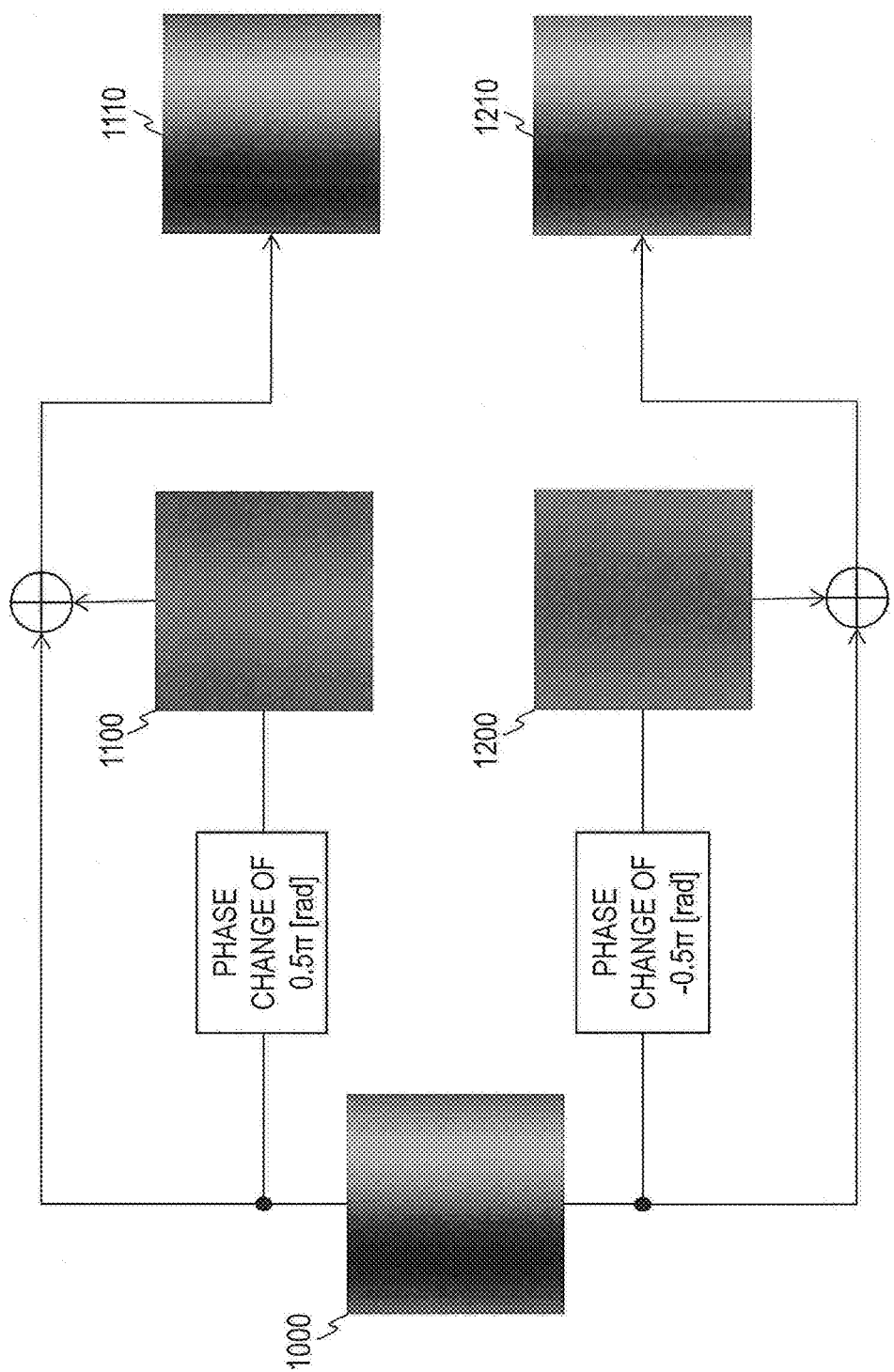
FIG. 1 is a diagram for describing a principle.

This basic principle is explained taking a sinusoidal image as an example. As illustrated in FIG. 1, an original image 1000 is a sinusoidal image composed of a single spatial frequency component. The vertical spatial frequency of the original image 1000 is zero and the horizontal spatial frequency is a positive value or a negative value. A phase-modulated image 1100 (the image containing phase-modulated components a) is prepared by changing the phase of the original image 1000 in the horizontal direction by $0.5\pi$ [rad] (the phase shifted horizontally in FIG. 1), and a phase-modulated image 1200 (the image containing phase-modulated components b) is prepared by changing the phase of the original image 1000 in the horizontal direction by $-0.5\pi$ [rad]. The problem of how to determine the phase change amounts is discussed later. An added image 1110 (image A) is obtained by adding (superposing) the phase-modulated image 1100 on the original image 1000 and an added image 1210 (image B) is obtained by adding the phase-modulated image 1200 to the original image 1000. The added image 1110 is presented to one eye (for example, the right eye) of an observer I wearing the "stereoscopic equipment", while the added image 1210 is presented to the other eye (for example, the left eye) of the observer I. The observer I perceives a stereo image by his/her brain utilizing the phase difference between the added image 1110 and the added image 1210 caused by the phase difference between the phase-modulated image 1100 and the phase-modulated image 1200 as a binocular parallax.

When the phase change amounts of the phase-modulated images 1100, 1200 relative to the original image 1000 are $0.5\pi$ and $-0.5\pi$ [rad], respectively, the phase-modulated images 1100 and 1200 are sinusoidal images with their phases inverted from each other. That is, in the phase-modulated images 1100, 1200, the vectors of pixel value variation are opposite to each other with respect to an intermediate value in a range that can be assumed by pixels. Thus, when the added images 1110, 1210 being presented are quickly toggled in the time division approach, the image intensities of the phase-modulated components based on those phase-modulated images 1100, 1200 are averaged or canceled (weakened) together when perceived. Accordingly, an observer II who sees both the added images 1110, 1210 with the same eye(s) (one eye or both eyes) without wearing the "stereoscopic equipment" perceives the components based on the phase-modulated images 1100, 1200 as uniform, intermediate luminance images. In the polarization approach, since the luminances of the phase-modulated components which are based on the superposed phase-modulated images 1100, 1200 are averaged or canceled by each other, the components based on the phase-modulated images 1100, 1200 are also perceived as uniform, intermediate luminance images by the observer II. That is, the image components based on the phase-modulated images 1100, 1200 are not perceived by the observer II without the "stereoscopic equipment" but only the image components of the original image 1000, which are components common to the added images 1110, 1210 presented to the right and left eyes, will be perceived. In the conventional anaglyph approach, an observer not wearing goggles sees colors that are based on the two channel intensities as they are. By employing the present scheme, only a change in hue associated with the average intensity of the two channels is perceived over the original image 1000.

Here, although the phase change amounts of the phase-modulated images 1100 and 1200 relative to the original image 1000 are described as being $0.5\pi$ and $-0.5\pi$ [rad], respectively, this is not an essential condition. A greater phase change amount may be used for giving a greater depth or a smaller phase change amount may be used for giving a smaller depth. At the same time, the observer II is less likely to perceive a doubled image as the phase change amounts of the phase-modulated images 1100 and 1200 are closer to $0.5\pi$ and $-0.5\pi$ [rad], respectively, and can get an impression of luminance and color contrast close to those of the original image 1000 by fusing the two images in the brain.

The added images 1110 and 1210 are obtained by adding the phase-modulated images 1100 and 1200 to the original image 1000, respectively. Accordingly, the luminance contrasts of the added images 1110 and 1210 do not agree with that of the original image 1000. However, when the added images 1110 and 1210 presented to the right and left eyes respectively are fused, the disagreement of luminance contrast is not as annoying as when they are seen with one eye. This is presumably because the brain has a mechanism to ignore (compensate for) the disagreement of luminance contrast when the added images 1110, 1210 are fused so as to be consistent with the depth of an image that is perceived due to the phase changes of the two images.

<Contribution of Spatial Frequency and Orientation>

FIG. 1 showed a method for giving a uniform phase parallax to a sinusoidal image. However, a typical image contains image components of various spatial frequencies and/or orientations. It is thus difficult to give an impression of a desired depth to an image without considering the influence of the spatial frequency or orientation of each pixel component. The ground for this idea is discussed from two aspects: spatial frequency and orientation.

<<Manipulation Relating to Spatial Frequency>>

To give a desired phase parallax, it is necessary to consider the relation between space dimension and phase dimension relating to the phase parallax amount, such as a relation that a phase modulation of $0.05\pi$ is required for giving a two-pixel parallax. This relation varies with the spatial frequency. For example, even with the same phase change amount, the spatial movement amount of an original image that is a sine wave of 64 pixels per period is greater than the spatial movement amount of an original image that is a sine wave of 16 pixels per period (FIG. 2). This is because a spatial wavelength shortens as the spatial frequency is higher. The spatial movement amount when the phase of the sine wave of 64 pixels per period is changed by an amount equivalent to one wavelength is equal to the spatial movement amount when the phase of the sine wave of 16 pixels per period is changed by an amount equivalent to four wavelengths. The relation between the space dimension and the phase dimension relating to phase parallax amount is considered from this respect. For instance, to obtain a phase-modulated image moved by two pixels relative to an original image being a sine wave of 64 pixels per period, a phase change of $(2/64)\times 2\pi$ [rad], that is, $(1/16)\times\pi$ [rad], is required. Meanwhile, to obtain a phase-modulated image moved by two pixels relative to an original image being a sine wave of 16 pixels per period, a phase change of $(2/16)\times 2\pi$ [rad], that is, $(1/4)\times\pi$ [rad], is required. This means a phase change amount corresponding to a parallax amount to be given has to be manipulated in accordance with the spatial frequency.

<<Manipulation Relating to Orientation>>

A phase change amount necessary for moving an image component in the horizontal direction by a certain amount in the space domain depends on the orientations of the spatial frequency components forming the image component. That is, the movement amount of an image component in the horizontal direction in the space domain can be regarded as a combined vector of the movement vectors of the spatial frequency components forming that image component. Thus, the degree of contribution to movement of the image component in the horizontal direction depends on the orientation of each spatial frequency component. The term "the orientation of a spatial frequency component" means the orientation at which the spatial frequency of the spatial frequency component is zero in the spatial frequency domain (excluding a case where the spatial frequencies in all the orientations are zero). In other words, the term "the orientation of a spatial frequency component" means an angle of a lattice (that is, stripes) in a space domain composed of that spatial frequency component relative to the vertical orientation. When the orientation of a spatial frequency component is the vertical orientation, the vertical spatial frequency of the spatial frequency component is zero. When the orientation of a spatial frequency component is the horizontal orientation, the horizontal spatial frequency of the spatial frequency component is zero. Decomposing the movement vector of an image component in the horizontal direction according to the orientations of the spatial frequency components forming the image component, the magnitude (position change amount) of the movement vector of the spatial frequency component with the vertical orientation is largest, and a spatial frequency component having an orientation closer to the horizontal orientation has a movement vector of a smaller magnitude.

This is described more specifically using a sine wave (FIGS. 3A to 3C). For a sine wave of the vertical orientation (FIG. 3A), a position change amount $b_1$ of the sine wave when pixels containing the sinusoidal component are moved by an amount a in the horizontal direction agrees with a position change amount a of the pixel ($b_1$=a). For a sine wave of an orientation inclined 45 relative to the vertical orientation (FIG. 3B), a position change amount $b_2$ of the sine wave when pixels containing the sinusoidal component are moved by a in the horizontal direction is smaller than the position change amount a of the pixel, where $b_2$=a cos $0.25\pi$ [rad]. Further, for a sine wave of the horizontal orientation (FIG. 3C), a position change amount $b_3$ of the sine wave when pixels containing the sinusoidal component are moved by a in the horizontal direction is zero ($b_3$=0). In summary, when pixels are moved in the horizontal direction, the phase change amount of the spatial frequency component of the vertical orientation is greatest, a spatial frequency component closer to the horizontal orientation has a smaller phase change amount, and no phase change is seen for the spatial frequency component of the horizontal orientation. From this regard, the orientation of each spatial frequency component needs to be considered in order to give a desired horizontal parallax via phase modulation.

<Specific Methods of Manipulation Relating to Spatial Frequency and Orientation>

As shown in FIG. 1 above, this embodiment generates added images (image A and image B) by superposing phase-modulated images (the image containing phase-modulated components a and the image containing phase-modulated components b) on the original image. Further, for creation of phase-modulated images having a desired parallax in the horizontal direction as mentioned above, it is necessary to create the phase-modulated images in consideration of the orientation and spatial frequency of each spatial frequency component. The description herein shows a method of manipulating the amplitudes of spatial frequency components (for example, two-dimensional Fourier components) of phase-modulated images such that added images will have a desired parallax when the phase-modulated images are added to the original image, and further a method of manipulating the amplitudes of the spatial frequency and the orientation using weights corresponding to the spatial frequency and the orientation.

<<Relationship Between the Amplitude of a Phase-Modulated Image and the Phase of an Added Image>>

Assume that the original image, the phase-modulated images (the image containing phase-modulated components a and the image containing phase-modulated components b), and the added images (image A and image B) are simple sine waves. Then, addition of the original image and a phase-modulated image can be regarded as addition of two sine waves of the same spatial frequency. In general, addition of two sine waves can be described as:

$$C_1 \sin(Fx+\alpha) + C_2 \sin(Fx+\beta) = C_3 \sin(Fx+\gamma) \tag{1}$$

Here, $C_1$, $C_2$, and $C_3$ are the amplitudes of the original image, the phase-modulated image, and the added image, respectively. F is spatial frequency; $\alpha$, $\beta$, and $\gamma$ are the phases of the original image, the phase-modulated image, and the added image, respectively; and x represents the horizontal coordinates in the space domain. When $\alpha=0$, $\beta=0.5\pi$ [rad] (or $-0.5\pi$ [rad]), and $C_1=C_2=1$, the amplitude $C_3$ of the added image is equal to the square root of 2 and $\gamma$ is equal to $0.25\pi$ [rad] (or $-0.25\pi$ [rad]). Note that Formula (1) does not consider the influence of spatial frequency and orientation. The following describes a way for changing the amplitudes of the spatial frequency components of the phase-modulated components contained in a phase-modulated image in accordance with the spatial frequency and orientation, thereby manipulating the phases of the spatial frequency components of an added image resulting from superposition of the original image and the phase-modulated components, and resulting in giving a consistent parallax in the horizontal direction.

<<Contribution Rate Map for Spatial Frequency>>

In the case of giving a desired uniform parallax to a certain original image, added images have to be created such that a desired parallax amount will be produced by superposition of the original image and phase-modulated images generated by changing the phase of the original image. A phase change amount that will produce the desired parallax amount in the space dimension is dependent on the spatial frequency. That is, as illustrated in FIG. 2, even for giving the same parallax amount, a spatial frequency component with a lower spatial frequency involves a smaller phase change amount for that purpose. It is hence necessary to set the phase change amount corresponding to the desired parallax per spatial frequency. This embodiment achieves this by adjusting the amplitude of a phase-modulated image in the spatial frequency domain (for example, two-dimensional Fourier space). In Formula (1), varying $C_2$ with fixed $C_1$ causes a change in $\gamma$. Specifically, as $C_2$ is smaller than $C_1$, $\gamma$ becomes smaller; and as $C_2$ is greater than $C_1$, $\gamma$ becomes greater. By making use of this property, the amplitude of each spatial frequency component of the phase-modulate image is adjusted in accordance with its spatial frequency such that each spatial frequency component of an added image will have a phase change amount corresponding to the desired parallax amount. However, there is a certain spatial frequency band for which the desired parallax amount cannot be given by phase change. This is because a movement amount in the space domain by phase change cannot exceed one wavelength. The highest one of the spatial frequencies for which the desired parallax amount can be given by the change of the phase will be called "critical spatial frequency (Critical Frequency)". The phase change amount of a component with a lower spatial frequency than the critical spatial frequency has to be smaller than the phase change amount of a component of the critical spatial frequency. Thus, the amplitude of a phase-modulated image component with a lower spatial frequency than the critical spatial frequency is made small. When $d\pi$ [rad] represents the phase change amount of the critical spatial frequency component of an added image that gives the desired parallax amount, the phase change amount of the spatial frequency component at spatial frequency F (where $|F|<CF$) of the added image is $d(F/CF)\pi$ [rad]. Here, CF is the critical spatial frequency (CF>0). It is thus desirable to adjust the amplitude $C_2$ of the phase-modulated image so that the phase change amount of the spatial frequency component at the spatial frequency F of the added image will be $d(F/CF)\pi$ [rad]. When $C_{2(F=CF)}$ represents the amplitude $C_2$ of a phase-modulated image such that the phase change amount of the critical spatial frequency component of the added image will be $d(F/CF)\pi$ [rad], and $C_{2(F<CF)}$ represents the amplitude $C_2$ of a phase-modulated image such that the phase change amount of the spatial frequency component at spatial frequency F<CF of the added image will be $d\pi$ [rad], $0 \leq C_{2(F<CF)} < C_{2(F=CF)}$ holds. $C_{2(F=CF)} = \rho \tan(d\pi)$, and $C_{2(F<CF)} = \rho \tan(d(F/CF)\pi)$. Here, $\rho$ is a value that is determined by $C_1$, $\alpha$, and $\beta$. For example, when $C_1=1$, $\alpha=0$, and $\beta=0.5\pi$ [rad], then $\rho=1$. Meanwhile, a component with the spatial frequency F higher than the critical spatial frequency CF (where $|F|>CF$) does not contribute in giving the desired parallax. Accordingly, the amplitude $C_{2(|F|>CF)}$ of the phase-modulated image at the spatial frequency F is arbitrary. However, setting of $C_{2(|F|>CF)} = C_{2(F=CF)}$ can suppress image blur caused by misalignment of the phases of the components of the spatial frequency F (where $|F|>CF$).

Figure 4B:
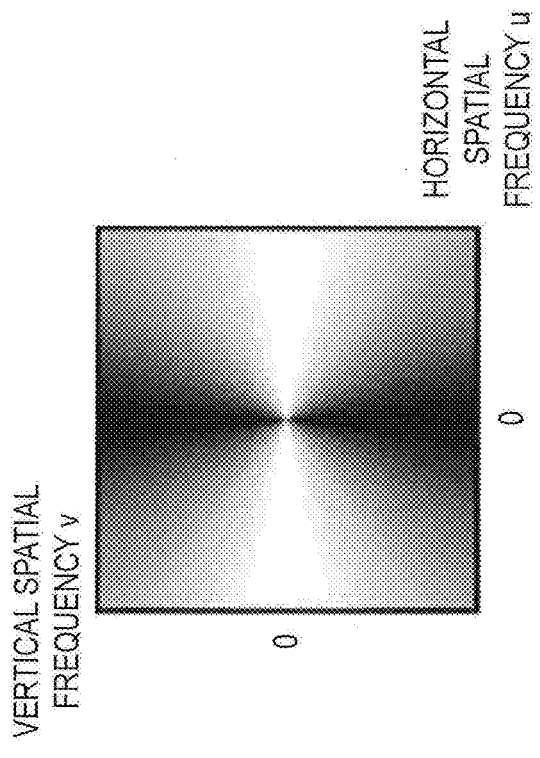
FIG. 4A illustrates an example of a contribution rate map for spatial frequency and FIG. 4B illustrates an example of a contribution rate map for orientation, in both of which the vertical axis represents the vertical spatial frequency axis and the horizontal axis represents the horizontal spatial frequency axis, where a vertical spatial frequency in the spatial frequency domain refers to a horizontal orientation in the space domain, while a horizontal spatial frequency in the spatial frequency domain refers to a vertical orientation in the space domain, and the spatial frequency has a smaller absolute value as it is closer to the center (a low spatial frequency) and has a greater absolute value as it is away from the center (a high spatial frequency).
Figure 4A:
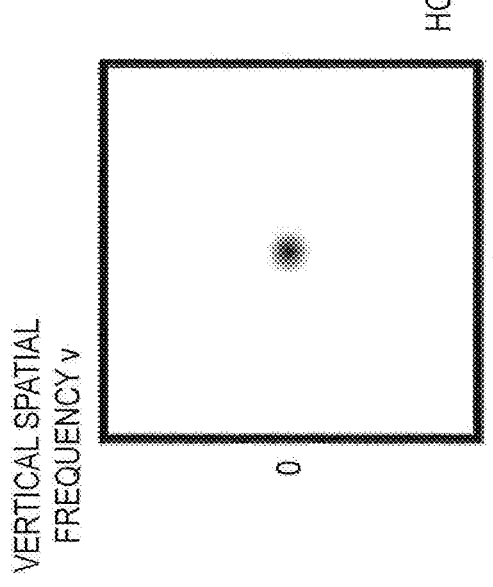

Based on the foregoing, a "contribution rate map Fmap for spatial frequency" for adjusting the amplitude of a phase-modulated image in accordance with the spatial frequency is defined. Fmap is a two-dimensional array (a two-dimensional gradation image) having I(u, v) that satisfies $0 \leq I(u, v) \leq 1$ as the elements (pixels). Here, u represents the horizontal spatial frequency, and v represents the vertical spatial frequency, where $u_{min} \leq u \leq u_{max}$, $v_{min} \leq v \leq v_{max}$, $u_{min} < u_{max}$, and $v_{min} < v_{max}$ are satisfied. I(u, v) represents the weight (contribution rate) corresponding to the spatial frequency component of (u, v). FIG. 4A illustrates an example of Fmap. In FIG. 4A, the magnitude of I(u, v) is represented with gradation of color, with a brighter color indicating a greater I(u, v) (closer to 1). The vertical axis in FIG. 4A represents the spatial frequency axis of the horizontal orientation component (the axis of a vertical spatial frequency v), and the horizontal axis represents the spatial frequency axis of the vertical orientation component (the axis of a horizontal spatial frequency u). The spatial frequency is lower as it is closer to the center (a spatial frequency with a smaller absolute value) and is higher as it is closer to an edge (a spatial frequency with a greater absolute value). In the example of FIG. 4A, I(0, 0) at (0, 0) in the center (the spatial frequency being zero) is 0; and I(u, v) is greater as u and/or v is greater and the spatial frequency F is higher, and I(u, v)=1 at a spatial frequency F equal to or greater than the critical spatial frequency CF (where $|F| \geq CF$). Fmap is used in the spatial frequency domain (for example, two-dimensional Fourier space).

<<Contribution Rate Map for Orientation>>

As mentioned above, when considering a phase change amount corresponding to the desired parallax in the horizontal direction in terms of spatial frequency components having various orientations, the phase change amount of the spatial frequency component of the vertical orientation is greatest, a spatial frequency component closer to the horizontal orientation has a smaller phase change amount, and no phase change is seen for the spatial frequency component of the horizontal orientation (FIG. 3). Accordingly, it is necessary to manipulate the phase change amount also according to the orientation of a spatial frequency component. The orientation of a spatial frequency component is denoted as Ori. Ori ranges from $-0.5\pi$ [rad] to $0.5\pi$ [rad], where Ori=0 [rad] is the vertical orientation. When $d\pi$ [rad] represents the phase change amount corresponding to the desired parallax for the spatial frequency component of the critical spatial frequency CF, a phase change amount $\gamma_{ORI}$ of the spatial frequency component with orientation Ori (where $-0.5\pi \leq Ori \leq 0.5\pi$) in an added image is as follows:

$$\gamma_{ORI} = d\pi \times \cos(Ori) \quad (2)$$

Also, when the amplitude $C_2$ of a phase-modulated image for obtaining the phase change amount $\gamma_{ORI}$ is represented as $C_{2ORI}$, $$C_{2ORI} = \eta \tan(\gamma_{ORI}) \quad (3)$$

holds. Here, $\eta$ is a value that is determined by $C_1$, $\alpha$, and $\beta$. For example, when $C_1=1$, $\alpha=0$, and $\beta=0.5\pi$ [rad], then $\pi=1$.

Based on the foregoing, a "contribution rate map Omap for orientation" for adjusting the amplitude of a phase-modulated image in accordance with orientation is defined. Omap is a two-dimensional array (a two-dimensional gradation image) having J(u, v) that satisfies $0 \leq J(u, v) \leq 1$ as the elements (pixels). J(u, v) represents the weight (contribution rate) corresponding to the orientation of the spatial frequency component of (u, v). FIG. 4B illustrates an example of Omap. In FIG. 4B, the magnitude of J(u, v) is represented with gradation of color, with a brighter color indicating a greater J(u, v) (closer to 1). The vertical axis in FIG. 4B represents the spatial frequency axis of the horizontal orientation component (the axis of the vertical spatial frequency v), and the horizontal axis represents the spatial frequency axis of the vertical orientation component (the axis of the horizontal spatial frequency u). The spatial frequency is lower as it is closer to the center (a spatial frequency with a smaller absolute value) and is higher as it is closer to an edge (a spatial frequency with a greater absolute value). In the example of FIG. 4B, J(u, v) is greater for an orientation with the absolute value of the vertical spatial frequency v being closer to zero (an orientation closer to the vertical orientation), and J(u, v) is the maximum J(u, 0)=1 when v=0. In contrast, J(u, v) is smaller for an orientation with the absolute value of the horizontal spatial frequency u being closer to zero (an orientation closer to the horizontal orientation), and J(u, v) is the minimum J(0, v)=0 when u=0.

<Application of Contribution Rate Map>

An image generation apparatus of this embodiment changes the phase of an original image $m_0$ in the positive direction of the horizontal axis to obtain a phase-modulated image $m_1$, and changes the phase of the original image $m_0$ in the negative direction of the horizontal axis to obtain a phase-modulated image $m_2$. The image generation apparatus then converts the phase-modulated image $m_1$ and phase-modulated image $m_2$ to images $FM_1$ and $FM_2$ in the spatial frequency domain by two-dimensional FFT and the like. The image generation apparatus further obtains an image $FWM_1$ by multiplying an image generated by changing the phase of the image $FM_1$ in the positive direction (for example, shifting the phase by $0.5\pi$ [rad]) by Fmap and Omap, and obtains an image $FWM_2$ by multiplying an image generated by changing the phase of the image $FM_2$ in the negative direction (for example, shifting the phase by $-0.5\pi$ [rad]) by Fmap and Omap. The image generation apparatus then converts the images $FWM_1$ and $FWM_2$ into the space domain by inverse two-dimensional FFT and the like to obtain phase-modulated components $wm_1$ and $wm_2$. The image generation apparatus further obtains phase-modulated images, $add_1 = m_0 + wm_1$ and $add_2 = m_0 + wm_2$, by superposing the phase-modulated component $wm_1$ and $wm_2$ on the original image $m_0$. The added images $add_1$ and $add_2$ are displayed on a display device or projected on a screen and the like from a projection device. Here, the $m_0$ component of $add_1$ and the $m_0$ component of $add_2$ have the same coordinates; there is no parallax between these components. The observer I wearing the "stereoscopic equipment" sees the phase-modulated image $add_1$ with one eye and the phase-modulated image $add_2$ with the other eye. The observer I thereby perceives a stereo image with an apparent depth. Meanwhile, the observer II not wearing the "stereoscopic equipment" sees the phase-modulated images $add_1$ and $add_2$ with the same eye(s) (one eye or both the eyes). The observer II perceives the $wm_1$ component of $add_1$ and the $wm_2$ component of $add_2$ as being canceled or averaged together. The observer II thereby perceives a clear planar image of the original image $m_0$.

<Configuration>

Figure 5:
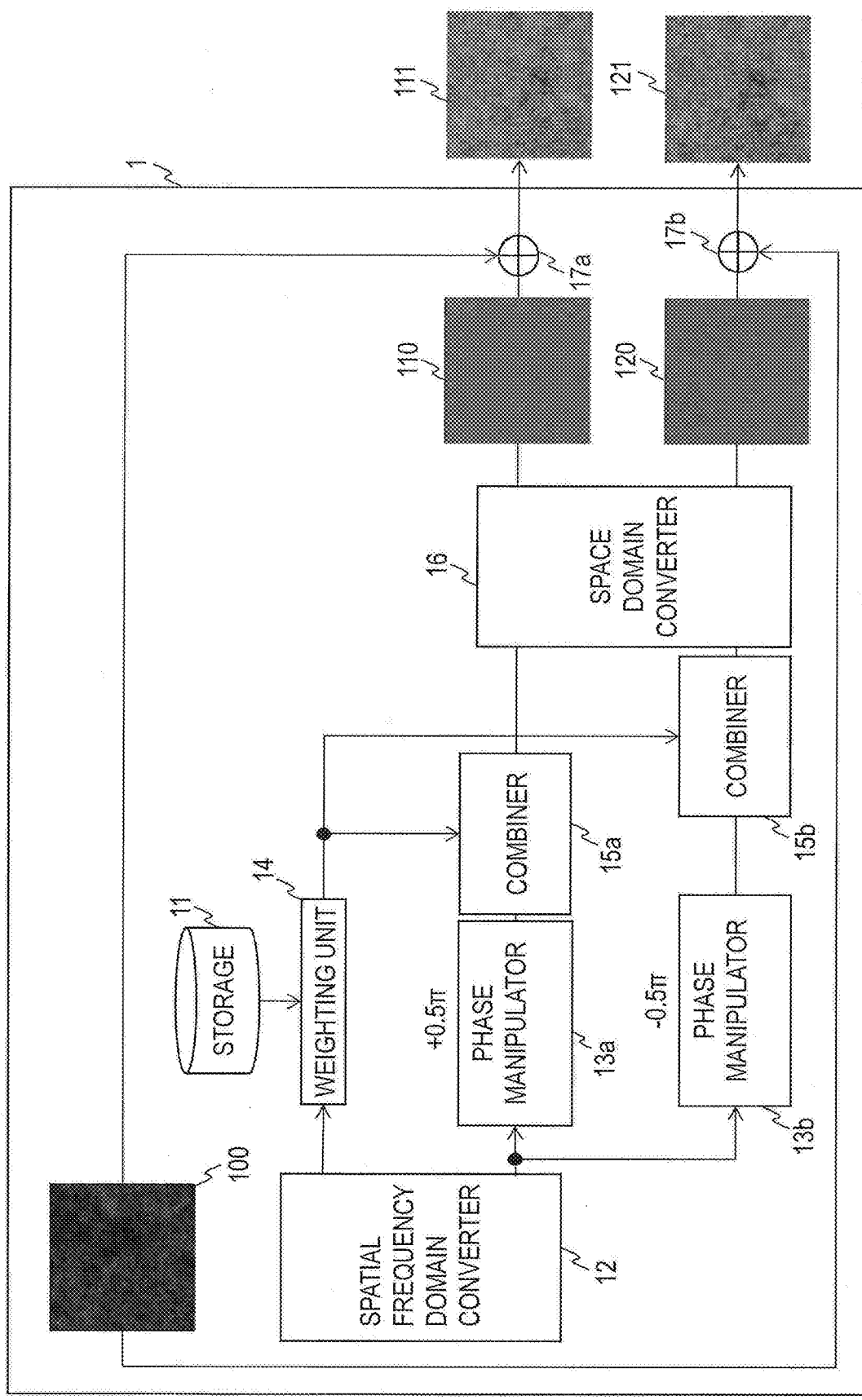
FIG. 5 is a block diagram illustrating a functional configuration of an image generation apparatus 1 according to a first embodiment.

Referring to FIG. 5, an exemplary configuration of an image generation apparatus 1 based on the principle described above is described.

As illustrated in FIG. 5, the image generation apparatus 1 includes a storage 11, a spatial frequency domain converter 12, phase manipulators 13a, 13b, a weighting unit 14, combining units 15a, 15b, a space domain converter 16, and superposition units 17a, 17b. In this embodiment, the spatial frequency domain converter 12, the phase manipulator 13a, the weighting unit 14, and the space domain converter 16 correspond to a "first manipulator", and the spatial frequency domain converter 12, the phase manipulator 13b, the weighting unit 14, and the space domain converter 16 correspond to a "second manipulator". The superposition unit 17a corresponds to the "first superposition unit" and the superposition unit 17b corresponds to the "second superposition unit".

The image generation apparatus 1 is an apparatus embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. Also, an electronic circuit constituting a single apparatus may include multiple CPUs.

<Processing>

Processing by the image generation apparatus 1 is now described. As pre-processing, the "contribution rate map Fmap for spatial frequency" and the "contribution rate map Omap for orientation" described above are stored in the storage 11.

Upon start of processing, an original image 100 is first input to the spatial frequency domain converter 12. The original image 100 may be a still image or an image of each frame of a moving image, and may be read from an external storage device or from a storage device (not shown) of the image generation apparatus 1. The spatial frequency domain converter 12 converts the original image 100 to an original image 100' in the spatial frequency domain by two-dimensional FFT and the like (step S12).

The phase manipulator 13a takes the original image 100' in the spatial frequency domain as input, and obtains first phase information, which represents phases resulting from shifting (changing) the phases at the respective (u, v) calculated from the original image 100' (spatial frequencies in the respective orientations) by $0.5\pi$ [rad]. For example, the phase manipulator 13a adds $0.5\pi$ [rad] to the phases lying in the first and fourth quadrants of the phase space, and adds $-0.5\pi$ [rad] to the phases lying in the second and third quadrants of the phase space. If the phase after the addition is outside the range of $-0.5\pi$ to $0.5\pi$ [rad], the phase manipulator 13a converts the phase after the addition to a phase within the range by phase coupling (phase unwrapping). The phase manipulator 13a outputs the first phase information representing the phases at the respective (u, v) thus obtained (step S13a).

The phase manipulator 13b takes the original image 100' in the spatial frequency domain as input and obtains second phase information, which represents phases resulting from shifting (changing) the phases at the respective (u, v) calculated from the original image 100' by $-0.5\pi$ [rad]. For example, the phase manipulator 13b adds $-0.5\pi$ [rad] to the phases lying in the first and fourth quadrants of the phase space, and adds $0.5\pi$ [rad] to the phases lying in the second and third quadrants of the phase space. If the phase after the addition is outside the range of $-0.5\pi$ to $0.5\pi$ [rad], the phase manipulator 13b converts the phase after the addition to a phase within the range by phase coupling. The phase manipulator 13b outputs the second phase information representing the phases at the respective (u, v) thus obtained (step S13b).

The weighting unit 14 takes the original image 100' in the spatial frequency domain as input, and multiplies the amplitude at each (u, v) of the original image 100' by the element at that (u, v) in the Fmap and Omap read from the storage 11 to obtain a weighted amplitude representing the amplitude at that (u, v) with a weight. That is, the weighting unit 14 provides each spatial frequency component of an image obtained by changing the phase of the original image with the weight corresponding to the spatial frequency of the spatial frequency component and the weight corresponding to the orientation of the spatial frequency component. As mentioned above, the weight corresponding to a certain spatial frequency $F_1$ (the first spatial frequency) is smaller than the weight corresponding to a spatial frequency $F_2$ (the second spatial frequency) higher than spatial frequency $F_1$ (that is, $F_2 > F_1$) (FIG. 4A). Likewise, the weight corresponding to a certain orientation $O_1$ (the first orientation) is smaller than the weight corresponding to an orientation $O_2$ (the second orientation) closer to the vertical orientation (the orientation with vertical spatial frequency v=0) than the orientation $O_1$ is (FIG. 4B). A weight corresponding to a spatial frequency (hereinafter weight M) corresponds to the Fmap, while a weight corresponding to an orientation (hereinafter weight N) corresponds to the Omap. Every weight M that corresponds to a spatial frequency band higher than the critical spatial frequency CF may be set to 1. Also, the weight N may be from 0 to 1, inclusive. When the weight M corresponding to a spatial frequency band higher than the critical spatial frequency CF is 1, the weight corresponding to a certain spatial frequency $F_1$ (the first spatial frequency) is equal to or smaller than the weight corresponding to the spatial frequency $F_2$ (the second spatial frequency) higher than the spatial frequency $F_1$ (that is, $F_2 > F_1$). The weighting unit 14 outputs weighted amplitude information representing the weighted amplitudes at the respective (u, v) (step S14).

The combining unit 15a takes the first phase information and the weighted amplitude information as input and obtains and outputs a combined image 110'. The element at each (u, v) of the combined image 110' has the phase represented by the first phase information and the amplitude represented by the weighted amplitude information (step S15a). Similarly, the combining unit 15b takes the second phase information and the weighted amplitude information as input and obtains and outputs a combined image 120'. The element at each (u, v) of the combined image 120' has the phase represented by the second phase information and the amplitude represented by the weighted amplitude information (step S15b).

The space domain converter 16 takes the combined image 110' as input, converts the combined image 110' to a phase-modulated image 110 in the space domain (the image containing phase-modulated components a) by inverse two-dimensional FFT and the like, and outputs it. The space domain converter 16 similarly takes the combined image 120' as input, converts the combined image 120' to a phase-modulated image 120 in the space domain (the image containing phase-modulated components b) by inverse two-dimensional FFT and the like, and outputs it (step S16). As mentioned above, the phase-modulated image 110 is based on elements that are obtained by changing the phase of the original image 100 in the positive direction, while the phase-modulated image 120 is based on elements that are obtained by changing the phase of the original image 100 in the negative direction. In the above example, the phase change amount of the phase-modulated image 110 relative to the original image 100 is $0.5\pi$ [rad], while the phase change amount of the phase-modulated image 120 relative to the original image 100 is $-0.5\pi$ [rad]. That is, the opposite phase of the phase of the phase-modulated image 110 relative to the original image 100 or a neighborhood of the opposite phase is the same as the phase of the phase-modulated image 120 relative to the original image 100.

The superposition unit 17a takes the original image 100 and the phase-modulated image 110 as input, obtains an added image 111 (image A) by superposing the phase-modulated image 110 on the original image 100, and outputs it. A pixel value $add_1(x, y)$ at each coordinate (x, y) of the added image 111 is the sum of a pixel value $m_0(x, y)$ at that coordinate (x, y) of the original image 100 and a pixel value $wm_1(x, y)$ at that coordinate (x, y) of the phase-modulated image 110 ($add_1(x, y) = m_0(x, y) + wm_1(x, y)$). If the original image 100 is a color image, the same addition is performed in each color mode (step S17a).

Similarly, the superposition unit 17b takes the original image 100 and the phase-modulated image 120 as input, obtains an added image 121 (image B) by superposing the phase-modulated image 120 on the original image 100, and outputs it. A pixel value $add_2(x, y)$ at each coordinate (x, y) of the added image 121 is the sum of a pixel value $m_0(x, y)$ at that coordinate (x, y) of the original image 100 and a pixel value $wm_2(x, y)$ at that coordinate (x, y) of the phase-modulated image 120 ($add_2(x, y) = m_0(x, y) + wm_2(x, y)$). If the original image 100 is a color image, the same addition is performed in each color mode (step S17b).

The added images 111, 121 are displayed on a display device or projected on a screen and the like from a projection device. Note that $add_1(x, y)$ and $add_2(x, y)$ are displayed or projected at the same coordinates as each other or at coordinates close to each other. The observer I wearing the "stereoscopic equipment" sees the added image 111 with one eye and the added image 121 with the other eye. The observer I thereby perceives a stereo image with an apparent depth. Meanwhile, the observer II not wearing the "stereoscopic equipment" sees the added images 111, 121 with the same eye(s) (one eye or both eyes). The observer II perceives the phase-modulated image 110 component of the added image 111 and the phase-modulated image 120 component of the added image 121 as being canceled or averaged together. The observer II thereby perceives a clear planar image of the original image 100.

Modification 1 of the First Embodiment

Instead of the added images 111, 121, the image generation apparatus 1 may output the phase-modulated image 110 as the "image containing phase-modulated components a" and the phase-modulated image 120 as the "image containing phase-modulated components b". Such "image containing phase-modulated components a" and "image containing phase-modulated components b" may be superposed on the original image 100 displayed or printed or on a "subject" represented by the original image 100 (for example, a solid or planar object photographed in the original image). In such a case, the observer I also perceives a stereo image with an apparent depth and the observer II perceives a clear image of the "subject".

Modification 2 of the First Embodiment

The "phase-modulated components a" may contain only the luminance components of the phase-modulated image 110 and the "phase-modulated components b" may contain only the luminance components of the phase-modulated image 120. For example, the image generation apparatus 1 may extract only the luminance components of the phase-modulated image 110 to obtain the "phase-modulated components a" and extract only the luminance components of the phase-modulated image 120 to obtain the "phase-modulated components b". The image generation apparatus 1 may output such "image containing phase-modulated components a" and "image containing phase-modulated components b". Such "image containing phase-modulated components a" and "image containing phase-modulated components b" may be superposed on the original image 100 displayed or printed or on a "subject" represented by the original image 100 (for example, a solid or planar object photographed in the original image). In such a case, the observer I also perceives a stereo image with an apparent depth and the observer II perceives a clear image of the "subject".

Second Embodiment

This embodiment gives different phase differences to different image regions of the original image and different depths to different image regions. When different depths are to be given to different image regions of the original image, a "depth map Dmap", which explicitly indicates what depths are to be given to the original image, is required. The Dmap is a two-dimensional array (two-dimensional gradation image) having $d(x, y)$ as the elements (pixels). Here, the size of the Dmap is the same as the size of the original image; x represents the horizontal coordinate in the space domain, and y represents the vertical coordinate in the space domain, where $x_{min} \leq x \leq x_{max}$, $y_{min} \leq y \leq y_{max}$, $x_{min} < x_{max}$, and $y_{min} < y_{max}$ are satisfied. $d(x, y)$ is one of a positive value, a negative value, and zero. In the Dmap, a brighter region indicates a greater depth on the side closer to the observer and a darker region indicates a greater depth on the side farther from the observer. That is, a region with $d(x, y) > 0$ represents a depth on the side closer to the observer, while a region with $d(x, y) < 0$ represents a depth on the side farther from the observer, and a greater absolute value $|d(x, y)|$ means a greater depth. Using such Dmap, a desired depth can be given to each image region. The following description focuses on the differences from the first embodiment and employs already used reference characters for matters common to the first embodiment for the sake of simplicity.

<Configuration>

Figure 6:
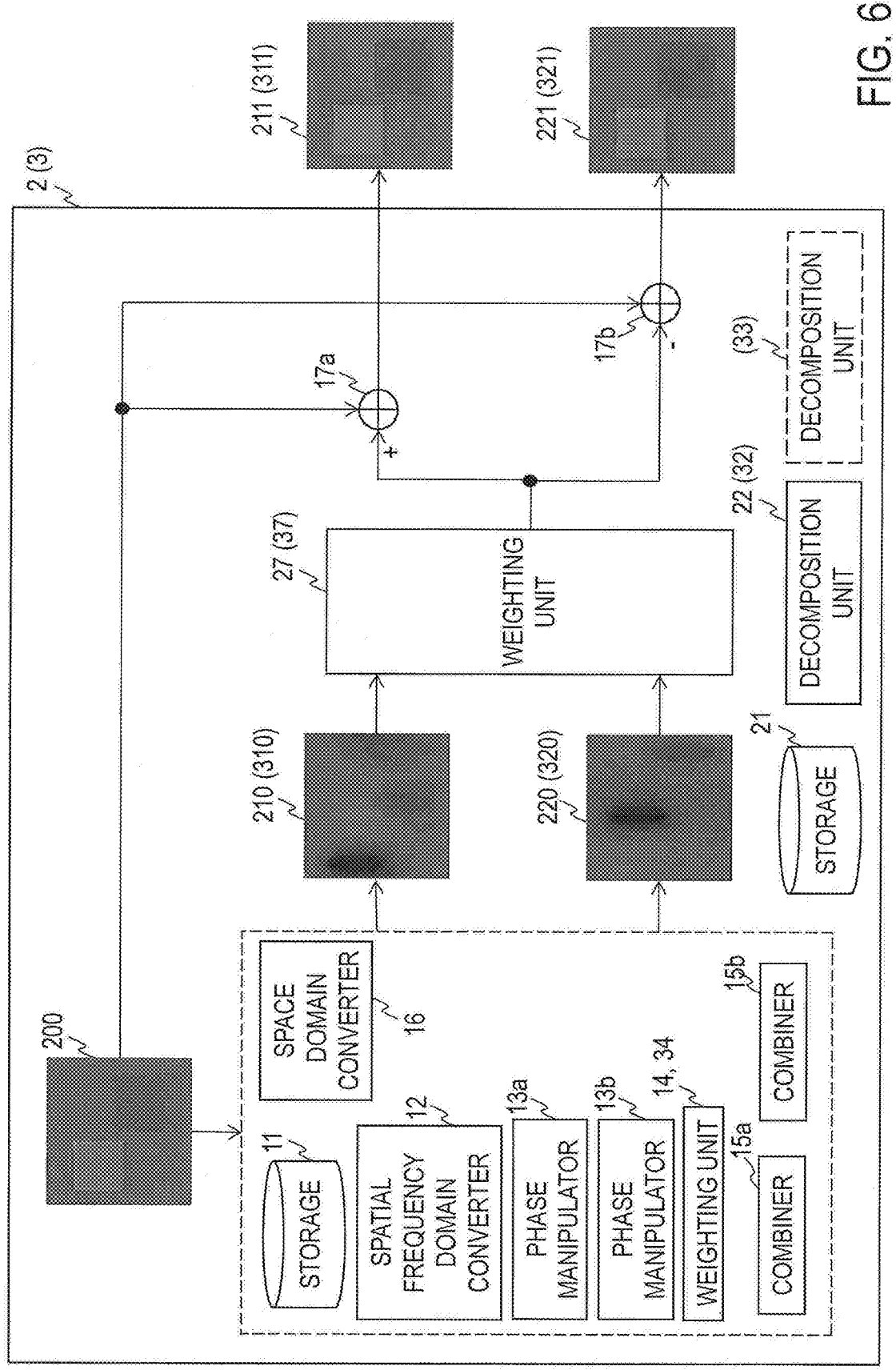
FIG. 6 is a block diagram illustrating functional configurations of image generation apparatuses 2 and 3 according to second and third embodiments.

As illustrated in FIG. 6, an image generation apparatus 2 according to this embodiment includes storages 11, 21, the spatial frequency domain converter 12, the phase manipulators 13a, 13b, weighting units 14, 27, the combining units 15a, 15b, the space domain converter 16, the superposition units 17a, 17b, and a decomposition unit 22. In this embodiment, the spatial frequency domain converter 12, the phase manipulator 13a, the weighting units 14, 27, the space domain converter 16, and the decomposition unit 22 correspond to the "first manipulator", and the spatial frequency domain converter 12, the phase manipulator 13b, the weighting units 14, 27, the space domain converter 16, and the decomposition unit 22 correspond to the "second manipulator". The image generation apparatus 2 is an apparatus embodied by execution of a predetermined program by the aforementioned computer, for example.

<Processing>

Processing by the image generation apparatus 2 is now described.

As pre-processing, the depth map Dmap (a depth map 201) described above is stored in the storage 21. Also, phase change amounts that give the depth corresponding to the maximum of the absolute values $|d(x, y)|$ of the elements of the depth map 201 are set in the phase manipulators 13a, 13b, respectively. For example, the phase change amount for the phase manipulator 13a is set to $0.5\pi$ [rad], and the phase change amount for the phase manipulator 13b is set to $-0.5\pi$ [rad].

Figure 7:
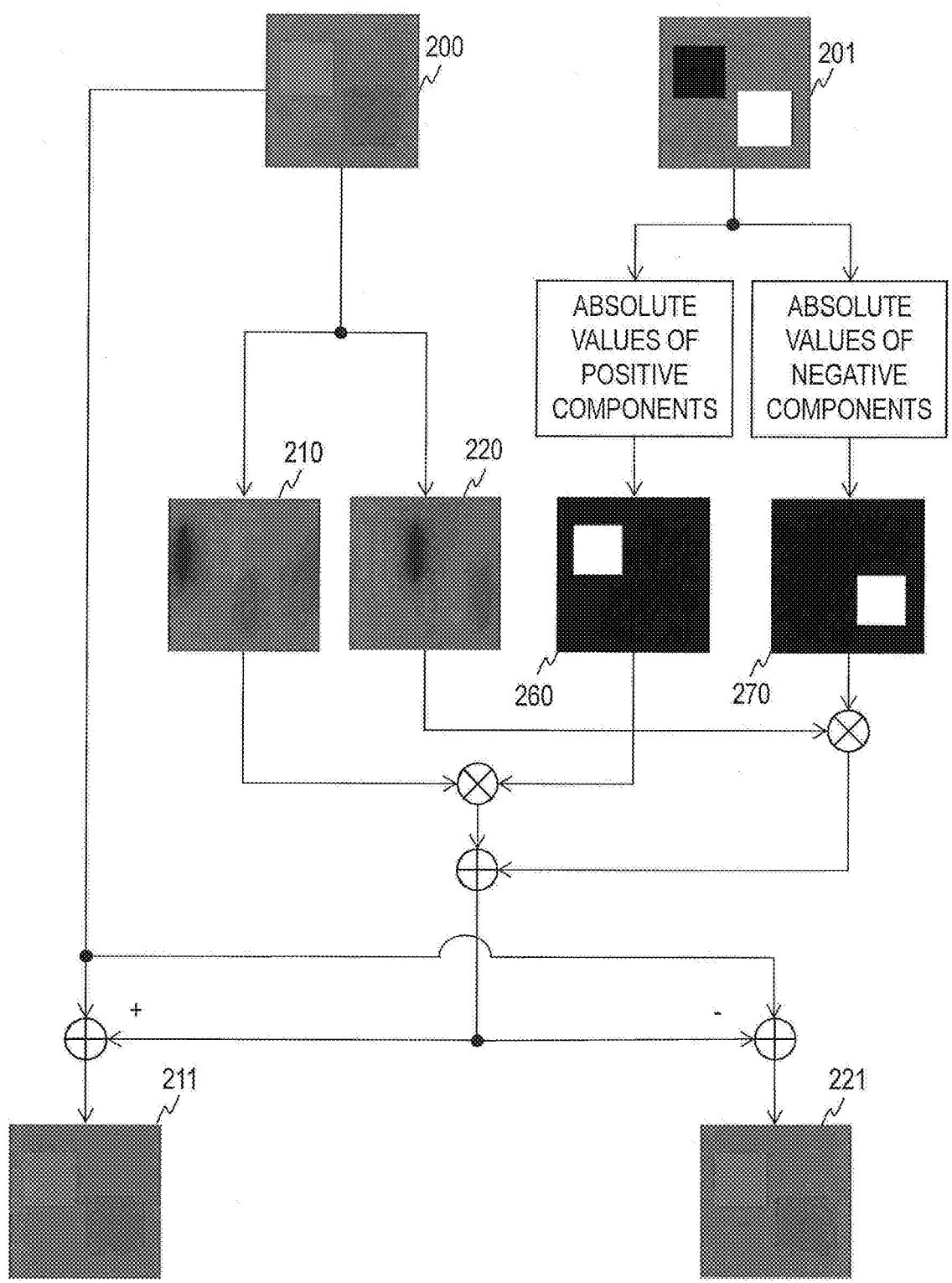
FIG. 7 is a diagram for describing the processing in the second embodiment.

Upon start of processing, the image generation apparatus 2 performs the processes at steps S12, S13a, S13b, S14, S15a, S15b, and S16 described in the first embodiment on an original image 200 instead of the original image 100 to obtain phase-modulated images 210, 220 instead of the phase-modulated images 110, 120. Here, the phase-modulated image 210 is generated by changing the phase of the original image 200 in the positive direction and giving a weight, and the phase-modulated image 220 is generated by changing the phase of the original image 200 in the negative direction and giving a weight (FIG. 7).

The decomposition unit 22 generates a positive contrast map 260 that has the absolute values of the positive components $d(x, y) > 0$ of the depth map Dmap read from the storage 21 as its elements and a negative contrast map 270 that has the absolute values of the negative components $d(x, y) < 0$ as its elements, and outputs them. The positive contrast map 260 is a two-dimensional array (two-dimensional image) in which the pixel value at coordinate (x, y) with $d(x, y) > 0$ is represented as $|d(x, y)|$ and the pixel values at the other coordinates are 0. The negative contrast map 270 is a two-dimensional array (two-dimensional image) in which the pixel value at coordinate (x, y) with $d(x, y) < 0$ is represented as $|d(x, y)|$ and the pixel values at the other coordinates are 0. The sizes of the positive contrast map 260 and the negative contrast map 270 are the same as the size of Dmap (step S22).

The weighting unit 27 takes the phase-modulated images 210, 220, the positive contrast map 260, and the negative contrast map 270 as input, and obtains a phase-modulated image 210' by multiplying the phase-modulated image 210 and the positive contrast map 260 together and also obtains a phase-modulated image 220' by multiplying the phase-modulated image 220 and the negative contrast map 270 together. The pixel value at coordinate (x, y) of the phase-modulated image 210' is the result of multiplying the pixel value at the coordinate (x, y) of the phase-modulated image 210 and the pixel value at the coordinate (x, y) of the positive contrast map 260 together. Likewise, the pixel value at coordinate (x, y) of the phase-modulated image 220' is the result of multiplying the pixel value at the coordinate (x, y) of the phase-modulated image 220 and the pixel value at the coordinate (x, y) of the negative contrast map 270 together. The weighting unit 27 further obtains a phase-modulated image 230 by adding the phase-modulated image 210' and the phase-modulated image 220'. The pixel value at coordinate (x, y) of the phase-modulated image 230 is the result of adding the pixel value at the coordinate (x, y) of the phase-modulated image 210' and the pixel value at the coordinate (x, y) of the phase-modulated image 220'. The weighting unit 27 sends the phase-modulated image 230 to the superposition unit 17a and sends a sign-inverted image of the phase-modulated image 230 to the superposition unit 17b. Here, the phase-modulated image 230 corresponds to the "image containing phase-modulated components a", which are obtained by providing the respective "first regions" of an image generated by changing the phase of the original image 200 with at least the weights corresponding to the respective "first regions". The sign-inverted image of the phase-modulated image 230 corresponds to the "image containing phase-modulated components b", which are obtained by providing the respective "second regions" of an image generated by changing the phase of the original image 200 with at least the weights corresponding to the respective "second regions" (step S27).

The superposition unit 17a takes the original image 200 and the phase-modulated image 230 as input, obtains an added image 211 (image A) by superposing the phase-modulated image 230 on the original image 200, and outputs it (step S17a). The superposition unit 17b takes the original image 200 and the sign-inverted image of the phase-modulated image 230 as input, obtains an added image 221 (image B) by superposing the sign-inverted image of the phase-modulated image 230 on the original image 200, and outputs it (step S17b).

Modification 1 of the Second Embodiment

Instead of the added images 211, 221, the image generation apparatus 2 may output the phase-modulated image 230 as the "image containing phase-modulated components a" and the sign-inverted image of the phase-modulated image 230 as the "image containing phase-modulated components b". Such "image containing phase-modulated components a" and "image containing phase-modulated components b" may be superposed on the original image 200 displayed or printed or on a "subject" corresponding to the original image 200 (the subject represented by the original image 200). In such a case, the observer I also perceives a stereo image with an apparent depth and the observer II perceives a clear image of the "subject".

Modification 2 of the Second Embodiment

The "image containing phase-modulated components a" may contain only the luminance components of the phase-modulated image 230, and the "image containing phase-modulated components b" may contain only the luminance components of the sign-inverted image of the phase-modulated image 230. For example, the image generation apparatus 2 may extract only the luminance components of the phase-modulated image 230 to obtain the "image containing phase-modulated components a" and extract only the luminance components of the sign-inverted image of the phase-modulated image 230 to obtain the "image containing phase-modulated components b". The image generation apparatus 2 may output such "image containing phase-modulated components a" and "image containing phase-modulated components b". Such "image containing phase-modulated components a" and "image containing phase-modulated components b" may be superposed on the original image 200 displayed or printed or on a "subject" corresponding to the original image 200 (the subject represented by the original image 200). In such a case, the observer I also perceives a stereo image with an apparent depth and the observer II perceives a clear image of the "subject".

Modification 3 of the Second Embodiment

The positive contrast map 260 and the negative contrast map 270 may be generated in advance and stored in the storage 21. In this case, the decomposition unit 22 and step S22 may be omitted.

Third Embodiment

This embodiment also gives different phase differences to different image regions of the original image and different depths to different image regions. This embodiment, however, performs processing that takes into account the correspondence between the spatial frequency of a phase-modulated image and the spatial frequency of the depth map 201. An advantage of considering this correspondence is discussed first.

Figure 9A:
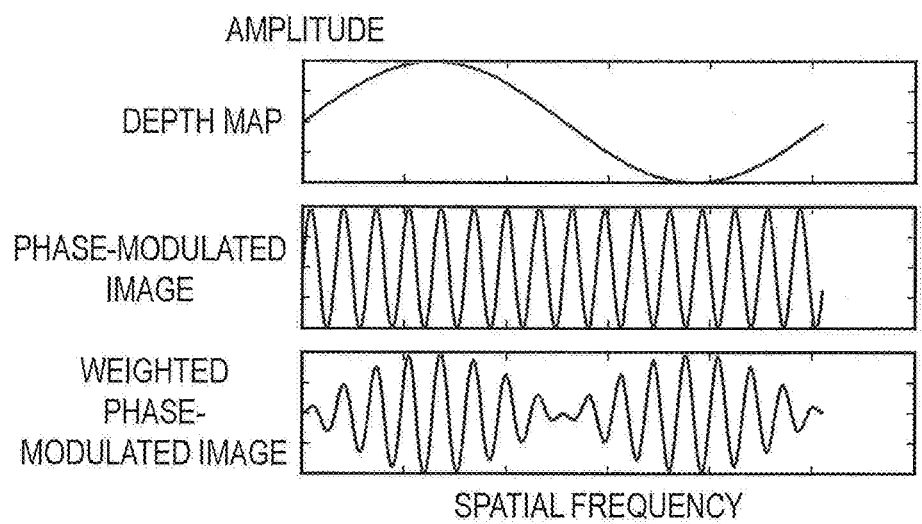
FIGS. 9A and 9B are diagrams for describing the principle of the third embodiment, with the horizontal axis in FIGS. 9A and 9B representing the spatial frequency and the vertical axis representing the amplitude.
Figure 9B:
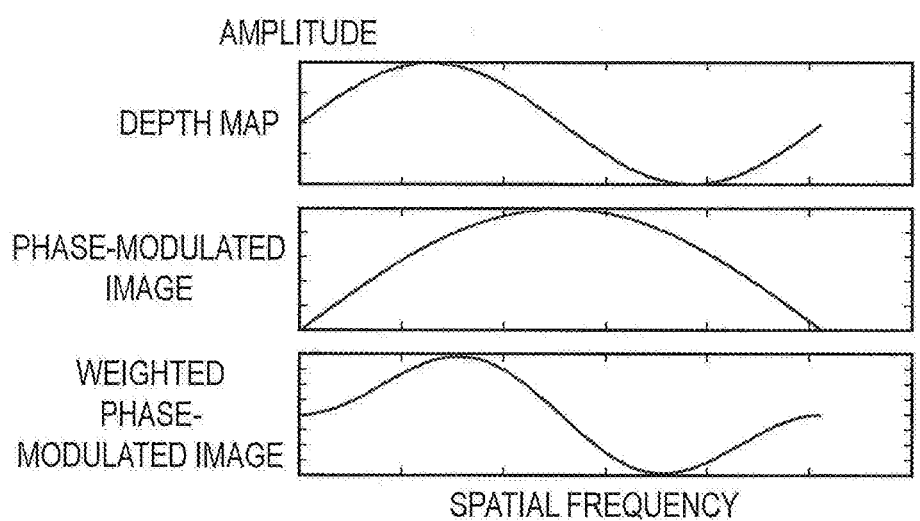

When a phase-modulated image is weighted using a depth map having spatial frequencies higher than the spatial frequencies of the phase-modulated image, high spatial frequency components that are not present in the original image will be generated. Superposing such a weighted phase-modulated image on the original image can negatively affect the way the original image looks. This will be explained taking a case of weighting a sinusoidal phase-modulated image using a sinusoidal depth map as an example (FIGS. 9A and 9B). When the spatial frequencies of the phase-modulated image are higher than the spatial frequencies of the depth map, the wavelength of the phase-modulated image is shorter than the wavelength of the depth map (FIG. 9A). In this case, the positive/negative (contrast) of the phase-modulated image is not reversed before and after the weighting even with weighting of the phase-modulated image using the depth map. Thus, by superposing the weighted phase-modulated image on the original image, the phase can be smoothly changed in term of space, enabling a perception of the desired depth. In contrast, when the spatial frequencies of the phase-modulated image are lower than the spatial frequencies of the depth map, the wavelength of the phase-modulated image is longer than the wavelength of the depth map (FIG. 9B). In this case, weighting the phase-modulated image using the depth map gives rise to segments in which the positive/negative (contrast) of the phase-modulated image is reversed before and after the weighting. Accordingly, superposition of the weighted phase-modulated image on the original image causes partial inversion of the contrast. As a result, high spatial frequency components that are not present in the original image would be added, possibly changing the way the original image looks.

To avoid this problem, this embodiment separates the depth map and the phase-modulated image per spatial frequency band, and represents the spatial frequency bands of the depth map in the form of phase by utilizing those spatial frequency bands of the phase-modulated image that are higher than the spatial frequency bands of the depth map. Specifically, those spatial frequency bands of the phase-modulated image that are lower than the spatial frequency bands of the depth map are not used. In this manner, the problem above is solved. However, even if high spatial frequency components that are not present in the original image are added, the human's visual system is not necessarily sensitive to such a change. Thus, in some cases, this scheme does not have to be employed, as in the second embodiment.

<Configuration>

As illustrated in FIG. 6, an image generation apparatus 3 according to this embodiment includes the storages 11, 21, the spatial frequency domain converter 12, the phase manipulators 13a, 13b, weighting units 34, 37, the combining units 15a, 15b, the space domain converter 16, the superposition units 17a, 17b, and decomposition units 32, 33. In this embodiment, the spatial frequency domain converter 12, the phase manipulator 13a, the weighting units 34, 37, the space domain converter 16, and the decomposition units 32, 33 correspond to the "first manipulator", and the spatial frequency domain converter 12, the phase manipulator 13b, the weighting units 34, 37, the space domain converter 16, and the decomposition units 32, 33 correspond to the "second manipulator". The image generation apparatus 3 is an apparatus embodied by execution of a predetermined program by the aforementioned computer, for example.

<Processing>

Processing by the image generation apparatus 3 is now described.

As pre-processing, the aforementioned depth map 201 is stored in the storage 21. Also, phase change amounts that give the depth corresponding to the maximum of the absolute values |d(x, y)| of the elements of the depth map 201 are set in the phase manipulators 13a, 13b, respectively.

Upon start of processing, the image generation apparatus 3 performs the steps S12, S13a, and S13b described in the first embodiment on the original image 200 instead of the original image 100 to obtain the first phase information and the second phase information.

Then, the weighting unit 34 performs the process at step S34 instead of step S14. Step S34 is different from step S14 in that it does not include weighting with the contribution rate map Fmap for spatial frequency. Adjustment of the phase change amounts relating to spatial frequency is performed based on the depth map discussed later. To the weighting unit 34, the original image 200' in the spatial frequency domain, which has been obtained by conversion of the original image 200 to the spatial frequency domain at step S12, is input. The weighting unit 34 obtains a weighted amplitude by multiplying the amplitude at each (u, v) of the original image 200' by the element at that (u, v) of Omap read from the storage 11 and giving a weight to the amplitude at that (u, v). That is, the weighting unit 34 provides each spatial frequency component of an image generated by changing the phase of the original image with the weight corresponding to the orientation of that spatial frequency component. The weighting unit 34 outputs weighted amplitude information representing the weighted amplitudes at the respective (u, v) (step S34).

Figure 8:
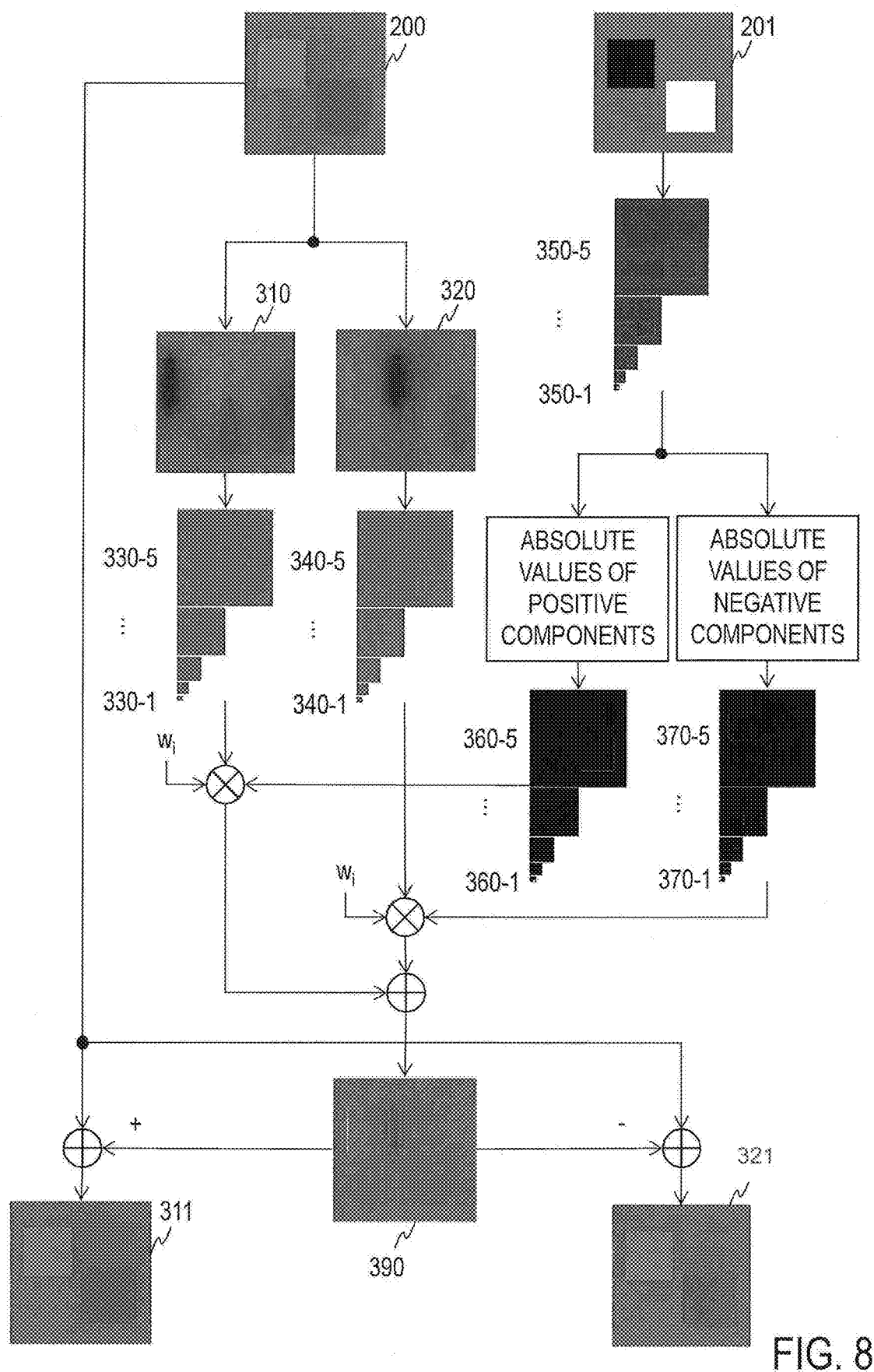
FIG. 8 is a diagram for describing the processing in the third embodiment.

The image generation apparatus 3 then performs the processes at steps S14, S15a, S15b, and S16 described in the first embodiment to obtain phase-modulated images 310, 320 instead of the phase-modulated images 110, 120. Here, the phase-modulated image 310 is generated by changing the phase of the original image 200 in the positive direction and giving a weight, and the phase-modulated image 320 is generated by changing the phase of the original image 200 in the negative direction and giving a weight (FIG. 8).

Next, the decomposition unit 33 takes the phase-modulated images 310, 320 as input, renders the phase-modulated image 310 in a multi-resolution representation, decomposes it into multiple multi-resolution images 330-$i$ of different spatial frequency bands, and outputs them. The decomposition unit 33 also renders the phase-modulated image 320 in a multi-resolution representation, decomposes it into multiple multi-resolution images 340-$i$ of different spatial frequency bands (where $i=1, \ldots$, max, max being a positive integer greater than 1), and outputs them. Here, level number $i$ is a positive integer index corresponding to each spatial frequency band. For example, using the Laplacian pyramid technique (Reference Literature 1: Burt, P. J., & Adelson, E. H., "The Laplacian Pyramid as a Compact Image Code," (1983), IEEE Transactions on Communications, 31(4), 532-540.), the decomposition unit 32 renders the phase-modulated images 310, 320 in a multi-resolution representation of five levels and obtains and outputs five-level multi-resolution images 330-1 to 330-5 and 340-1 to 340-5. The decomposition unit 33 further reads the depth map 201 from the storage 21, renders the depth map 201 in a multi-resolution representation, and obtains multiple multi-resolution images 350-$i$ of different spatial frequency bands (where $i=1, \ldots$, max). For example, the decomposition unit 33 uses the Laplacian pyramid technique to render the depth map 201 in a multi-resolution representation of five levels to obtain five-level multi-resolution images 350-1 to 350-5, and outputs them. Hereinafter, the pixel value at coordinate (x, y) of the multi-resolution image 330 with level number $i$ is denoted as $Pr_1(i, x, y)$, the pixel value at coordinate (x, y) of the multi-resolution image 340 with level number $i$ is denoted as $Pr_2(i, x, y)$, and the pixel value at coordinate (x, y) of the multi-resolution image 350 with level number $i$ is denoted as $Pr_3(i, x, y)$ (step S33).

Next, the decomposition unit 32 takes the multi-resolution images 350 as input, and generates a positive contrast map 360-$i$ (where $i=1, \ldots$, max) that has the absolute values of the positive components $dPr_3(i, x, y)>0$ for the respective multi-resolution images 350 as the elements, and a negative contrast map 370-$i$ that has the absolute values of the negative components $Pr_3(i, x, y)<0$ as the elements, and outputs them (step S32).

To the weighting unit 37, the multi-resolution images 330-$i$, 340-$i$, the positive contrast map 360-$i$, and the negative contrast map 370-$i$ (where $i=1, \ldots$, max) are input. The weighting unit 37 multiplies the multi-resolution image 330-$i$, the positive contrast map 360-$i$, and a weight $w_i$ together to obtain a positive contrast image 380a-i, and multiplies the multi-resolution image 340-i, the negative contrast map 370-i, and the weight $w_i$ together to obtain a negative contrast image 380b-i. Here, the spatial frequency bands of the multi-resolution image 330-i are higher than the spatial frequency bands of the positive contrast map 360-i. That is, the spatial frequency of the weight represented by each pixel of the positive contrast map 360-i (the spatial frequency of the weight corresponding to each of the first regions) is lower than the spatial frequency of a pixel of the multi-resolution image 330-i to which that weight is given (the spatial frequency of each of the first regions). Also, the spatial frequency bands of the multi-resolution image 340-i are higher than the spatial frequency bands of the negative contrast map 370-i. That is, the spatial frequency of the weight represented by each pixel of the negative contrast map 370-i (the spatial frequency of the weight corresponding to each of the second regions) is lower than the spatial frequency of a pixel of the multi-resolution image 340-i to which that weight is given (the spatial frequency of each of the second regions) (FIG. 9A). The weight $w_i$ (where $0 \leq w_i \leq 1$) is for adjusting the phase change amounts corresponding to the desired parallax per spatial frequency, as with the contribution rate map for spatial frequency described previously. That is, weight $w_\zeta$ corresponding to level number $i=\zeta$ is smaller than weight $w_\kappa$ corresponding to the level number $i=\kappa$ of multi-resolution images 330-κ, 340-κ of higher spatial frequency bands than those of multi-resolution images 330-ζ, 340-ζ. Every weight $w_i$ corresponding to a spatial frequency band higher than the critical spatial frequency CF may be set to 1. When every weight $w_i$ corresponding to a spatial frequency band higher than the critical spatial frequency CF is 1, the weight $w_\zeta$ corresponding to level number $i=\zeta$ is equal to or smaller than the weight $w_\kappa$ corresponding to the level number $i=\kappa$ of the multi-resolution images 330-κ, 340-κ of higher spatial frequency bands than those of the multi-resolution images 330-ζ, 340-ζ. The weighting unit 37 adds all the positive contrast images 380a-i and the negative contrast images 380b-i (where i=1, . . . , max) to obtain a phase-modulated image 390. The weighting unit 37 sends the phase-modulated image 390 to the superposition unit 17a and sends the sign-inverted image of the phase-modulated image 390 to the superposition unit 17b. Here, the phase-modulated image 390 corresponds to the "phase-modulated components a", which are obtained by providing the respective "first regions" of an image generated by changing the phase of the original image 200 with at least the weights corresponding to the respective "first regions". The sign-inverted image of the phase-modulated image 390 corresponds to the "phase-modulated components b", which are obtained by providing the respective "second regions" of an image generated by changing the phase of the original image 200 with at least the weights corresponding to the respective "second regions". Here, the spatial frequency of the weight corresponding to each of the "first regions" is lower than the spatial frequency of the "first region", and the spatial frequency of the weight corresponding to each of "second regions" is lower than the spatial frequency of the "second region" (step S37).

The superposition unit 17a takes the original image 200 and the phase-modulated image 390 as input, obtains an added image 311 (image A) by superposing the phase-modulated image 390 on the original image 200, and outputs it (step S17a). The superposition unit 17b takes the original image 200 and the sign-inverted image of the phase-modulated image 390 as input, obtains an added image 321 (image B) by superposing the sign-inverted image of the phase-modulated image 390 on the original image 200, and outputs it (step S17b).

Modification 1 of the Third Embodiment

Instead of the added images 311, 321, the image generation apparatus 3 may output the phase-modulated image 390 as the "image containing phase-modulated components a" and the sign-inverted image of the phase-modulated image 390 as the "image containing phase-modulated components b". Such "image containing phase-modulated components a" and "image containing phase-modulated components b" may be superposed on the original image 200 displayed or printed or on a "subject" corresponding to the original image 200 (the subject represented by the original image 200). In such a case, the observer I also perceives a stereo image with an apparent depth and the observer II perceives a clear planar image of the original image 200.

Modification 2 of the Third Embodiment

The "image containing phase-modulated components a" may contain only the luminance components of the phase-modulated image 390, and the "image containing phase-modulated components b" may contain only the luminance components of the sign-inverted image of the phase-modulated image 390. For example, the image generation apparatus 3 may extract only the luminance components of the phase-modulated image 390 to obtain the "image containing phase-modulated components a" and extract only the luminance components of the sign-inverted image of the phase-modulated image 390 to obtain the "image containing phase-modulated components b". The image generation apparatus 3 may output such "image containing phase-modulated components a" and "image containing phase-modulated components b". Such "image containing phase-modulated components a" and "image containing phase-modulated components b" may be superposed on the original image 200 displayed or printed or on a "subject" corresponding to the original image 200 (the subject represented by the original image 200). In such a case, the observer I also perceives a stereo image with an apparent depth and the observer II perceives a clear planar image of the original image 200.

Modification 3 of the Third Embodiment

The positive contrast map 360-i and the negative contrast map 370-i may be generated in advance and stored in the storage 21. In this case, the decomposition unit 32 and step S32 may be omitted.

Fourth Embodiment

This embodiment is a modification of the second and third embodiments and also gives different phase differences to different image regions of the original image and different depths to different image regions.

<Configuration>

Figure 10:
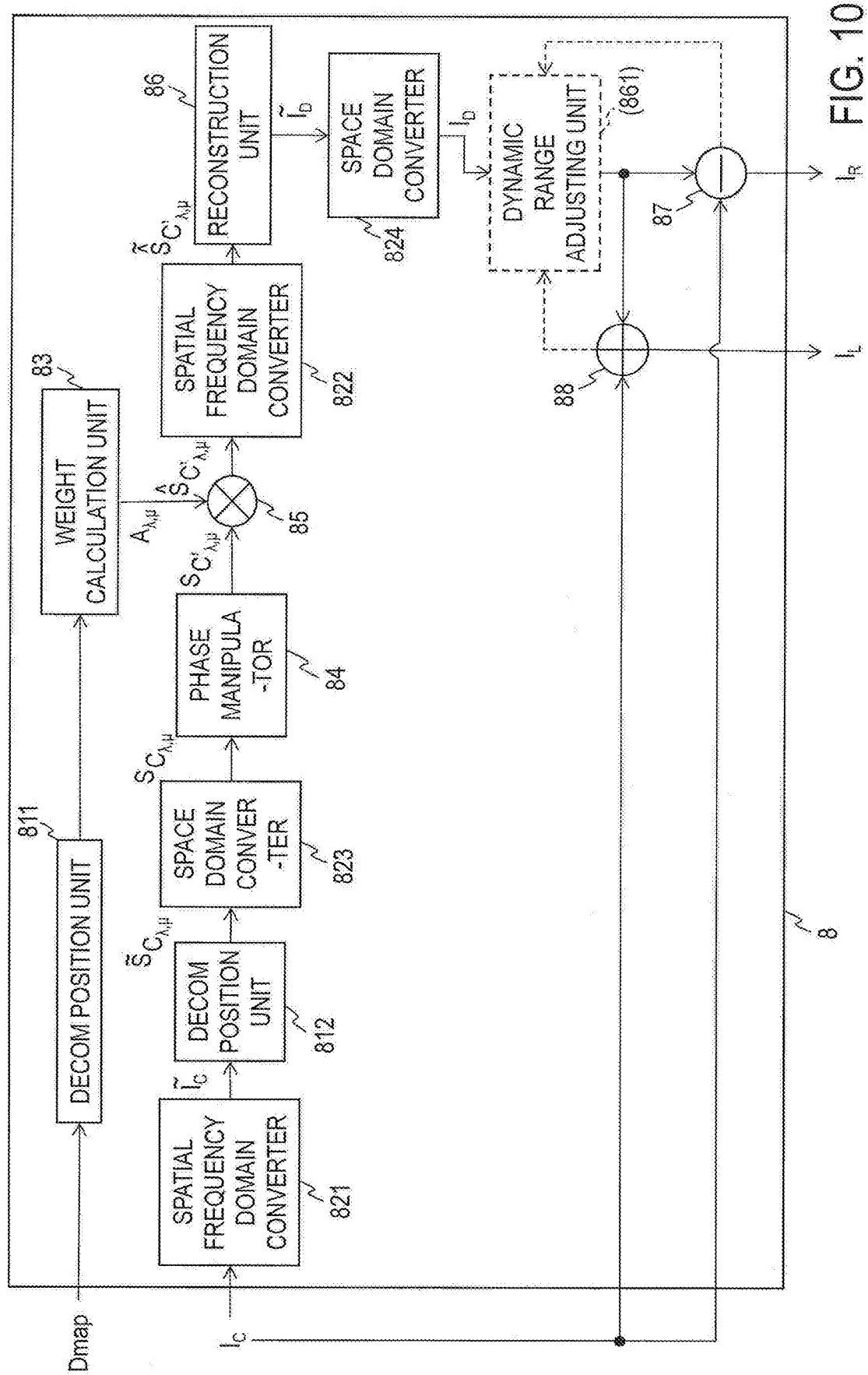
FIG. 10 is a block diagram illustrating a functional configuration of an image generation apparatus 8 according to a fourth embodiment.

As illustrated in FIG. 10, an image generation apparatus 8 according to this embodiment includes decomposition units 811, 812, spatial frequency domain converters 821, 822, space domain converters 823, 824, a weight calculation unit 83, a phase manipulator 84, a weighting unit 85, a reconstruction unit 86, and superposition units 87, 88. In this embodiment, the decomposition units 811, 812, the spatial frequency domain converters 821, 822, the space domain converters 823, 824, the weight calculation unit 83, the phase manipulator 84, the weighting unit 85, the reconstruction unit 86, and the superposition unit 87 correspond to the "first manipulator", and the decomposition units 811, 812, the spatial frequency domain converters 821, 822, the space domain converters 823, 824, the weight calculation unit 83, the phase manipulator 84, the weighting unit 85, the reconstruction unit 86, and the superposition unit 88 correspond to the "second manipulator". The image generation apparatus 8 is an apparatus embodied by execution of a predetermined program by the aforementioned computer, for example.

<Processing>

Processing by the image generation apparatus 8 is now described.

To the image generation apparatus 8, an original image $I_C$ (FIG. 13A) and the parallax map Dmap described above (FIG. 13B) are input. The original image $I_C$ is a two-dimensional array having $I_C(x, y)$ as the elements (pixels). The original image $I_C$ may be a still image or an image of each frame of a moving image, and may be read from an external storage device or from a storage device (not shown) of the image generation apparatus 8. The parallax map Dmap is a two-dimensional array (a two-dimensional gradation image) having $d(x, y)$ as the elements (pixels). Here, the size of Dmap is the same as the size of the original image $I_C$; x represents the horizontal coordinate in space domain, and y represents the vertical coordinate in space domain, where $x_{min} \leq x \leq x_{max}$, $y_{min} \leq y \leq y_{max}$, $x_{min} < x_{max}$, and $y_{min} < y_{max}$ are satisfied. $d(x, y)$ is one of a positive value, a negative value, and zero. In Dmap, a region with $d(x, y) > 0$ represents a parallax that is seen on the front side of a display surface or screen surface (a crossed parallax), while a region with $d(x, y) < 0$ represents a parallax that is seen on the back side of the display surface or screen surface (an uncrossed parallax), where a greater absolute value $|d(x, y)|$ means a greater parallax. Using such a Dmap, a desired parallax can be given to each image region.

The original image $I_C$ is input to the spatial frequency domain converter 821. The spatial frequency domain converter 821 converts the original image $I_C$ to an original image $I_C^\sim$ in the spatial frequency domain and outputs the original image $I_C^\sim$. Here, the original image $I_C^\sim$ in the spatial frequency domain is a two-dimensional array having $I_C^\sim(\omega_x, \omega_y)$ as the elements. $\omega_x$ represents the spatial frequency in the horizontal direction and $\omega_y$ represents the spatial frequency in the vertical direction. For conversion of the original image $I_C$ to the original image $I_C^\sim$, discrete Fourier transform may be used, for example. Note that correctly the superscript "~" of "$I_C^\sim$" should be placed immediately above "I". However, due to limitation of denotation in the specification, "~" may be sometimes placed upper right of "$I_C$" (step S821).

The original image $I_C^\sim$ in the spatial frequency domain is input to the decomposition unit 812. The decomposition unit 812 applies a complex steerable filter sequence $\Psi$ to the original image $I_C^\sim$ to obtain complex steerable pyramids. Here, the steerable filter sequence $\Psi$ is composed of steerable filters $\Psi_{\lambda,\mu}$ corresponding to a spatial frequency band $\lambda$ and an orientation band $\mu$. Here, $\lambda$ is an integer index corresponding to a spatial frequency band with a predetermined width, and $\mu$ is an integer index corresponding to an orientation band with a predetermined width. $\lambda_{min} \leq \lambda \leq \lambda_{max}$, $\mu_{min} \leq \mu \leq \mu_{max}$, $\lambda_{min} < \lambda_{max}$, and $\mu_{min} < \mu_{max}$ are satisfied. A smaller value of $\lambda$ corresponds to a frequency band of a lower frequency. As shown below, the decomposition unit 812 multiplies the original image $I_C^\sim$ by the steerable filter $\Psi_{\lambda,\mu}$ for all the combinations of $\lambda$ and $\mu$ to obtain complex steerable pyramids $S_{C\lambda,\mu}^\sim$ corresponding to the respective spatial frequency bands $\lambda$ and orientation bands $\mu$, and outputs them.

$$\tilde{S}_{C_{\lambda,\mu}} = \tilde{I}_C \Psi_{\lambda,\mu} \quad (4)$$

Note that correctly the superscript "~" of "$S_{C\lambda,\mu}^\sim$" should be placed immediately above "S" (see Formula (4)). However, due to limitation of denotation in the specification, "~" may be sometimes placed upper right of "$S_{C\lambda,\mu}$". Likewise, correctly the subscript "C$\lambda,\mu$" of "$S_{C\lambda,\mu}^\sim$" should be denoted as "$C_{\lambda,\mu}$" (see Formula (4)). However, due to limitation of denotation in the specification, it may be sometimes denoted as "C$\lambda,\mu$" (step S812).

The complex steerable pyramids $S_{C\lambda,\mu}^\sim$ are input to the space domain converter 823. The space domain converter 823 converts the complex steerable pyramids $S_{C\lambda,\mu}^\sim$ to complex steerable pyramids $S_{C\lambda,\mu}$ in the space domain and outputs the complex steerable pyramids $S_{C\lambda,\mu}$. For conversion of the complex steerable pyramids $S_{C\lambda,\mu}^\sim$ to the complex steerable pyramids $S_{C\lambda,\mu}$, discrete inverse Fourier transform may be used, for example. Each complex steerable pyramid $S_{C\lambda,\mu}$ is a two-dimensional array having $S_{C\lambda,\mu}(x, y)$ as the elements (pixels) (step S823).

The complex steerable pyramids $S_{C\lambda,\mu}$ in the space domain are input to the phase manipulator 84. The phase manipulator 84 extracts the imaginary part $\text{Im}[S_{C\lambda,\mu}(x, y)]$ of each complex steerable pyramid Sc., t, obtains a phase-shifted image $S_{C'\lambda,\mu}$ corresponding to each spatial frequency band $\lambda$ and each orientation band $\mu$ as shown below, and outputs them (FIG. 13C).

$$S_{C'_{\lambda,\mu}}(x, y) = \begin{cases} \text{Im}[S_{C_{\lambda,\mu}}(x, y)] & \text{if } \theta_\mu \leq \pi/2 \\ -\text{Im}[S_{C_{\lambda,\mu}}(x, y)] & \text{if } \theta_\mu > \pi/2 \end{cases} \quad (5)$$

Figure 12:
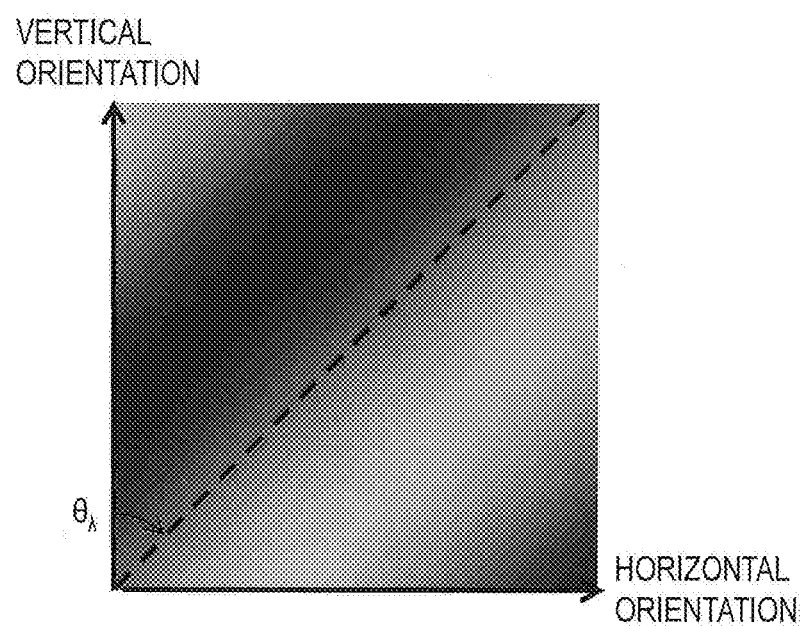
FIG. 12 is a diagram for describing orientation $\theta_\mu$ in the space domain.

Here, each phase-shifted image $S_{C'\lambda,\mu}$ is a two-dimensional array having $S_{C'\lambda,\mu}(x, y)$ as the elements (pixels). Correctly, the subscript "C'$\lambda,\mu$" of "$S_{C'\lambda,\mu}$" should be denoted as "$C'_{\lambda,\mu}$" (see Formula (5)). However, due to limitation of denotation in the specification, it may be sometimes denoted as "C'$\lambda,\mu$". $\theta_\mu$ means an orientation that corresponds to the component with the strongest power among the orientations contained in the orientation band $\mu$ (the peak orientation). An example of $\theta_\mu$ is the orientation at the center of the orientation band. As shown in FIG. 12, $\theta_\mu$ is an angle formed by a lattice in the space domain composed of a certain spatial frequency component relative to the vertical orientation, satisfying $0 \leq \theta_\mu \leq \pi$. The phase of the phase-shifted image $S_{C'\lambda,\mu}$ is equivalent to the phase of the sinusoidal component corresponding to the spatial frequency band $\lambda$ and orientation band $\mu$ of the original image $I_C$ as shifted in the positive direction by $0.5\pi$ [rad]. In Formula (5), the inversion of the positive/negative sign when $\theta_\mu > \pi/2$ is intended for shifting the phase in the same direction (the positive direction) by $0.51\pi$ [rad] within the range of $0 \leq \theta_\mu \leq \pi/2$ and the range of $\pi \geq \theta_\mu > \pi/2$ (step S84).

The parallax map Dmap input to the image generation apparatus 8 (FIG. 10) is input to the decomposition unit 811. The decomposition unit 811 applies a Gaussian filter sequence to the parallax map Dmap to obtain Gaussian pyramids $G_{D\lambda}(x, y)$ of the parallax map Dmap, and outputs them (FIG. 13D). The Gaussian pyramid $G_{D\lambda}$ contains the spatial frequencies corresponding to the spatial frequency band λ and spatial frequency bands lower than it. That is, $G_{D\lambda}(x, y)$ represents the value of each coordinate (x, y) in Gaussian pyramids of the parallax map Dmap that correspond to the spatial frequency band λ corresponding to co and spatial frequency bands lower than the spatial frequency band λ. Note that correctly the subscript "Dλ" of "$G_{D\lambda}$" should be denoted as "$D_\lambda$". However, due to limitation of denotation in the specification, it may sometimes be denoted as "Dλ" (step S811).

The Gaussian pyramids $G_{D\lambda}(x, y)$ are input to the weight calculation unit 83. The weight calculation unit 83 obtains a weight image $A_{\lambda,\mu}$, which is a two-dimensional array having the respective weights $A_{\lambda,\mu}(x, y)$ as the elements, as shown below, and outputs it.

$$A_{\lambda,\mu}(x, y) = \tan\frac{G_{D_\lambda}(x, y)\omega_\lambda|\cos\theta_\mu|}{2} \qquad (6)$$

Here, $\omega_\lambda$ means a spatial frequency that corresponds to the component with the strongest power among the spatial frequencies contained in the spatial frequency band λ (the peak spatial frequency). An example of $\omega_\lambda$ is the spatial frequency at the center of the spatial frequency band λ (step S83).

The phase-shifted image $S_{C'\lambda,\mu}$ and the weight image $A_{\lambda,\mu}$ are input to the weighting unit 85. The weighting unit 85 multiplies each weight $A_{\lambda,\mu}(x, y)$ of the weight image $A_{\lambda,\mu}$ and the element $S_{C'\lambda,\mu}(x, y)$ of the phase-shifted image $S_{C'\lambda,\mu}$ together as shown below to obtain a weighted image $\hat{S}_{C'\lambda,\mu}$, which is a two-dimensional array having the respective $\hat{S}_{C'\lambda,\mu}(x, y)$ as the elements, and outputs it.

$$\hat{S}_{C'_{\lambda,\mu}}(x, y) = A_{\lambda,\mu}(x, y)S_{C'_{\lambda,\mu}}(x, y) \qquad (7)$$

Note that correctly the superscript "^" of "S^" should be placed immediately above "S" (see Formula (7)). However, due to limitation of denotation in the specification, "^" may sometimes be placed upper right of "S" (step S85).

The weighted image $\hat{S}_{C'\lambda,\mu}$ is input to the spatial frequency domain converter 822. The spatial frequency domain converter 822 converts the weighted image $\hat{S}_{C'\lambda,\mu}$ to a weighted image $\tilde{\hat{S}}_{C'\lambda,\mu}$ in the spatial frequency domain, and outputs the weighted image $\tilde{\hat{S}}_{C'\lambda,\mu}$. While the denotation "$\hat{S}^\sim_{C'\lambda,\mu}$" may be sometimes used due to limitation of denotation in the specification, "$\hat{S}^\sim_{C'\lambda,\mu}$" is synonymous with:

$$\tilde{\hat{S}}_{C'_{\lambda,\mu}}$$

For conversion of the weighted image $\hat{S}_{C'\lambda,\mu}$ to the weighted image $\tilde{\hat{S}}_{C'\lambda,\mu}$, discrete Fourier transform may be used, for example (step S822).

The weighted image $\tilde{\hat{S}}_{C'\lambda,\mu}$ is input to the reconstruction unit 86. The reconstruction unit 86 applies the steerable filter sequence Ψ described above to the weighted image $\tilde{\hat{S}}_{C'\lambda,\mu}$ as shown below to obtain a phase-modulated image $\tilde{I}_D$ in the spatial frequency domain, and outputs it (step S86).

$$\tilde{I}_D = \sum_{\lambda,\mu} \Psi_{\lambda,\mu} \tilde{\hat{S}}_{C'_{\lambda,\mu}} \qquad (8)$$

The phase-modulated image $\tilde{I}_D$ in the spatial frequency domain is input to the space domain converter 824. The space domain converter 824 converts phase-modulated image $\tilde{I}_D$ in the spatial frequency domain to a phase-modulated image $I_D$ in the space domain and outputs the phase-modulated image $I_D$ (FIG. 13E). Here, the phase-modulated image $I_D$ is a two-dimensional array having $I_D(x, y)$ as the elements (pixels). For conversion of the phase-modulated image $\tilde{I}_D$ to the phase-modulated image $I_D$, discrete inverse Fourier transform may be used, for example (step S824).

The superposition unit 87 takes the original image $I_C$ and the phase-modulated image $I_D$ as input, and obtains an added image $I_R$ (image A) by superposing the sign-inverted image of the phase-modulated image $I_D$ (the phase-modulated components a) on the original image $I_C$, and outputs it (FIG. 13G). When the value of the parallax map Dmap is positive (a crossed parallax) in a certain region, the phase of the phase-modulated image $I_D$ in the corresponding region has been shifted relative to the phase of the original image $I_C$ in the positive direction by 0.5π [rad]. Thus, the phase of the sign-inverted image of the phase-modulated image $I_D$ (the phase-modulated components a) in this region is equivalent to the phase of the original image $I_C$ as moved in the negative direction by 0.5π [rad]. In contrast, when the value of the parallax map Dmap is negative in a certain region, the phase of the phase-modulated image $I_D$ in the corresponding region has been shifted relative to the phase of the original image $I_C$ in the negative direction by 0.5π [rad]. Thus, the phase of the sign-inverted image of the phase-modulated image $I_D$ (the phase-modulated components a) in this region is equivalent to the phase of the original image $I_C$ as moved in the positive direction by 0.5π [rad]. The pixel value $I_R(x, y)$ at each coordinate (x, y) of the added image $I_R$ is a value equal to the pixel value $I_C(x, y)$ at that coordinate (x, y) of the original image $I_C$ minus the pixel value $I_D(x, y)$ at that coordinate (x, y) of the sign-inverted image of the phase-modulated image $I_D$ ($I_R(x, y)=I_C(x, y)-I_D(x, y)$). The sign-inverted image of the phase-modulated image $I_D$ and the added image $I_R$ correspond to the "image containing phase-modulated components a", which are obtained by providing the respective "first regions" of an image generated by changing the phase of the original image $I_C$ with at least the weights corresponding to the respective "first regions" (step S87).

The superposition unit 88 takes the original image $I_C$ and the phase-modulated image $I_D$ as input, obtains an added image $I_L$ (image B) by superposing the original image $I_C$ and the phase-modulated image $I_D$(phase-modulated components b), and outputs it (FIG. 13F). The phase-modulated components b are the opposite phase image of the phase-modulated components a. When the value of the parallax map Dmap is positive (a crossed parallax) in a certain region, the phase of the phase-modulated image $I_D$ in the corresponding region has been shifted relative to the phase of the original image $I_C$ in the positive direction by 0.5π [rad]. Thus, the phase of the phase-modulated components b in this region is equivalent to the phase of the original image $I_C$ as moved in the positive direction by 0.5π [rad]. In contrast, when the value of the parallax map Dmap is negative in a certain region, the phase of the phase-modulated image $I_D$ in the corresponding region has been shifted relative to the phase of the original image $I_C$ in the negative direction by $0.5\pi$ [rad]. Thus, the phase of the phase-modulated components b in this region is equivalent to the phase of the original image $I_C$ as moved in the negative direction by $0.5\pi$ [rad]. The pixel value $I_L(x, y)$ at each coordinate (x, y) of the added image $I_L$ is the sum of the pixel value $I_C(x, y)$ at that coordinate (x, y) of the original image $I_C$ and the pixel value $I_D(x, y)$ at that coordinate (x, y) of the phase-modulated image $I_D$ ($I_L(x, y)=I_C(x, y)+I_D(x, y)$). The phase-modulated image $I_D$ and the added image $I_L$ correspond to the "image containing phase-modulated components b", which are obtained by providing the respective "second regions" of an image generated by changing the phase of the original image $I_C$ with at least the weights corresponding to the respective "second regions" (step S88).

Modification 1 of the Fourth Embodiment

Theoretically, the maximum parallax between the added images $I_R$, $I_L$ is a half wavelength of each wavelength. However, to obtain a shift width of half wavelength, the aforementioned weight $A_{\lambda,\mu}(x, y)$ needs to be infinite, which is not practical. Thus, the absolute value of the phase shift amounts for the added images $I_R$, $I_L$ relative to the original image $I_C$ may be both limited to $\pi/4$ [rad] or less. Under this limitation, the absolute value of the weight $A_{\lambda,\mu}(x, y)$ is 1 or less and the absolute value of the parallax between the added images $I_R$, $I_L$ is less than $\pi/(2\omega_\lambda|\cos\theta_\mu|)$. In this case, the weight calculation unit 83 (FIG. 10) obtains a weight image $A_{\lambda,\mu}$ which is a two-dimensional array having the respective weights $A_{\lambda,\mu}(x, y)$ as the elements by Formula (9) below instead of Formula (6) and outputs it.

$$A_{\lambda,\mu}(x, y) = \tan\frac{\hat{G}_{D_\lambda}(x, y)\omega_\lambda|\cos\theta_\mu|}{2} \quad (9)$$

where, $$\hat{G}_{D_\lambda}(x, y) = \begin{cases} \frac{\pi}{2\omega_\lambda|\cos\theta_\mu|} & \text{if } G_{D_\lambda}(x, y) > \frac{\pi}{2\omega_\lambda|\cos\theta_\mu|} \\ -\frac{\pi}{2\omega_\lambda|\cos\theta_\mu|} & \text{if } G_{D_\lambda}(x, y) < -\frac{\pi}{2\omega_\lambda|\cos\theta_\mu|} \\ G_{D_\lambda}(x, y) & \text{otherwise} \end{cases}$$

When this modification is applied, comparing the weights for the spatial frequency bands contained in the same orientation band, the weight corresponding to spatial frequency band $\lambda_1$ (the first spatial frequency band) having a certain spatial frequency $\omega_{\lambda,1}$ as its peak is equal to or smaller than the weight corresponding to a spatial frequency band $\lambda_2$ (the second spatial frequency band) having a spatial frequency $\omega_{\lambda,2}$ higher than the spatial frequency band $\lambda_1$ as its peak (that is, $\omega_{\lambda,2}>\omega_{\lambda,1}$). Also, comparing the weights for the orientation bands contained in the same spatial frequency band, the weight corresponding to an orientation band $\mu_1$ (the first orientation band) having a certain orientation $\theta_{\mu,1}$ as its peak is equal to or smaller than the weight corresponding to an orientation band $\mu_2$ (the second orientation band) having an orientation $\theta_{\mu,2}$ closer to the vertical orientation (0 or $\pi$) than the orientation band $\mu_1$ as its peak (that is, $|\theta_{\mu,2}-\pi/2|>|\theta_{\mu,1}-\pi/2|$). The other aspects are as described in the fourth embodiment.

Modification 2 of the Fourth Embodiment

In the fourth embodiment, the sign-inverted image of the phase-modulated image $I_D$ and the phase-modulated image $I_D$ are superposed on the original image $I_C$ respectively, thereby obtaining the added images $I_R$ and $I_L$ having a parallax relative to each other. The amplitude of the added images $I_R$ and $I_L$ obtained in this manner is greater than the amplitude of the original image $I_C$, and the added images $I_R$ and $I_L$ may exceed a predetermined lower limit $b_L$ and/or upper limit $b_U$ ($b_L<b_U$), that is, exceed a predetermined dynamic range. A simple remedy for this can be linearly compressing the overall intensities of the added images $I_R$ and $I_L$ in order to confine the added images $I_R$ and $I_L$ within the range between the lower limit $b_L$ and the upper limit $b_U$. With this simple remedy, however, the contrast of the added images $I_R$ and $I_L$ becomes smaller than that of the original image $I_C$, altering the impression of the image. Another possible remedy is to remove those portions of the added images $I_R$ and $I_L$ that are outside the lower limit $b_L$ and/or upper limit $b_U$. In this case, however, the parallax components of the added images $I_R$ and $I_L$ are not canceled by each other and a doubly blurred image can be perceived when the added images $I_R$ and $I_L$ are seen by both eyes at a time. Thus, in the modification 2, phase-modulated images $I_D$ corresponding to those portions of the added images $I_R$ and $I_L$ that are outside the lower limit $b_L$ or the upper limit $b_U$ are clipped.

This is described more specifically. In the modification 2, the image generation apparatus 8 further includes a dynamic range adjusting unit 861 (FIG. 10). The dynamic range adjusting unit 861 takes the phase-modulated image $I_D$ and the added images $I_R$, $I_L$ obtained by the superposition units 87, 88 as input, updates the phase-modulated image $I_D$ to a phase-modulated image $\hat{I}_D$ as shown below, and outputs it.

$$\hat{I}_D(x,y)=I_D(x,y)-M_U(x,y)-M_L(x,y) \quad (10)$$

Here, the phase-modulated image $\hat{I}_D$ is a two-dimensional array composed of elements $\hat{I}_D(x, y)$, and $M_U(x, y)=\max(\max(I_R(x, y)-b_U, 0), \max(I_L(x, y)-b_U, 0))$, $M_L(x, y)=\min(\min(I_R(x, y)-b_L, 0), \min(I_L(x, y)-b_L, 0))$. $\max(\alpha1, \alpha2)$ represents the greater value of $\alpha1$ and $\alpha2$, and $\min(\alpha1, \alpha2)$ represents the lesser value of $\alpha1$ and $\alpha2$. Correctly, "^" of "$I_D$^" should be placed immediately above "I" (see Formula (10)). However, due to limitation of denotation in the specification, "^" may be sometimes placed upper right of "$I_D$".

In this case, the superposition unit 87 further takes the original image $I_C$ and the phase-modulated image $\hat{I}_D$ as input, and obtains an added image $I_R$ (image A) by superposing the sign-inverted image of the phase-modulated image $\hat{I}_D$ (the phase-modulated components a) on the original image $I_C$, and outputs it. The pixel value $I_R(x, y)$ at each coordinate (x, y) of the added image $I_R$ is a value equal to the pixel value $I_C(x, y)$ at the coordinate (x, y) of the original image $I_C$ minus the pixel value $I_D(x, y)$ at the coordinate (x, y) of the phase-modulated image $\hat{I}_D$ ($I_R(x, y)=I_C(x, y)-\hat{I}_D(x, y)$). In this case, the added image $I_R$ obtained at step S87 as described above is not output as the image A.

The superposition unit 88 further takes the original image $I_C$ and the phase-modulated image $\hat{I}_D$ as input, and obtains an added image $I_L$ (image B) by superposing the original image $I_C$ and the phase-modulated image $\hat{I}_D$ (phase-modulated components b), and outputs it. The pixel value $I_L(x, y)$ at each coordinate (x, y) of the added image $I_L$ is the sum of the pixel value $I_C(x, y)$ at the coordinate (x, y) of the original image $I_C$ and the pixel value $I_D(x, y)$ at the coordinate (x, y) of the phase-modulated image $\hat{I}_D$ ($I_L(x, y)=I_C(x, y)+\hat{I}_D(x, y)$). In this case, the added image $I_L$ obtained at step S88 as described above is not output as the image B.

Modification 3 of the Fourth Embodiment

Instead of the added images $I_R$, $I_L$, the image generation apparatus 8 may output the sign-inverted image of the phase-modulated image $I_D$ as the "image containing phase-modulated components a" and the phase-modulated image $I_D$ as the "image containing phase-modulated components b". Such "image containing phase-modulated components a" and "image containing phase-modulated components b" may be superposed on the original image $I_C$ displayed or printed or on a "subject" corresponding to the original image $I_C$ (the subject represented by the original image $I_C$). In such a case, the observer I also perceives a stereo image with an apparent depth and the observer II perceives a clear planar image of the original image $I_C$.

Modification 4 of the Fourth Embodiment

The "phase-modulated components a" may contain only the luminance components of the sign-inverted image of the phase-modulated image $I_D$, and the "phase-modulated components b" may contain only the luminance components of the phase-modulated image $I_D$. For example, the image generation apparatus 8 may extract only the luminance components of the sign-inverted image of the phase-modulated image $I_D$ to obtain the "phase-modulated components a" and extract only the luminance components of the phase-modulated image $I_D$ to obtain the "phase-modulated components b". The image generation apparatus 8 may output such "image containing phase-modulated components a" and "image containing phase-modulated components b". Such "image containing phase-modulated components a" and "image containing phase-modulated components b" may be superposed on the original image $I_C$ displayed or printed or on a "subject" corresponding to the original image $I_C$ (the subject represented by the original image $I_C$). In such a case, the observer I also perceives a stereo image with an apparent depth and the observer II perceives a clear planar image of the original image $I_C$.

Modification 5 of the Fourth Embodiment

When the original image $I_C$ is a color image, the processes at steps S821, S812, S823, S84, S85, S822, S86, S824, S87, and S88 in the fourth embodiment may be performed for each of the color channels (R, G, and B channels) and the added images $I_R$ (images A) and added images $I_L$ (images B) of all the color channels may be output. The modifications 1 to 4 of the fourth embodiment may also be implemented where the original image $I_C$ is a color image, in which case the processes of modifications 2 and 3 are performed for each color channel.

Modification 6 of the Fourth Embodiment

In the fourth embodiment, the phase-shifted image $S_{C\lambda,\mu}$ is generated by shifting the phase of the original image $I_C$ in the positive direction by $0.5\pi$ [rad] (Formula (5)). However, the phase-shifted image $S_{C\lambda,\mu}$ may be generated by shifting the phase of the original image $I_C$ in the positive direction by a neighborhood of $0.5\pi$. In this case, the phase of a region in the sign-inverted image of the phase-modulated image $I_D$ (the phase-modulated components a) that corresponds to a region for which the value of parallax map Dmap is positive (a crossed parallax) is equivalent to a shift in the negative direction by a neighborhood of $0.5\pi$ [rad] relative to the phase of a region in the sign-inverted image of the phase-modulated image $I_D$ (the phase-modulated components a) that corresponds to a region for which the value of parallax map Dmap is negative is equivalent to a shift in the positive direction by a neighborhood of $0.5\pi$ [rad] relative to the phase of the original image $I_C$. The phase of a region in the phase-modulated image $I_D$ (phase-modulated components b) that corresponds to a region for which the value of parallax map Dmap is positive (a crossed parallax) is equivalent to a shift in the positive direction by a neighborhood of $0.5\pi$ [rad] relative to the phase of the original image $I_C$. Meanwhile, the phase of a region in the phase-modulated image $I_D$ (phase-modulated components b) that corresponds to a region for which the value of parallax map Dmap is negative is equivalent to a shift in the negative direction by a neighborhood of $0.5\pi$ [rad] relative to the phase of the original image $I_C$. Also, instead of the phase-modulated components a being the sign-inverted image of the phase-modulated image $I_D$ and the phase-modulated components b being the phase-modulated image $I_D$, the phase-modulated components a may be the sign-inverted image of the phase-modulated image $I_D$ and the phase-modulated components b may be an image in the neighborhood of the opposite phase of the phase-modulated components a.

Fifth Embodiment

An enormous amount of stereo image content used in the conventional binocular image presentation schemes exists. This embodiment shows a method for converting conventional stereo image content to the added image $I_R$ (image A) and added image $I_L$ (image B). A simple method is to calculate the parallax map Dmap from an image having a binocular parallax for conventional stereo image content and use the map to perform the process of the fourth embodiment to obtain the added image $I_R$ (image A) and added image $I_L$ (image B). This embodiment however obtains the added image $I_R$ (image A) and added image $I_L$ (image B) from conventional stereo image content in a simpler manner without generating the parallax map Dmap.

Figure 11:
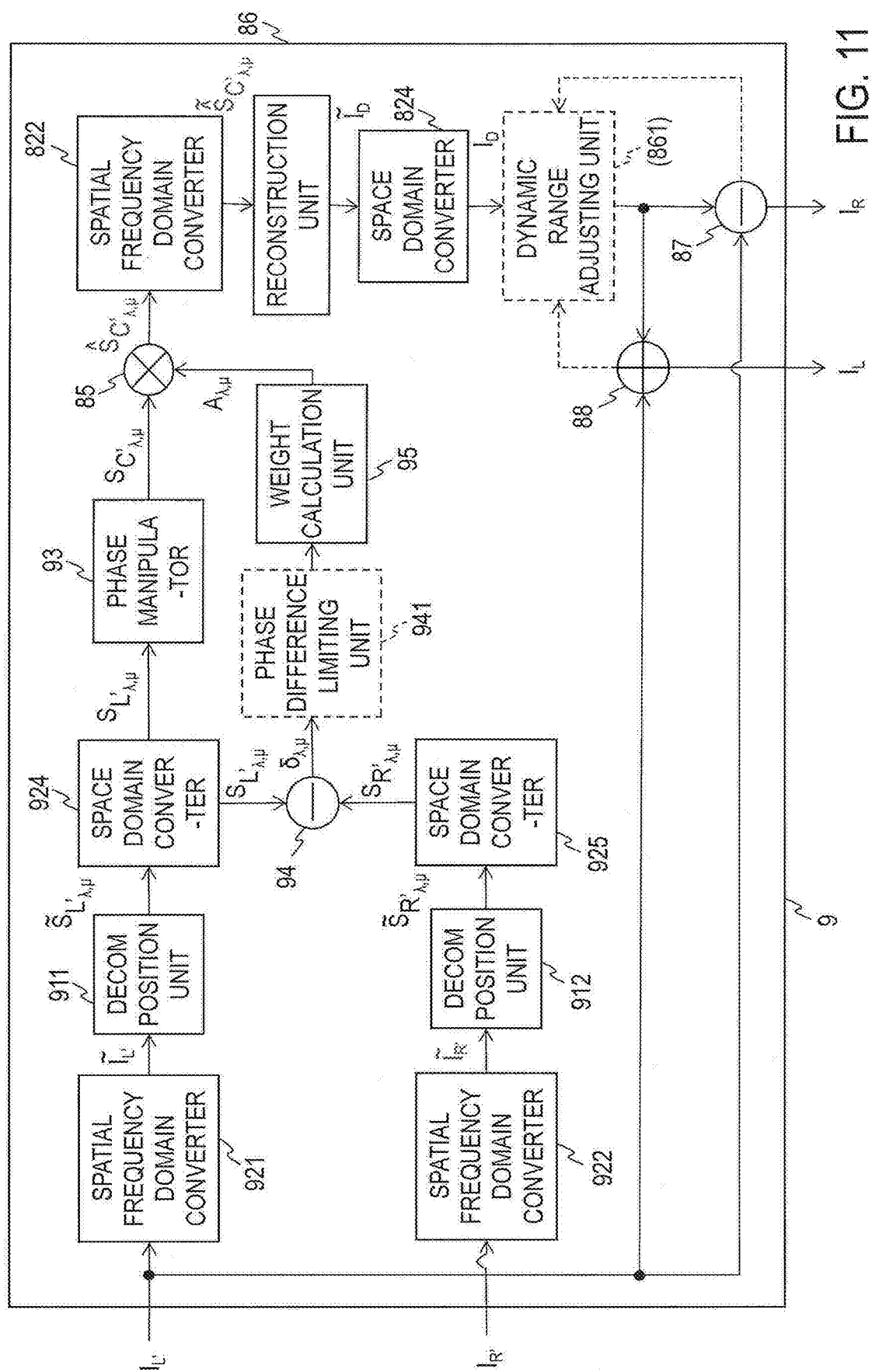
FIG. 11 is a block diagram illustrating a functional configuration of an image generation apparatus 9 according to a fifth embodiment.

As illustrated in FIG. 11, an image generation apparatus 9 according to this embodiment includes spatial frequency domain converters 822, 921, 922, space domain converters 824, 924, 925, decomposition units 911, 912, a phase manipulator 93, a phase difference calculation unit 94, a weight calculation unit 95, the weighting unit 85, the reconstruction unit 86, and the superposition units 87, 88. In this embodiment, the spatial frequency domain converters 822, 921, 922, the space domain converters 824, 924, 925, the decomposition units 911, 912, the phase manipulator 93, the phase difference calculation unit 94, the weight calculation unit 95, the weighting unit 85, the reconstruction unit 86, and the superposition unit 87 correspond to the "first manipulator", and the spatial frequency domain converters 822, 921, 922, the space domain converters 824, 924, 925, the decomposition units 911, 912, the phase manipulator 93, the phase difference calculation unit 94, the weight calculation unit 95, the weighting unit 85, the reconstruction unit 86, and the superposition unit 88 correspond to the "second manipulator". The image generation apparatus 9 is an apparatus embodied by execution of a predetermined program by the aforementioned computer, for example.

<Processing>

Processing by the image generation apparatus 9 is now described.

To the image generation apparatus 9, an original image $I_L'=I_C$ (a first original image: FIG. 14A) and an original image $I_{R'}$ (a second original image: FIG. 14B) are input. The original image $I_{L'}$ and the original image $I_{R'}$ are three-dimensional image content for giving an apparent depth to an image with the conventional binocular image presentation scheme. Between the original image $I_{L'}$ and the original image $I_{R'}$, there is a phase difference to be recognized as a binocular parallax. In other words, there is a positional offset to be recognized as a binocular parallax between the original image $I_{L'}$ and the original image $I_{R'}$. One who sees the original image $I_{R'}$ with one eye (for example, the right eye) and the original image $I_{L'}$ with the other eye (for example, the left eye) perceives a "stereo image". In contrast, one who sees both the original image $I_{R'}$ and the original image $I_{L'}$ with both eyes perceives a doubly blurred image. The original image $I_{R'}$ is a two-dimensional array having $I_{R'}(x, y)$ as the elements, and the original image $I_{L'}$ is a two-dimensional array having $I_{L'}(x, y)$ as the elements (pixels). The original image $I_{R'}$ and original image $I_{L'}$ may be still images or images of frames of a moving image, and may be read from an external storage device or from a storage device (not shown) of the image generation apparatus 9.

The original image $I_{L'}$ is input to the spatial frequency domain converter 921 and the original image $I_{R'}$ is input to the spatial frequency domain converter 922. The spatial frequency domain converter 921 converts the original image $I_{L'}$ to an original image $I_{L'}^{\sim}$ in the spatial frequency domain and outputs the original image $I_{L'}^{\sim}$. The spatial frequency domain converter 922 converts the original image $I_{R'}$ to an original image $I_{R'}^{\sim}$ in the spatial frequency domain and outputs the original image $I_{R'}^{\sim}$. For conversion at the spatial frequency domain converters 921, 922, discrete Fourier transform may be used, for example. Note that correctly the superscript "~" of "$I_{L'}^{\sim}$" and "$I_{R'}^{\sim}$" should be placed immediately above "I". However, due to limitation of denotation in the specification, "~" may be sometimes placed upper right of "$I_L$" and "$I_R$" (steps S921 and S922).

The original image $I_{L'}^{\sim}$ in the spatial frequency domain is input to the decomposition unit 911 and the original image $I_{R'}^{\sim}$, in the spatial frequency domain is input to the decomposition unit 912. The decomposition units 911 and 912 apply the complex steerable filter sequence Ψ to the original images $I_{L'}^{\sim}$, and $I_{R'}^{\sim}$, respectively as shown below to obtain complex steerable pyramids $S_{L\lambda,\mu}^{\sim}$ and $S_{R\lambda,\mu}^{\sim}$ corresponding to the respective spatial frequency bands λ and orientation bands μ, and outputs them (steps S911 and S912).

$$\tilde{S}_{L'_{\lambda,\mu}} = \tilde{I}_{L'}\Psi_{\lambda,\mu}$$

$$\tilde{S}_{R'_{\lambda,\mu}} = \tilde{I}_{R'}\Psi_{\lambda,\mu}$$

The complex steerable pyramids $S_{L\lambda,\mu}^{\sim}$ and $S_{R\lambda,\mu}^{\sim}$ are input to the space domain converters 924 and 925, respectively. The space domain converters 924 and 925 respectively convert the complex steerable pyramids $S_{L\lambda,\mu}^{\sim}$ and $S_{R\lambda,\mu}^{\sim}$ to complex steerable pyramids $S_{L\lambda,\mu}$ and $S_{R\lambda,\mu}$ in the space domain (FIGS. 14C and 14D), and output the complex steerable pyramids $S_{L\lambda,\mu}$ and $S_{R\lambda,\mu}$. For conversion at the space domain converters 924 and 925, discrete inverse Fourier transform may be used, for example. Each complex steerable pyramid $S_{L\lambda,\mu}$ is a two-dimensional array having $S_{L\lambda,\mu}(x, y)$ as the elements (pixels), and each complex steerable pyramid $S_{R\lambda,\mu}$ is a two-dimensional array having $S_{R\lambda,\mu}(x, y)$ as the elements (steps S924 and S925).

The complex steerable pyramids $S_{L\lambda,\mu}$ and $S_{R\lambda,\mu}$ are input to the phase difference calculation unit 94. The phase difference calculation unit 94 obtains the phase difference $\delta_{\lambda,\mu}(x, y)$ between $S_{L\lambda,\mu}(x, y)$ and $S_{R\lambda,\mu}(x, y)$ using the method described in Reference Literature 2 (DIDYK, P., SITTHI-AMORN, P., FREEMAN, W., DURAND, F., AND MATUSIK, W. 2013, "Joint View Expansion and Filtering for Automultiscopic 3d Displays," ACM Trans. Graph. 32, 6737 (November), 221:1-221:8), and outputs it. A set having the phase difference $\delta_{\lambda,\mu}(x, y)$ as the elements is denoted as phase difference $\delta_{\lambda,\mu}$. As described in Reference Literature 2, for a spatial frequency band λ for which the phase difference exceeds π/2 [rad], a value twice the phase difference $\delta_{\lambda-1,\mu}(x, y)$ for the one-lower spatial frequency band λ-1 is used as the phase difference $\delta_{\lambda,\mu}(x, y)$.

$$\delta_{\lambda,\mu}(x,y)=2\delta_{\lambda-1,\mu}(x,y)$$

Here, the peak spatial frequency $\omega_\lambda$ of spatial frequency band λ is twice or in the neighborhood of twice the peak spatial frequency $\omega_{\lambda-1}$ of spatial frequency band (λ-1) (step S94).

The phase difference $\delta_{\lambda,\mu}$ is input to the weight calculation unit 95. The weight calculation unit 95 obtains weight $A_{\lambda,\mu}(x, y)$ as shown below and outputs it (step S95):

$$A_{\lambda,\mu}(x,y)=\tan\{\delta_{\lambda,\mu}(x,y)\}$$

The complex steerable pyramids $S_{L\lambda,\mu}$ obtained by the space domain converter 924 are input to the phase manipulator 93. The phase manipulator 93 extracts the imaginary part of the complex steerable pyramid $S_{L\lambda,\mu}$, sets $S_{C\lambda,\mu}=S_{L\lambda,\mu}$, obtains the phase-shifted image $S_{C\lambda,\mu}$ corresponding to each spatial frequency band λ and each orientation band μ according to Formula (5) shown in the fourth embodiment, and outputs them (step S924).

Following this, the processes at steps S85, S822, S86, and S824 described in the fourth embodiment are performed and the space domain converter 824 outputs the phase-modulated image $I_D$ (FIG. 14E). Further, the process at step S87 described in the fourth embodiment is performed and the superposition unit 87 obtains and outputs the added image $I_R$ (image A) (FIG. 14G). Also, the process at step S88 described in the fourth embodiment is performed and the superposition unit 88 obtains and outputs the added image $I_L$ (image B) (FIG. 14F).

Modification 1 of the Fifth Embodiment

As described in the modification 1 of the fourth embodiment, the absolute value of the phase shift amount for the added image $I_R$, $I_L$ relative to the original image $I_L=I_C$ may be limited to π/4 [rad] or less, respectively. In this case, the image generation apparatus 9 (FIG. 11) further includes a phase difference limiting unit 941. The phase difference limiting unit 941 takes the phase difference $\delta_{\lambda,\mu}(x, y)$ obtained by the phase difference calculation unit 94 as input and updates the phase difference $\delta_{\lambda,\mu}(x, y)$ to $\hat{\delta}_{\lambda,\mu}(x, y)$ as:

$$\hat{\delta}_{\lambda,\mu}(x, y) = \begin{cases} \pi/4 & \text{if } \tau\delta_{\lambda,\mu}(x, y)/2 > \pi/4 \\ -\pi/4 & \text{if } \tau\delta_{\lambda,\mu}(x, y)/2 < -\pi/4 \\ \tau\delta_{\lambda,\mu}(x, y)/2 & \text{otherwise} \end{cases}$$

Here, τ is a positive constant for scaling. By making the value of τ small, the range of clipping the phase difference to π/4 [rad] can be narrowed.

In this case, at step S95, $\hat{\delta}_{\lambda,\mu}(x, y)$ is input to the weight calculation unit 95 instead of phase difference $\delta_{\lambda,\mu}(x, y)$. The weight calculation unit 95 then obtains the weight $A_{\lambda,\mu}(x, y)$ as below and outputs it.

$$A_{\lambda,\mu}(x,y)=\tan\{\hat{\delta}_{\lambda,\mu}(x,y)\}$$

The subsequent process is performed as described above.

Modification 2 of the Fifth Embodiment

As in the modification 2 of the fourth embodiment, the image generation apparatus 9 may further include the dynamic range adjusting unit 861 (FIG. 11). In this case, the dynamic range adjusting unit 861 updates the phase-modulated image $I_D$ to the phase-modulated image $I_D\hat{}$ and outputs it as described in the modification 2 of the fourth embodiment, the superposition unit 87 obtains the added image $I_R$ (image A) by superposing the sign-inverted image of the phase-modulated image $I_D\hat{}$ (the phase-modulated components a) on the original image $I_L\hat{=}I_C$ and outputs it, and the superposition unit 88 further takes the original image $I_L\hat{=}I_C$ and the phase-modulated image $I_D\hat{}$ as input, obtains the added image $I_L$ (image B) by superposing the original image $I_L\hat{=}I_C$ and the phase-modulated image $I_D\hat{}$ (phase-modulated components b), and outputs it.

Modification 3 of the Fifth Embodiment

Instead of the added images $I_R$, $I_L$, the image generation apparatus 9 may output the sign-inverted image of the phase-modulated image $I_D$ as the "image containing phase-modulated components a" and output the phase-modulated image $I_D$ as the "image containing phase-modulated components b". Such "image containing phase-modulated components a" and "image containing phase-modulated components b" may be superposed on the original image $I_L\hat{=}I_C$ displayed or printed or on a "subject" corresponding to the original image $I_L\hat{=}I_C$ (the subject represented by the original image $I_C$). In such a case, the observer I also perceives a stereo image with an apparent depth and the observer II perceives a clear planar image of the original image $I_C$.

Modification 4 of the Fifth Embodiment

The "phase-modulated components a" may contain only the luminance components of the sign-inverted image of the phase-modulated image $I_D$, and the "phase-modulated components b" may contain only the luminance components of the phase-modulated image $I_D$. For example, the image generation apparatus 9 may extract only the luminance components of the sign-inverted image of the phase-modulated image $I_D$ to obtain the "phase-modulated components a" and extract only the luminance components of the phase-modulated image $I_D$ to obtain the "phase-modulated components b". The image generation apparatus 9 may output such "image containing phase-modulated components a" and "image containing phase-modulated components b". Such "image containing phase-modulated components a" and "image containing phase-modulated components b" may be superposed on the original image $I_L\hat{=}I_C$ displayed or printed or on a "subject" corresponding to the original image $I_L\hat{=}I_C$ (the subject represented by the original image $I_C$). In such a case, the observer I also perceives a stereo image with an apparent depth and the observer II perceives a clear planar image of the original image $I_L\hat{=}I_C$.

Modification 5 of the Fifth Embodiment

When the original image $I_L\hat{=}I_C$ is a color image, the processes at steps S921, S922, S911, S912, S924, S925, S95, S93, S85, S822, S86, S824, S87, and S88 of the fifth embodiment are performed for each of the color channels (R, G, and B channels) and the added images $I_R$ (image A) and added images $I_L$ (image B) of all the color channels may be output. The process at step S94 may be performed for only one of the channels. The modifications 1 to 4 of the fifth embodiment may also be implemented where the original image $I_L\hat{=}I_C$ is a color image, in which case the processes of modifications 2 and 3 are performed for each color channel.

Modification 6 of the Fifth Embodiment

In the fifth embodiment, the phase-shifted image $S_{C\lambda,\mu}$ is generated by shifting the phase of the original image $I_L\hat{=}I_C$ in the positive direction by $0.5\pi$ [rad] (Formula (5)). However, the phase-shifted image $S_{C\lambda,\mu}$ may be generated by shifting the phase of the original image $I_L\hat{=}I_C$ in the positive direction by a neighborhood of $0.5\pi$. In this case, the phase of the sign-inverted image of the phase-modulated image $I_D$ (the phase-modulated components a) corresponding to a region for which the value of parallax map is positive (a crossed parallax) is equivalent to a shift in the negative direction by a neighborhood of $0.5\pi$ [rad] relative to the phase of the original image $I_L\hat{=}I_C$; and the phase of the phase-modulated image $I_D$ (phase-modulated components b) corresponding to a region for which the value of parallax map is positive (a crossed parallax) is equivalent to a shift in the positive direction by a neighborhood of $0.5\pi$ [rad] relative to the phase of the original image $I_L\hat{=}I_C$. Also, instead of the phase-modulated components a being the sign-inverted image of the phase-modulated image $I_D$ and the phase-modulated components b being the phase-modulated image $I_D$, the phase-modulated components a may be the sign-inverted image of the phase-modulated image $I_D$ and the phase-modulated components b may be an image in the neighborhood of the opposite phase of the phase-modulated components a.

Sixth Embodiment

This embodiment illustrates an image presentation system including any of the image generation apparatuses described above.

Figure 15A:
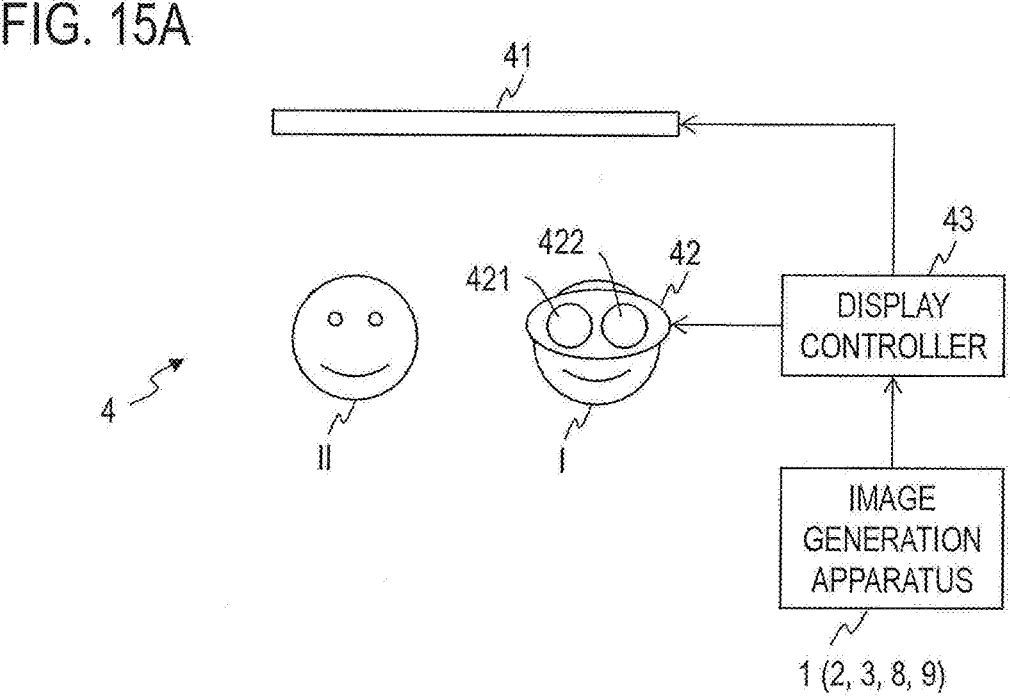
FIGS. 15A and 15B are conceptual diagrams for illustrating image presentation systems 4 and 5.

As illustrated in FIG. 15A, an image presentation system 4 according to this embodiment includes a display device 41 such as a display (an image presentation unit), the image generation apparatus 1, a display controller 43 that outputs the added image 111 (image A) and the added image 121 (image B) by temporally toggling them in accordance with the time division approach mentioned above, and stereoscopic equipment 42 such as goggles. The stereoscopic equipment 42 includes transmitting portions 421 and 422. The transmitting portion 421 (a first transmitting portion) is a liquid crystal shutter that is controlled such that it lets the added image 111 (image A) pass in a larger amount than the added image 121 (image B) in accordance with the time division approach mentioned above. Preferably, the transmitting portion 421 (the first transmitting portion) lets the added image 111 (image A) pass but does not let the added image 121 (image B) pass. The transmitting portion 422 (the second transmitting portion) is a liquid crystal shutter that is controlled such that it lets the added image 121 (image B) pass in a larger amount than the added image 111 (image A) in accordance with the time division approach mentioned above. Preferably, the transmitting portion 422 (the second transmitting portion) lets the added image 121 (image B) pass but does not let the added image 111 (image A) pass.

The observer I wears the stereoscopic equipment 42, and one eye thereof (for example, the right eye) sees the display device 41 through the transmitting portion 421 and the other eye (for example, the left eye) sees the display device 41 through the transmitting portion 422. The observer II does not wear the stereoscopic equipment 42 and sees the display device 41 with both eyes.

The added images 111, 121 output by the image generation apparatus 1 are sent to the display controller 43. The display controller 43 quickly alternates processing in a first time segment and processing in a second time segment in accordance with the time division approach. In the first time segment, the display controller 43 displays the added image 111 from the display device 41 and makes the transmitting portion 421 transparent and shuts off the transmitting portion 422. In the second time segment, the display controller 43 displays the added image 121 from the display device 41 and makes the transmitting portion 422 transparent and shuts off the transmitting portion 421. Here, the added images 111, 121 are displayed at the same position. As a result, the observer I sees the added image 111 with one eye and the added image 121 with the other eye. The observer I thereby perceives a stereo image with an apparent depth. Meanwhile, the observer II sees the added images 111, 121 with both eyes. The observer II perceives the phase-modulated image 110 component of the added image 111 and the phase-modulated image 120 component of the added image 111 as being canceled or averaged together. The observer II thereby perceives a clear planar image of the original image 100.

In the image presentation system 4, the image generation apparatus 1 may be replaced with the image generation apparatus 2, 3, 8, or 9, and the added images 111, 121 may be replaced with the added images 211, 221, or 311, 321, or the added images $I_R$, $I_L$.

Seventh Embodiment

An image presentation system based on a polarization approach is described.

Figure 15B:
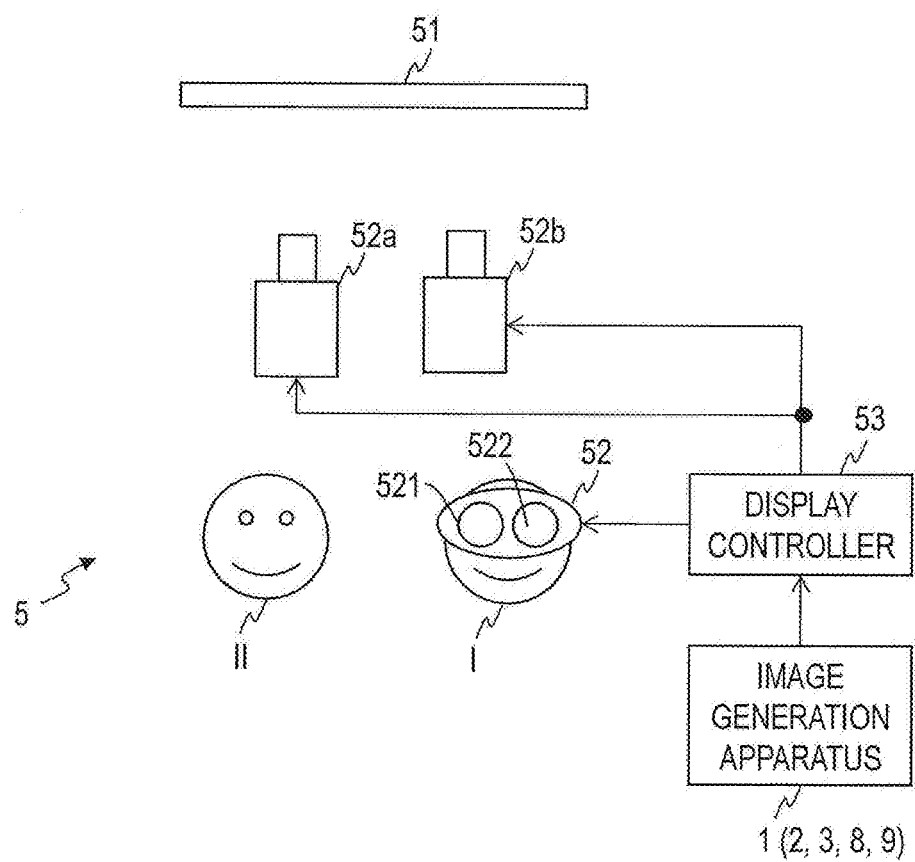

As illustrated in FIG. 15B, an image presentation system 5 according to this embodiment includes a screen 51, the image generation apparatus 1, a display controller 53 that outputs the added image 111 (image A) and the added image 121 (image B), a projector 52a (an image presentation unit) that projects an image through a polarizing plate of horizontal polarization, a projector 52b (an image presentation unit) that projects an image through a polarizing plate of vertical polarization, and stereoscopic equipment 52 such as goggles. The stereoscopic equipment 52 includes transmitting portions 521 and 522. The transmitting portion 521 (the first transmitting portion) is a polarizing plate of horizontal polarization that lets the added image 111 (image A) pass in a larger amount than the added image 121 (image B). Preferably, the transmitting portion 521 (the first transmitting portion) lets the added image 111 (image A) pass but does not let the added image 121 (image B) pass. The transmitting portion 522 (the second transmitting portion) is a polarizing plate of vertical polarization that lets the added image 121 (image B) pass in a larger amount than the added image 111 (image A). Preferably, the transmitting portion 522 (the second transmitting portion) lets the added image 121 (image B) pass but does not let the added image 111 (image A) pass.

The observer I wears the stereoscopic equipment 52 and one eye thereof (for example, the right eye) sees the screen 51 through the transmitting portion 521 and the other eye (for example, the left eye) sees the screen 51 through the transmitting portion 522. The observer II does not wear the stereoscopic equipment 52 and sees the screen 51 with both eyes.

The added images 111, 121 output by the image generation apparatus 1 are sent to the display controller 53. The display controller 53 sends the added images 111, 121 to the projectors 52a, 52b, respectively. The projector 52a projects the added image 111 on the screen 51 through the polarizing plate of horizontal polarization. The projector 52b projects the added image 121 on the screen 51 through the polarizing plate of vertical polarization. Here, the added images 111, 121 are projected at the same position on the screen 51. As a result, the observer I sees the added image 111 with one eye and the added image 121 with the other eye. The observer I thereby perceives a stereo image with an apparent depth. Meanwhile, the observer II sees the added images 111, 121 with both eyes. The observer II perceives a clear planar image of the original image 100.

In the image presentation system 5, the image generation apparatus 1 may be replaced with the image generation apparatus 2, 3, 8, or 9, and the added images 111, 121 may be replaced with the added images 211, 221, or 311, 321, or the added images $I_R$, $I_L$.

Eighth Embodiment

Another image presentation system based on the polarization approach is described.

Figure 16A:
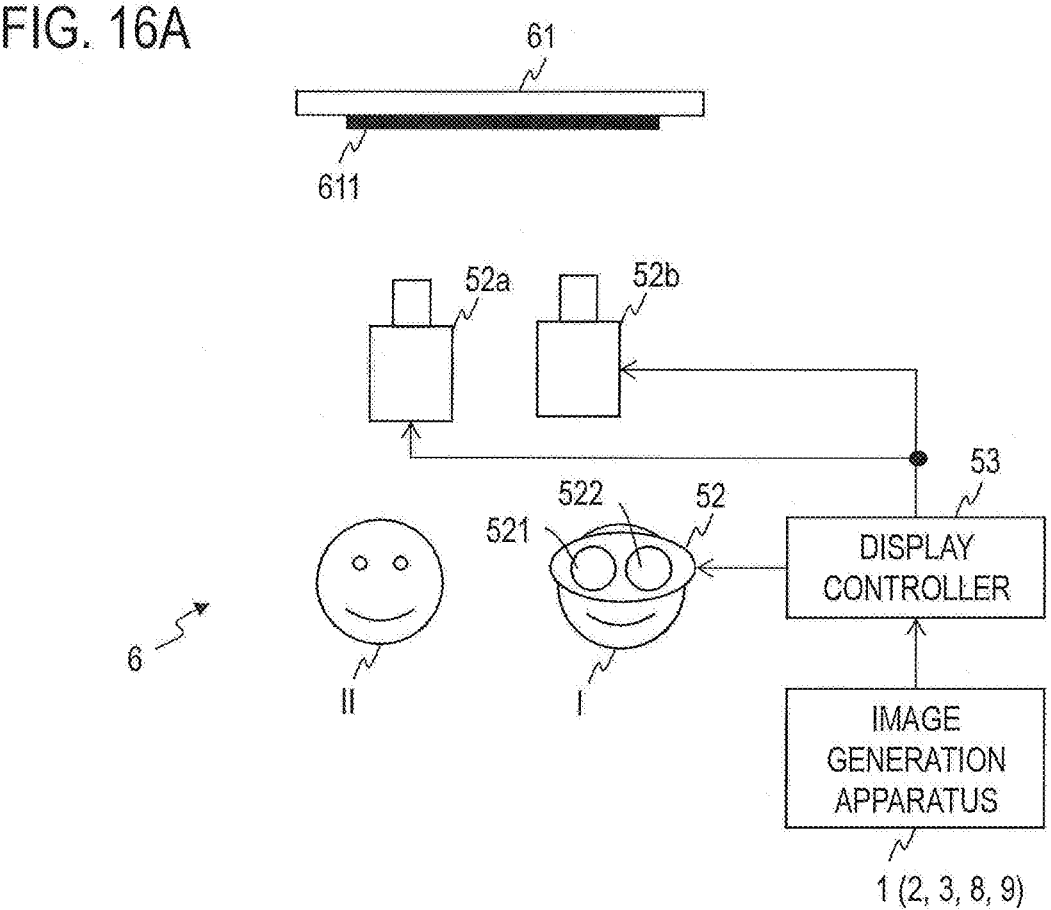
FIGS. 16A and 16B are conceptual diagrams for illustrating image presentation systems 6 and 7.

As illustrated in FIG. 16A, an image presentation system 6 according to this embodiment includes a wall 61, a subject 611 such as a photograph affixed on the wall 61, the image generation apparatus 1, the display controller 53, the projector 52a that projects an image through a polarizing plate of horizontal polarization, the projector 52b that projects an image through a polarizing plate of vertical polarization, and the stereoscopic equipment 52 such as goggles. The stereoscopic equipment 52 includes the transmitting portions 521 and 522.

The observer I wears the stereoscopic equipment 52 and one eye thereof (for example, the right eye) sees the subject 611 through the transmitting portion 521 and the other eye (for example, the left eye) sees the subject 611 through the transmitting portion 522. The observer II does not wear the stereoscopic equipment 52 and sees the subject 611 with both eyes.

The image generation apparatus 1 outputs the phase-modulated images 110, 120 as described in the modification 1 of the first embodiment. The output phase-modulated images 110, 120 are sent to the display controller 53. The display controller 53 sends the phase-modulated images 110, 120 to the projectors 52a, 52b, respectively. The projector 52a projects the phase-modulated image 110 on the subject 611 through the polarizing plate of horizontal polarization. The projector 52b projects the added image 121 on the subject 611 through the polarizing plate of vertical polarization. Here, the phase-modulated images 110, 120 and the subject 611 are superposed so that their edges are aligned with each other. Preferably, the phase-modulated images 110, 120 are projected at the same position on the subject 611. As a result, the observer I sees the phase-modulated image 110 superposed on the subject 611 with one eye and sees the phase-modulated image 120 superposed on the subject 611 with the other eye. The observer I thereby perceives a stereo image with an apparent depth. Meanwhile, the observer II sees the added images 111, 121 with both eyes. The observer II perceives a clear image of the subject 611.

In the image presentation system 6, the image generation apparatus 1 may be replaced with the image generation apparatus 2, 3, 8, or 9, and the phase-modulated images 110, 120 may be replaced with the phase-modulated image 230 and the inverted image thereof, the phase-modulated image 390 and the inverted image thereof, or the phase-modulated image $I_D$ and the sign-inverted image thereof. Also, in the image presentation system 6, the phase-modulated images 110, 120 may be replaced with the luminance components of the phase-modulated images 110, 120, the luminance components of the phase-modulated image 230 and the luminance components of the inverted image of the phase-modulated image 230, or the luminance components of the phase-modulated image 390 and the luminance components of the inverted image of the phase-modulated image 390, or the luminance components of the phase-modulated image $I_D$ and the luminance components of the sign-inverted image of the phase-modulated image $I_D$.

Ninth Embodiment

A further image presentation system based on the time division approach is described.

Figure 16B:
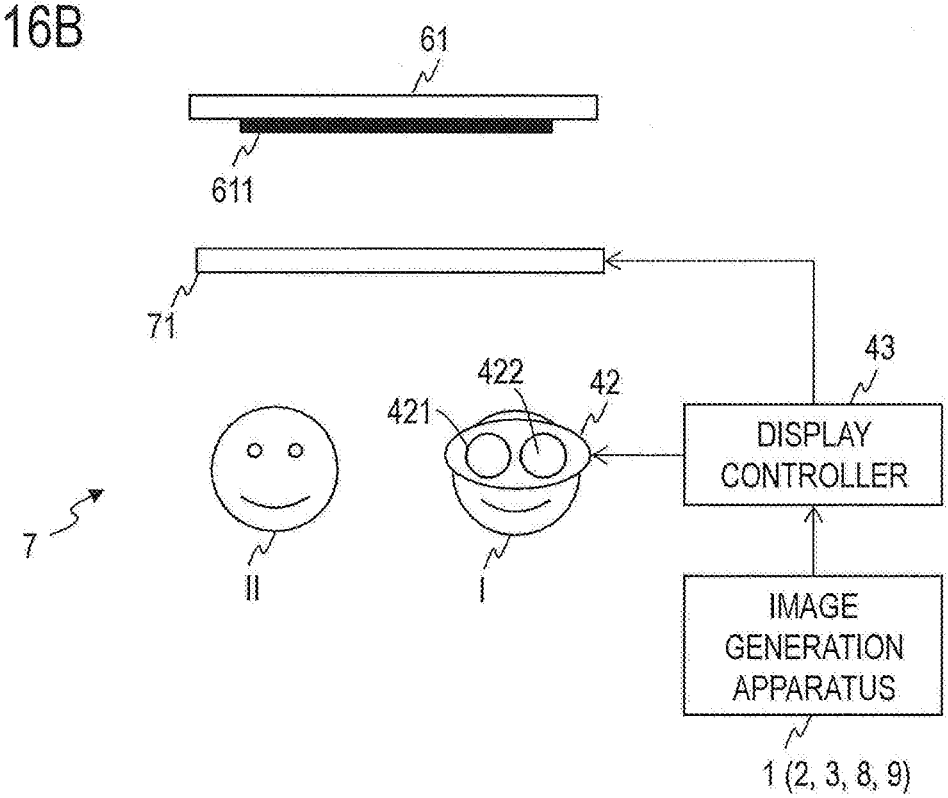

As illustrated in FIG. 16B, an image presentation system 7 according to this embodiment includes the wall 61, the subject 611 such as a photograph affixed on the wall 61, a transmissive display device 71 such as a transparent display, the image generation apparatus 1, the display controller 43 that outputs the phase-modulated images 110 and 120 by temporally toggling them, and the stereoscopic equipment 42 such as goggles.

The observer I wears the stereoscopic equipment 42, and one eye thereof (for example, the right eye) sees the transmissive display device 71 and the subject 611 behind it through the transmitting portion 421 and the other eye (for example, the left eye) sees the transmissive display device 71 and the subject 611 behind it through the transmitting portion 422. The observer II does not wear the stereoscopic equipment 42 and sees the transmissive display device 71 and the subject 611 behind it with both eyes.

The phase-modulated images 110, 120 output by the image generation apparatus 1 are sent to the display controller 43. The display controller 43 quickly alternates processing in the first time segment and processing in the second time segment in accordance with the time division approach. In the first time segment, the display controller 43 displays the phase-modulated image 110 from the transmissive display device 71 and makes the transmitting portion 421 transparent and shuts off the transmitting portion 422. In the second time segment, the display controller 43 displays the phase-modulated image 120 from the transmissive display device 71 and makes the transmitting portion 422 transparent and shuts off the transmitting portion 421. Here, the phase-modulated images 110, 120 are displayed at the same position. As a result, the observer I sees a superposed view of the phase-modulated image 110 and the subject 611 with one eye and sees a superposed view of the phase-modulated image 120 and the subject 611 with the other eye. The observer I thereby perceives a stereo image with an apparent depth. Meanwhile, the observer II sees a superposed view of all of the phase-modulated images 110, 120 and the subject 611 with both eyes. The observer II thereby perceives a clear image of the subject 611.

In the image presentation system 7, the image generation apparatus 1 may be replaced with the image generation apparatus 2, 3, 8, or 9, and the phase-modulated images 110, 120 may be replaced with the phase-modulated image 230 and the inverted image thereof, the phase-modulated image 390 and the inverted image thereof, or the phase-modulated image $I_D$ and the sign-inverted image thereof. Also, in the image presentation system 7, the phase-modulated images 110, 120 may be replaced with the luminance components of the phase-modulated images 110, 120, the luminance components of the phase-modulated image 230 and the luminance components of the inverted image of the phase-modulated image 230, or the luminance components of the phase-modulated image 390 and the luminance components of the inverted image of the phase-modulated image 390, or the luminance components of the phase-modulated image $I_D$ and the luminance components of the sign-inverted image of the phase-modulated image $I_D$.

[Summary of Gist]

What have been described in the embodiments are summarized below.

The image generation apparatuses according to the first to fourth embodiments generate images based on an "original image". Here, the "images based on the original image" includes an "image A" and an "image B". The "image A" and "image B" are for one who sees the "image A" with one eye and the "image B" with the other eye to perceive a "stereo image" and one who sees the "image A" and the "image B" with the same eye(s) to perceive the "original image". The image generation apparatuses include: a first manipulator that obtains the "image A", which is an image generated by superposing the "original image" and "phase-modulated components a" which are generated by shifting the phases of spatial frequency components of the "original image" by a "first phase"; and a second manipulator that obtains the "image B", which is an image generated by superposing the "original image" and "phase-modulated components b" which are generated by shifting the phases of spatial frequency components of the "original image" by a "second phase" being a different phase than the "first phase".

More preferably, in the image generation apparatuses according to the first to fourth embodiments, the "images based on the original image" are an "image A" and an "image B", and the "image A" and "image B" are for one who sees the "image A" with one eye and the "image B" with the other eye to perceive a "stereo image" and one who sees the "image A" and the "image B" with the same eye(s) to perceive the "original image" (for example, only the original image). The image generation apparatuses include: a first manipulator that obtains the "image A", which is an image generated by superposing the "original image" and "phase-modulated components a" which are generated by shifting the phases of spatial frequency components of the "original image" by a "first phase" being $0.5\pi$ or in a neighborhood of $0.5\pi$; and a second manipulator that obtains the "image B", which is an image generated by superposing the "original image" and "phase-modulated components b" which are generated by shifting the phases of spatial frequency components of the "original image" by a "second phase" being the opposite phase of the "first phase" or in a neighborhood of the opposite phase of the "first phase". The term "neighborhood of $\rho$" means a range from $\rho-\Delta_1$ to $\rho+\Delta_2$, inclusive. $\Delta_1$ and $\Delta_2$ are zero or positive real numbers, and they may be $\Delta_1=\Delta_2$, $\Delta_1<\Delta_2$, or $\Delta_1>\Delta_2$. For example, $\Delta_1$ and $\Delta_2$ may be values that are 30% of $\rho$ or less, values that are 20% of $\rho$ or less, or values that are 10% of $\rho$ or less.

The first manipulator generates the "image A" by superposing the "original image" and the "phase-modulated components a" and the second manipulator generates the "image B" by superposing the "original image" and the "phase-modulated components b". The first manipulator and the second manipulator thereby provide a phase difference that can be interpreted as a binocular parallax between the "image A" and the "image B". As a result, one who sees the "image A" with one eye and sees the "image B" with the other eye perceives a "stereo image". In contrast, due to the inverted relationship of image intensity between the "phase-modulated components a" and the "phase-modulated components b", one who sees the "image A" and "image B" with the same eye(s) perceives the "original image" because he/she gets an illusion of the "phase-modulated components a" and the "phase-modulated components b" cancelling each other. In other words, an average amplitude of components obtained by superposing the "phase-modulated components a" and the "phase-modulated components b" is smaller than an average amplitude of the "phase-modulated components a" and smaller than an average amplitude of the "phase-modulated components b", and one who sees the "image A" with one eye and sees the "image B" with the other eye perceives a "stereo image", and one who sees the "image A" and "image B" with the same eye(s) perceives the "original image". That is, a position change in the space domain can be regarded as a phase change (also called "phase modulation") of a spatial frequency domain component (for example, a two-dimensional Fourier component), and a binocular parallax can be converted to a phase difference (phase parallax). Thus, one who sees the "image A" and "image B", which are generated by adding the "phase-modulated components a" and "phase-modulated components b" having a phase difference to the "original image" respectively, with the different (left and right) eyes will perceive a "stereo image" with a depth because his/her brain utilizes the phase difference between the "image A" and the "image B" caused by the phase difference between the "phase-modulated components a" and the "phase-modulated components b" as a binocular parallax. On the other hand, since the phase difference between the "image A" and the "image B" is derived from the "phase-modulated components a" and the "phase-modulated components b" having a phase change in the opposite directions or in the neighborhood thereof, one who sees the "image A" and the "image B" with the same eye(s) (with both eyes simultaneously, or only with the right or left eye) perceives an "image" with the image intensities of the "phase-modulated components a" and the "phase-modulated components b" weakened by each other. Accordingly, one who wears "stereoscopic equipment" for viewing the "image A" and "image B" with the right and left (different) eyes respectively can perceive a "stereo image", whereas one who does not wear the "stereoscopic equipment" can perceive a clear "original image". The "stereoscopic equipment" has the "first transmitting portion" that lets the "image A" pass in a larger amount than the "image B", and the "second transmitting portion" that lets the "image B" pass in a larger amount than the "image A". Preferably, the "first transmitting portion" lets the "image A" pass but blocks the "image B", and the "second transmitting portion" lets the "image B" pass but blocks the "image A". An example of the "stereoscopic equipment" is goggles with liquid crystal shutters used in the time division approach, or goggles with two polarizing plates having polarization directions orthogonal to each other utilized in the polarization approach. The term "phase" means the phase of a spatial frequency. As mentioned above, phase modulation of the "image A" is achieved by superposing the "phase-modulated components a" on the "original image". Phase modulation of the "image B" is achieved by superposing the "phase-modulated components b" on the "original image". Here, the amplitudes of the "image A" and "image B" do not agree with the amplitude of the "original image". However, a person who observes the "image A" and "image B" with different eyes respectively will not be annoyed by the disagreement of amplitude because of the action of a visual function that relieves the disagreement of amplitude at the time of binocular image fusion and perceive an "image" that appears to have the amplitude of the "original image".

The "phase-modulated components a" and the "phase-modulated components b" are images that are based on at least a partial region of the "original image", the "stereo image" is an image created by giving an apparent depth to at least a partial region of the "original image" or to at least a partial region of the "subject" represented by the "original image", and the "image" includes at least a partial region of the "original image" or the image of the "subject" represented by the "original image". The "original image" is a two-dimensional image (a planar image). The "original image" may be a color image, a monotone image, or a black-and-white image. The "original image" may be a still image or an image of each frame of a moving image. The "original image" may be an image photographed, drawn, or created with a computer. The "subject" represented by the "original image" is a "subject" expressed by the "original image" and is a "subject" that corresponds to the "original image". The "subject" may be an object having a three-dimensional geometry (for example, a vase, a ball, or a model), or a plane (for example, a paper sheet, a board, a wall, or a screen). When the "subject" is a plane, a pattern is preferably included in the plane. Examples of a pattern included in the plane include a photograph or an image printed on a paper sheet, or a photograph or an image projected on a certain plane. When the "subject" is a screen of a display and the like, an example of the pattern may be an image displayed on the screen of the display and the like.

The "phase-modulated components a" and "phase-modulated components b" are based on elements that are obtained by changing ("modulating", "moving", or "shifting") the phase of the "original image". For example, the "phase-modulated components a" are based on elements that are obtained by changing the phase of the "original image" in the positive direction, and the "phase-modulated components b" are based on elements that are obtained by changing the phase of the "original image" in the negative direction. It is desirable that the absolute value of the phase change amount (also called "phase modulation amount") of the "phase-modulated components a" relative to the "original image" is the same as the absolute value of the phase change amount of the "phase-modulated components b" relative to the "original image" or is in the neighborhood of the absolute value of the phase change amount of the "phase-modulated components b" relative to the "original image". In this case, the "phase-modulated components a" have the opposite phase to the "phase-modulated components b" or a neighborhood of the opposite phase. As a result, one who sees both the "image A" containing the "phase-modulated components a" and the "image B" containing the "phase-modulated components b" with the same eye(s) without wearing the "stereoscopic equipment" perceives a clearer "image" with the "phase-modulated components a" and the "phase-modulated components b" substantially canceled or averaged together. Preferably, the phase change amount of the "phase-modulated components a" (the first phase) relative to the "original image" is the opposite phase of the phase change amount of the "phase-modulated components b" (the second phase) relative to the "original image" or in the neighborhood of the opposite phase. In other words, it is desirable that the "phase-modulated components a" have the opposite phase to the "phase-modulated components b" or a neighborhood of the opposite phase. Ideally, the phase change amount of the "phase-modulated components a" (the first phase) relative to the "original image" is $0.5\pi$ [rad] or in the neighborhood of $0.5\pi$ [rad], and the phase change amount of the "phase-modulated components b" (the second phase) relative to the "original image" is $-0.5\pi$ [rad] or in the neighborhood of $-0.5\pi$ [rad]. More preferably, the "first phase" is $0.5\pi$ [rad] or in the neighborhood of $0.5\pi$ [rad], and the "second phase" is the opposite phase of the "first phase" or in the neighborhood thereof. The "image A" that is obtained by superposing the "phase-modulated components a" having a phase change amount of $0.5\pi$ relative to the "original image" on the "original image" has a phase change amount of $0.25\pi$ relative to the "original image" unless its amplitude is manipulated by other information processing. The "image B" that is obtained by superposing the "phase-modulated components b" having a phase change amount of $-0.5\pi$ relative to the "original image" on the "original image" has a phase change amount of $-0.25\pi$ relative to the "original image" unless its amplitude is manipulated by other information processing. In this manner, the phase difference between the "image A" and the "image B" acts as a binocular parallax, thus providing the observer with a depth perception of an "image".

A change of phase contributes to the position change of a component in a desired direction (for example, the horizontal direction) within the space domain. Note that the amount of such position change depends not only on the phase change amount but on the spatial frequency and orientation of the spatial frequency component whose phase has been changed. That is, the position change amount of each spatial frequency component in a certain direction will be a value that is a function of the phase change amount corresponding to a parallax, the spatial frequency, and the orientation. Thus, for consistency of the position change amounts of the respective spatial frequency components in the certain direction, adjustment in accordance with the spatial frequencies and orientations of the respective spatial frequency components is required. For this adjustment, a weight may be given to an "image" obtained by changing the phase of the "original image" to obtain the "phase-modulated components a", and a weight may be given to an "image" obtained by changing the phase of the "original image" to obtain the "phase-modulated components b". It is desirable that the weight given to the "image" for obtaining the "phase-modulated components a" is equal to the weight given to the "image" for obtaining the "phase-modulated components b". However, a weight that is given to at least some of the "pixels" of the "image" for obtaining the "phase-modulated components a" may be in the neighborhood of the magnitude of the weight given to the corresponding "pixels" of the "image" for obtaining the "phase-modulated components b".

Firstly, a component of a higher spatial frequency requires a smaller position change amount with respect to a phase change. Thus, adjustment in accordance with the spatial frequency is required. In some embodiments, the amplitudes of the spatial frequency components of the "phase-modulated components a" and "phase-modulated components b" obtained by changing the phase of the "original image" are subjected to modulation that is based on weights corresponding to the respective spatial frequency components. This adjusts the phase change amounts for the respective spatial frequency bands of the "image A" generated by superposing the "phase-modulated components a" after the modulation on the "original image" and the "image B" generated by superposing the "phase-modulated components b" after the modulation on the "original image", and hence adjusts the position change amounts.

The direction of movement in the space domain when the phase of a spatial frequency component is changed will vary depending on the orientation of the spatial frequency component. Thus, to obtain a binocular parallax of a desired amount in a desired direction (for example, the horizontal direction) in the space domain, adjustment of the position change amount of each spatial frequency component is required. For example, in a case where the "phase-modulated components a" are obtained by providing the respective spatial frequency components of an image obtained by changing the phase of the "original image" with at least the weights corresponding to their orientation, and the "phase-modulated components b" are obtained by providing the respective spatial frequency components of an image obtained by changing the phase of the "original image" with at least the weights corresponding to their orientation, the weight corresponding to an orientation closer to the horizontal orientation is made smaller than the weight corresponding to an orientation closer to the vertical orientation.

Also, such "phase-modulated components a" and "phase-modulated components b" may be obtained by giving weights to images obtained by changing the phase of the "original image" as mentioned above, but they may be obtained by changing the phase of images obtained by giving weights to the "original image", or by giving weights while changing the phase of the "original image". In summary, the "phase-modulated components a" may include "first components" generated by giving a "first weight" to the "original image", and the phases of the "phase-modulated components a" may be different relative to the phase of the "original image" by the "first phase"; and the "phase-modulated components b" may include "second components" generated by giving a "second weight" to the "original image", and the phases of the "phase-modulated components b" may be different relative to the phase of the "original image" by the "second phase". For example, the "first components" may be components generated by providing the respective spatial frequency components of the "original image" with at least the weights corresponding to the spatial frequencies of the respective spatial frequency components of the "original image", the "second components" may be components generated by providing the respective spatial frequency components of the "original image" with at least the weights corresponding to the spatial frequencies of the respective spatial frequency components of the "original image", and the "weight" corresponding to a "first spatial frequency" may be equal to or smaller than the "weight" corresponding to a "second spatial frequency" higher than the "first spatial frequency" (for example, the "weight" corresponding to the "first spatial frequency" may be smaller than the "weight" corresponding to the "second spatial frequency" higher than the "first spatial frequency"). For example, the "first components" may be components generated by providing the respective spatial frequency components of the "original image" with at least the weights corresponding to the orientations of the respective spatial frequency components of the "original image", the "second components" may be components generated by providing the respective spatial frequency components of the "original image" with at least the weights corresponding to the orientations of the respective spatial frequency components of the "original image", and the weight corresponding to a "first orientation" may be equal to or smaller than the weight corresponding to a "second orientation" closer to a predetermined orientation than the "first orientation" is (for example, the weight corresponding to the "first orientation" may be smaller than the weight corresponding to the "second orientation" closer to the predetermined orientation than the "first orientation" is). For example, the "first components" may be components generated by providing the respective regions of the "original image" with at least the weights corresponding to the respective regions of the "original image", and the "second components" may be components generated by providing the respective regions of the "original image" with at least the weights corresponding to the respective regions of the "original image".

Instead of giving a uniform apparent depth to the "original image", a non-uniform apparent depth may be given to the "original image". In other words, the depth may be varied depending on the image region in the space domain. For example, each of the "first regions" of an image obtained by changing the phase of the "original image" may be given at least the weight corresponding to that "first region" to obtain the "phase-modulated components a", and each of the "second regions" of an image obtained by changing the phase of the "original image" may be given at least the weight corresponding to that "second region" to obtain the "phase-modulated components b". In this way, a non-uniform apparent depth can be given. As mentioned above, the "phase-modulated components a" may include "first components" generated by providing the respective spatial frequency components of the "original image" with at least the "weights" corresponding to the spatial frequencies and/or orientations of the respective spatial frequency components of the "original image", and the "phase-modulated components b" may include "second components" generated by providing the respective spatial frequency components of the "original image" with at least the "weights" corresponding to the spatial frequencies and/or orientations of the respective spatial frequency components of the "original image". As mentioned above, the "weight" is determined on a per-pixel basis for each set of $\omega_\lambda$ and $\theta_\mu$ based on the parallax map Dmap, on multiple predetermined spatial frequencies $\omega_\lambda$, and on multiple predetermined orientations $\theta_\mu$. The parallax map Dmap represents a "predetermined parallax" corresponding to each pixel of the "original image", and the parallax between an image generated by superposing the "original image" and the "phase-modulated components a" and an image generated by superposing the "original image" and the "phase-modulated components b" is the "predetermined parallax". For example, a "weight" may be determined for each pixel at each coordinate (x, y) and for each set of $\omega_\lambda$ and $\theta_\mu$ according to Formula (6) or to Formula (9) described above.

When the "image A" contains the "phase-modulated components a" and the components of the "original image" and the "image B" contains the "phase-modulated components b" and the components of the "original image", a perception of a "stereo image" and an "image" can be produced by presenting the "image A" and "image B" to different eyes. That is, when such "image A" and "image B" are shown on a display device such as a display or projected from a projection device such as a projector, one who sees the "image A" with one eye and sees the "image B" with the other eye wearing the "stereoscopic equipment" perceives a "stereo image". In contrast, one who sees the "image A" and "image B" with the same eye(s) without wearing the "stereoscopic equipment" perceives a clear "image" with the "original image" sharpened and the "phase-modulated components a" and "phase-modulated components b" weakened by each other. The "image A" containing the "phase-modulated components a" and the components of the "original image" can be obtained by superposing the "phase-modulated components a" on the "original image". The "image B" containing the "phase-modulated components b" and the components of the "original image" can be obtained by superposing the "phase-modulated components b" on the "original image". The "image A" is an image for which superposition has been performed so that the edges of the "phase-modulated components a" are aligned with the edges of the components of the "original image", and the "image B" is an image for which superposition has been performed so that the edges of the "phase-modulated components b" are aligned with the edges of the components of the "original image". Preferably, it is desirable that the "image A" is an image that is obtained by superposing the "phase-modulated components a" on the "original image" such that each coordinate of the "original image" agrees with the corresponding coordinate of the "phase-modulated components a", and "phase-modulated image b" is an image that is obtained by superposing the "phase-modulated components b" on the "original image" such that each coordinate of the "original image" agrees with the corresponding coordinate of the "phase-modulated components b". That is, it is desirable that the "image A" is an image that is obtained by superposing the "phase-modulated components a" on the "original image" while maintaining the phase change amount of the "phase-modulated components a" relative to the "original image" and the "image B" is an image that is obtained by superposing the "phase-modulated components b" on the "original image" while maintaining the phase change amount of the "phase-modulated components b" relative to the "original image". In other words, it is desirable that display of the "image A" containing the "phase-modulated components a" and the components of the "original image" and the "image B" containing the "phase-modulated components b" and the components of the "original image" is performed so that the "original image" components of the "image A" and the "original image" components of the "image B" are aligned with each other. However, the "image A" and "image B" may be displayed with some misalignment if the misalignment between the "original image" components of the "image A" and the "original image" components of the "image B" cannot be virtually perceived by a human. That is, the amount of offset between the coordinates of the "original image" components of the "image A" and the coordinates of the "original image" components of the "image B" should be within a predetermined range. In other words, the "image A" and "image B" may be displayed such that the coordinate of each "original image" component of the "image A" is in the vicinity of the coordinate of the corresponding "original image" component of the "image B". The "image A" and "image B" may be also displayed such that the edges of "original image" components of the "image A" are aligned with or positioned in the vicinity of the edges of "original image" components of the "image B".

The image generation apparatuses of the modifications 1 and 2 of the first to third embodiments and the modifications 3, 4, and 5 of the fourth embodiment also generate images based on the "original image". Here, the "images based on the original image" include an "image containing phase-modulated components a" and an "image containing phase-modulated components b". The "image containing phase-modulated components a" and the "image containing phase-modulated components b" are for one who sees the "original image" or a "subject" represented by the "original image" and the "image containing phase-modulated components a" with one eye and sees the "original image" or the "subject" and the "image containing phase-modulated components b" with the other eye to perceive a "stereo image", and for one who sees the "original image" or the "subject", the "image containing phase-modulated components a", and the "image containing phase-modulated components b" with the same eye(s) to perceive the "original image". The image generation apparatuses include: a first manipulator that obtains the "phase-modulated components a" by shifting the phases of spatial frequency components of the "original image" by a "first phase"; and a second manipulator that obtains the phase-modulated components b by shifting the phases of spatial frequency components of the "original image" by a "second phase" being a different phase than the "first phase". The "phase-modulated components a" and "phase-modulated components b" may be images represented by the intensities of multiple color channels or may contain only the luminance channel.

More preferably, in the image generation apparatuses of the modifications 1 and 2 of the first to third embodiments and the modifications 3, 4, and 5 of the fourth embodiment, the "images based on the original image" are the "image containing phase-modulated components a" and the "image containing phase-modulated components b", and the "image containing phase-modulated components a" and "image containing phase-modulated components b" are for one who sees the "original image" or the "subject" and the "image containing phase-modulated components a" with one eye and sees the "original image" or the "subject" and the "image containing phase-modulated components b" with the other eye to perceive a "stereo image", and for one who sees the "original image" or the "subject", the "image containing phase-modulated components a", and the "image containing phase-modulated components b" with the same eye(s) to perceive the "original image" (for example, only the original image). The image generation apparatuses include: a first manipulator that obtains the phase-modulated components a by shifting the phases of spatial frequency components of the "original image" by a "first phase" being 0.5π or in a neighborhood of 0.5π; and a second manipulator that obtains the phase-modulated components b by shifting the phases of spatial frequency components of the "original image" by a "second phase" being an opposite phase of the "first phase".

The reason why one who sees the "original image" or a "subject" represented by the "original image" and the "image containing phase-modulated components a" with one eye and sees the "original image" or the "subject" and the "image containing phase-modulated components b" with the other eye perceives a "stereo image" is that his/her brain utilizes the phase difference between the "image containing phase-modulated components a" and the "image containing phase-modulated components b" as a binocular parallax. The reason why one who sees the "original image" or the "subject", the "image containing phase-modulated components a", and the "image containing phase-modulated components b" with the same eye(s) perceives the "original image" is that he/she gets an illusion of the phase-modulated components a and the phase-modulated components b cancelling each other due to the inverted relationship of image intensity between them.

In such a case, one who wears the "stereoscopic equipment" and sees an image in which the "image containing phase-modulated components a" is superposed on the "original image" or the "subject" with one eye and sees an image in which the "image containing phase-modulated components b" is superposed on the "original image" or the "subject" with the other eye will perceive a "stereo image" representing the "original image" or the "subject" given an apparent depth. Meanwhile, one who does not wear the "stereoscopic equipment" and sees an image in which the "image containing phase-modulated components a" and "image containing phase-modulated components b" are superposed on the "original image" or the "subject" with the same eye(s) will perceive a clear "image" with the "original image" sharpened because the "phase-modulated components a" and the "phase-modulated components b" weaken each other. There is no limitation in the manner of superposing the "image containing phase-modulated components a" and the "image containing phase-modulated components b" on the "original image" or the "subject". For example, by projecting the "image containing phase-modulated components a" and the "image containing phase-modulated components b" onto the "original image" or the "subject", the "image containing phase-modulated components a" and "image containing phase-modulated components b" can be superposed on the "original image" or the "subject". Alternatively, a transparent display may be disposed at a position through which an image of the "original image" or the "subject" passes, and the "image containing phase-modulated components a" and "image containing phase-modulated components b" may be displayed on the transparent display so that the image of the "original image" or the "subject" passing through the transparent display is superposed on the "image containing phase-modulated components a" and "image containing phase-modulated components b" displayed on the transparent display. Here, the "image containing phase-modulated components a" and "image containing phase-modulated components b" displayed on the transparent display are images having transmissivity. It is also desirable that the "image containing phase-modulated components a" and the "image containing phase-modulated components b" are superposed on the "original image" or the "subject" such that the edges of the "image containing phase-modulated components a" and "image containing phase-modulated components b" are aligned with the edges of the "original image" or the "subject". For example, the "image containing phase-modulated components a" and "image containing phase-modulated components b" are superposed on the "original image" or the "subject" such that the edges of the "image containing phase-modulated components a" and "image containing phase-modulated components b" are aligned with or positioned in the vicinity of the edges of the "original image" or the "subject". Preferably, the "image containing phase-modulated components a" is superposed on the "original image" such that each coordinate of the "original image" agrees with the corresponding coordinates of the "phase-modulated components a", and the "image containing phase-modulated components b" is superposed on the "original image" such that each coordinate of the "original image" agrees with the corresponding coordinates of the "phase-modulated components b". It is desirable that the "image containing phase-modulated components a" is superposed on the "original image" while maintaining the phase change amount of the "phase-modulated components a" relative to the "original image", and the "image containing phase-modulated components b" is superposed on the "original image" while maintaining the phase change amount of the "phase-modulated components b" relative to the "original image".

Also, even in a case where the "image containing phase-modulated components a" contains "phase-modulated components a" composed of luminance components but does not contain the components of the "original image" and the "image containing phase-modulated components b" contains "phase-modulated components b" composed of luminance components but does not contain the components of the "original image", a perception of a "stereo image" and an "image" representing the "original image" or the "subject" given an apparent depth can be produced by superposing the "image containing phase-modulated components a" and "image containing phase-modulated components b" on the "original image" or a "subject" corresponding to the "original image" as described above.

As mentioned above, the timing of displaying the "image A" (or "image containing phase-modulated components a") and the "image B" (or "image containing phase-modulated components b") and/or the polarization directions for the "image A" (or "image containing phase-modulated components a") and the "image B" (or "image containing phase-modulated components b") are dependent on the binocular image presentation scheme used. For example, if the time division approach is used as the binocular image presentation scheme, the "image A" (or "image containing phase-modulated components a") and the "image B" (or "image containing phase-modulated components b") are alternately displayed and an observer who wants to perceive a stereo image wears goggles with liquid crystal shutters as the "stereoscopic equipment". For example, if the polarization approach is used as the binocular image presentation scheme, the "image A" (or "image containing phase-modulated components a") being displayed or projected is made to enter a polarizing plate of a first polarization direction and the "image B" (or "image containing phase-modulated components b") is made to enter a polarizing plate of a second polarization direction. Here, the first polarization direction and the second polarization direction are orthogonal to each other. An observer who wants to perceive a stereo image wears goggles having a polarizing plate of the first polarization direction and a polarizing plate of the second polarization direction as the "stereoscopic equipment". In these manners, the "image A" (or "image containing phase-modulated components a") enters one eye of the observer and the "image B" (or "image containing phase-modulated components b") enters the other eye of the observer.

The image generation apparatuses according to the fifth embodiment and the modifications thereof generate the "image A" (or "image containing phase-modulated components a") and the "image B" (or "image containing phase-modulated components b") as described above based on the "first original image" and the "second original image". Here, the "first original image" is the aforementioned "original image", and there is a phase difference to be recognized as a binocular parallax between the "first original image" and the "second original image". An example of the "first original image" and the "second original image" is stereo image content used in the conventional binocular image presentation schemes. One who sees the "first original image" with one eye and the "second original image" with the other eye perceives a "stereo image". In contrast, one who sees both the "first original image" and the "second original image" with both eyes perceives a doubly blurred image.

The image generation apparatus according to the fifth embodiment includes: a first manipulator that obtains the "image A", which is an image generated by superposing the "first original image" and the "phase-modulated components a" which are generated by shifting the phases of spatial frequency components of the "first original image" by a "first phase"; and a second manipulator that obtains the "image B", which is an image generated by superposing the "first original image" and the "phase-modulated components b" which are generated by shifting the phases of spatial frequency components of the "first original image" by a "second phase" being a different phase than the "first phase". Although the "first phase" in the fifth embodiment is $0.5\pi$, this does not limit the present invention; the "first phase" may be in the neighborhood of $0.5\pi$ [rad] and the "second phase" may be the opposite phase of the "first phase", as illustrated in the modification 6 of the fifth embodiment. That is, the "phase-modulated components a" may be generated by shifting the phases of spatial frequency components of the "first original image" by the "first phase" being in the neighborhood of $0.5\pi$, and the "phase-modulated components b" may be generated by shifting the phases of spatial frequency components of the "first original image" by the "second phase" being the opposite phase of the "first phase" or in the neighborhood of the opposite phase of the "first phase". The "phase-modulated components a" and "phase-modulated components b" may contain only the luminance components. Also, as in the modifications 3 and 4 of the fifth embodiment, the image generation apparatus may obtain and output the "image containing phase-modulated components a" and "image containing phase-modulated components b".

In the fourth and fifth embodiments, the "first phases" corresponding to the respective positions (regions) of the "original image (the "first original image" in the fifth embodiment)" may or may not be the same as one another (the "first phases" corresponding to at least some regions of the "original image" (positions in the space domain) may be different from one another). For example, of such "first phases", a phase corresponding to one region may be $0.5\pi$ and a phase corresponding to another region may be $-0.5\pi$. That is, phases that vary for different positions, such as a phase corresponding to one position being $0.5\pi$ and a phase corresponding to another position being $-0.5\pi$, may be collectively called the "first phase". "Shifting the phase by the first phase" means shifting the phase by the "first phase" that corresponds to each region in the "original image". For example, the "phase-modulated components a" may include the "first components" generated by giving the "first weight (for example, a set of weight components corresponding to the respective regions of the "original image")" to the "original image", and the phases of the "phase-modulated components a" may be different relative to the phase of the "original image" by the "first phase"; the "phase-modulated components b" may include the "second components" generated by giving the "second weight (for example, a set of weight components corresponding to the respective regions of the "original image")" to the "original image", and the phases of the "phase-modulated components b" may be different relative to the phase of the "original image" by the "second phase". Such "phase-modulated components a" and "phase-modulated components b" may be components that are obtained by giving weights to images obtained by changing the phase of the "original image", components that are obtained by changing the phase of images obtained by giving weights to the "original image", or components that are obtained by giving weights while changing the phase of the "original image". Note that the "first weight" contains weight components different from each other that are given to regions different from each other (positions in the space domain) (weights corresponding to the respective regions of the "original image"), and the "second weight" contains weight components different from each other that are given to regions different from each other (weights corresponding to the respective regions of the "original image"). That is, the "first weight" is not uniform for all the regions of the "original image" and the "second weight" is not uniform for all the regions of the "original image" either. For example, the "first weight" may be 1 (meaning no weight is given) for some regions of the "original image" but is not 1 for all the regions of the "original image". Similarly, the "second weight" may be 1 for some regions of the "original image" but is not 1 for all the regions of the "original image". Also, preferably, the "first weight" is equal to the "second weight". That is, it is desirable that the "first weight" and the "second weight" are "predetermined weights" that are the same as one another, because this can produce a perception of an optimal "stereo image".

[Other Modifications]

The present invention is not limited to the embodiments described above. For example, although the "phase-modulated components a" or the "phase-modulated components b" are superposed on the entire region of the "original image" or the "subject" in the above embodiments, the "phase-modulated components a" or the "phase-modulated components b" may be superposed on only a partial region of the "original image" or the "subject". In addition, when the "original image" is an image of each frame of a moving image, the aforementioned processing may be repetitively performed on individual frames. This can allow an observer wearing the stereoscopic equipment to perceive a stereoscopic moving image and an observer not wearing the stereoscopic equipment to perceive a clear and planer moving image.

The above-described various kinds of processing may be executed, in addition to being executed in chronological order in accordance with the descriptions, in parallel or individually depending on the processing power of an apparatus that executes the processing or when needed. In addition, it goes without saying that changes may be made as appropriate without departing from the spirit of the present invention.

When the above-described configurations are implemented by a computer, the processing details of the functions supposed to be provided in each apparatus are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present apparatus are implemented as a result of a predetermined program being executed on the computer, but at least part of these processing functions may be implemented by hardware.

A "data structure" may be provided for image data that causes an "image A" and an "image B" to be presented by a picture presentation device so that one who sees the "image A" with one eye and sees the "image B" with the other eye perceives a stereo image and one who sees the "image A" and "image B" with the same eye(s) perceives the original image. Here, the "image A" and "image B" are based on the original image, and the "image A" is an image generated by superposing the "original image" and the "phase-modulated components a" which are generated by shifting the phases of spatial frequency components of the "original image" by a "first phase". The "image B" is an image generated by superposing the "original image" and the "phase-modulated components b" which are generated by shifting the phases of spatial frequency components of the "original image" by a "second phase" being a different phase than the "first phase". For example, the "data structure" may contain information representing the time segments in which the "image A" and "image B" are presented and/or the positions of their presentation, and in accordance with this information, the picture presentation device may perform processing to present the "image A" and "image B".

A "data structure" may be provided for image data that causes an "image containing phase-modulated components a" and an "image containing phase-modulated components b" to be presented by a picture presentation device so that one who sees an "original image" or a "subject" represented by the "original image" and the "image containing phase-modulated components a" with one eye and sees the "original image" or the "subject" and the "image containing phase-modulated components b" with the other eye perceives a stereo image, and one who sees the "original image", the "image containing phase-modulated components a", the "original image", and the "image containing phase-modulated components b" with the same eye(s) perceives the "original image". Here, the "image containing phase-modulated components a" and "image containing phase-modulated components b" are based on the "original image" and the "phase-modulated components a" are generated by shifting the phases of spatial frequency components of the "original image" by the "first phase". The "phase-modulated components b" are generated by shifting the phases of spatial frequency components of the "original image" by the "second phase" being a different phase than the "first phase". For example, the "data structure" may contain information representing the time segments in which the "image containing phase-modulated components a" and "image containing phase-modulated components b" are presented and/or the positions of their presentation, and in accordance with this information, the picture presentation device may perform processing to present the "image containing phase-modulated components a" and "image containing phase-modulated components b".

INDUSTRIAL APPLICABILITY

Using the present invention, two-dimensional image display that is effective (without image blur) also for an observer not wearing stereoscopic goggles can be provided in, for example, amusement park attractions, instructional materials for children, and three-dimensional graphics display in medical scenes.

DESCRIPTION OF REFERENCE NUMERALS 1 to 3, 8, 9 image generation apparatus

What is claimed is:

1. An image generation apparatus that generates images based on an original image, wherein
the images based on the original image are an image A and an image B,
the image A and the image B are for
one who sees the image A with one eye and sees the image B with another eye to perceive a stereo image, and
one who sees the image A and the image B with same eye(s) to perceive only the original image, and
the image generation apparatus includes processing circuitry configured to implement:
a first manipulator that obtains the image A, which is an image generated by superposing the original image and phase-modulated components a which are generated by shifting phases of spatial frequency components of the original image by a first phase being $0.5\pi$, and
a second manipulator that obtains the image B, which is an image generated by superposing the original image and phase-modulated components b which are generated by shifting the phases of spatial frequency components of the original image by a second phase being an opposite phase of the first phase, wherein
an average amplitude of components obtained by superposing the phase-modulated components a and the phase-modulated components b is smaller than an average amplitude of the phase-modulated components a and smaller than an average amplitude of the phase-modulated components b.

2. An image generation apparatus that generates images based on an original image, wherein
the images based on the original image include an image A and an image B,
the image A and the image B are for
one who sees the image A with one eye and sees the image B with another eye to perceive a stereo image, and
one who sees the image A and the image B with same eye(s) to perceive the original image, and
the image generation apparatus includes processing circuitry configured to implement:
a first manipulator that obtains the image A, which is an image generated by superposing the original image and phase-modulated components a which are generated by shifting phases of spatial frequency components of the original image by a first phase, and
a second manipulator that obtains the image B, which is an image generated by superposing the original image and phase-modulated components b which are generated by shifting the phases of spatial frequency components of the original image by a second phase being a different phase than the first phase, wherein
an average amplitude of components obtained by superposing the phase-modulated components a and the phase-modulated components b is smaller than an average amplitude of the phase-modulated components a and smaller than an average amplitude of the phase-modulated components b.

3. An image generation apparatus that generates images based on an original image, wherein
the images based on the original image are an image containing phase-modulated components a and an image containing phase-modulated components b,
the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and
one who sees the original image or the subject, the image containing phase-modulated components a, and the image containing phase-modulated components b with same eye(s) to perceive only the original image, and
the image generation apparatus includes processing circuitry configured to implement:
a first manipulator that obtains the phase-modulated components a by shifting phases of spatial frequency components of the original image by a first phase being $0.5\pi$, and
a second manipulator that obtains the phase-modulated components b by shifting the phases of spatial frequency components of the original image by a second phase being an opposite phase of the first phase, wherein
an average amplitude of components obtained by superposing the phase-modulated components a and the phase-modulated components b is smaller than an average amplitude of the phase-modulated components a and smaller than an average amplitude of the phase-modulated components b.

4. An image generation apparatus that generates images based on an original image, wherein
the images based on the original image include an image containing phase-modulated components a and an image containing phase-modulated components b,
the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and one who sees the original image or the subject, the image containing phase-modulated components a, and the image containing phase-modulated components b with same eye(s) to perceive the original image, and the image generation apparatus includes processing circuitry configured to implement:
- a first manipulator that obtains the phase-modulated components a by shifting phases of spatial frequency components of the original image by a first phase, and
- a second manipulator that obtains the phase-modulated components b by shifting the phases of spatial frequency components of the original image by a second phase being a different phase than the first phase, wherein an average amplitude of components obtained by superposing the phase-modulated components a and the phase-modulated components b is smaller than an average amplitude of the phase-modulated components a and smaller than an average amplitude of the phase-modulated components b.

5. The image generation apparatus according to any one of claims 1 to 4, wherein
the phase-modulated components a and the phase-modulated components b are based on at least a partial region of the original image, and
the stereo image is an image created by giving an apparent depth to at least a partial region of the original image or to at least a partial region of the subject represented by the original image.

6. The image generation apparatus according to claim 1 or 2, wherein
the first manipulator generates the image A by superposing the original image and the phase-modulated components a,
the second manipulator generates the image B by superposing the original image and the phase-modulated components b, and
the first manipulator and the second manipulator provide a phase difference that can be interpreted as a binocular parallax between the image A and the image B.

7. The image generation apparatus according to claim 2 or 4, wherein the phase-modulated components a have an opposite phase to the phase-modulated components b.

8. The image generation apparatus according to claim 2 or 4, wherein
the first manipulator obtains the phase-modulated components a based on elements that are obtained by changing the phase of the original image in a positive direction, and
the second manipulator obtains the phase-modulated components b based on elements that are obtained by changing the phase of the original image in a negative direction.

9. The image generation apparatus according to claim 2 or 4, wherein the second phase is the opposite phase of the first phase.

10. The image generation apparatus according to claim 9, wherein the first phase is $0.5\pi$.

11. An image generation method for generating images based on an original image, wherein
the images based on the original image include an image A and an image B,
the image A and the image B are for
one who sees the image A with one eye and sees the image B with another eye to perceive a stereo image, and
one who sees the image A and the image B with same eye(s) to perceive the original image, and the image generation method includes
a first step for obtaining the image A, which is an image generated by superposing the original image and phase-modulated components a which are generated by shifting phases of spatial frequency components of the original image by a first phase, and
a second step for obtaining the image B, which is an image generated by superposing the original image and phase-modulated components b which are generated by shifting the phases of spatial frequency components of the original image by a second phase being a different phase than the first phase, wherein
an average amplitude of components obtained by superposing the phase-modulated components a and the phase-modulated components b is smaller than an average amplitude of the phase-modulated components a and smaller than an average amplitude of the phase-modulated components b.

12. An image generation method for generating images based on an original image, wherein
the images based on the original image include an image containing phase-modulated components a and an image containing phase-modulated components b,
the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and
one who sees the original image or the subject, the image containing phase-modulated components a, and the image containing phase-modulated components b with same eye(s) to perceive the original image, and the image generation method includes
a first step for obtaining the phase-modulated components a by shifting phases of spatial frequency components of the original image by a first phase, and
a second step for obtaining the phase-modulated components b by shifting the phases of spatial frequency components of the original image by a second phase being a different phase than the first phase, wherein
an average amplitude of components obtained by superposing the phase-modulated components a and the phase-modulated components b is smaller than an average amplitude of the phase-modulated components a and smaller than an average amplitude of the phase-modulated components b.

13. An image generation apparatus that generates images based on an original image, wherein
the images based on the original image are an image A and an image B,
the image A and the image B are for
one who sees the image A with one eye and sees the image B with another eye to perceive a stereo image, and
one who sees the image A and the image B with same eye(s) to perceive only the original image, and the image generation apparatus includes processing circuitry configured to implement:
  a first manipulator that obtains the image A, which is an image generated by superposing the original image and phase-modulated components a which are generated by shifting phases of spatial frequency components of the original image by a first phase being $0.5\pi$, and
  a second manipulator that obtains the image B, which is an image generated by superposing the original image and phase-modulated components b which are generated by shifting the phases of spatial frequency components of the original image by a second phase being an opposite phase of the first phase, wherein
the phase-modulated components a include first components generated by giving a predetermined weight to the original image, and phases of the phase-modulated components a are different relative to the phase of the original image by the first phase,
the phase-modulated components b include second components generated by giving the predetermined weight to the original image, and phases of the phase-modulated components b are different relative to the phase of the original image by the second phase, and
the predetermined weight contains weight components different from each other that are given to regions different from each other.

14. An image generation apparatus that generates images based on an original image, wherein
  the images based on the original image include an image A and an image B,
  the image A and the image B are for
    one who sees the image A with one eye and sees the image B with another eye to perceive a stereo image, and
    one who sees the image A and the image B with same eye(s) to perceive the original image, and
  the image generation apparatus includes processing circuitry configured to implement:
    a first manipulator that obtains the image A, which is an image generated by superposing the original image and phase-modulated components a which are generated by shifting phases of spatial frequency components of the original image by a first phase, and
    a second manipulator that obtains the image B, which is an image generated by superposing the original image and phase-modulated components b which are generated by shifting the phases of spatial frequency components of the original image by a second phase being a different phase than the first phase, wherein
  the phase-modulated components a include first components generated by giving a first weight to the original image, and phases of the phase-modulated components a are different relative to the phase of the original image by the first phase,
  the phase-modulated components b include second components generated by giving a second weight to the original image, and phases of the phase-modulated components b are different relative to the phase of the original image by the second phase,
  the first weight contains weight components different from each other that are given to regions different from each other, and
  the second weight contains weight components different from each other that are given to regions different from each other.

15. An image generation apparatus that generates images based on an original image, wherein
  the images based on the original image are an image containing phase-modulated components a and an image containing phase-modulated components b,
  the image containing phase-modulated components a and the image containing phase-modulated components b are for
    one who sees the original image or a subject represented by the original image and the image containing phase-modulated components a with one eye and sees the original image or the subject and the image containing phase-modulated components b with another eye to perceive a stereo image, and
    one who sees the original image or the subject, the image containing phase-modulated components a, and the image containing phase-modulated components b with same eye(s) to perceive only the original image, and
  the image generation apparatus includes processing circuitry configured to implement:
    a first manipulator that obtains the phase-modulated components a by shifting phases of spatial frequency components of the original image by a first phase being $0.5\pi$, and
    a second manipulator that obtains the phase-modulated components b by shifting the phases of spatial frequency components of the original image by a second phase being an opposite phase of the first phase, wherein
  the phase-modulated components a include first components generated by giving a predetermined weight to the original image, and phases of the phase-modulated components a are different relative to the phase of the original image by the first phase,
  the phase-modulated components b include second components generated by giving the predetermined weight to the original image, and phases of the phase-modulated components b are different relative to the phase of the original image by the second phase, and
  the predetermined weight contains weight components different from each other that are given to regions different from each other.

16. An image generation apparatus that generates images based on an original image, wherein
  the images based on the original image include an image containing phase-modulated components a and an image containing phase-modulated components b,
  the image containing phase-modulated components a and the image containing phase-modulated components b are for
    one who sees the original image or a subject represented by the original image and the image containing phase-modulated components a with one eye and sees the original image or the subject and the image containing phase-modulated components b with another eye to perceive a stereo image, and
    one who sees the original image or the subject, the image containing phase-modulated components a, and the image containing phase-modulated components b with same eye(s) to perceive the original image, and
  the image generation apparatus includes processing circuitry configured to implement:

a first manipulator that obtains the phase-modulated components a by shifting phases of spatial frequency components of the original image by a first phase, and a second manipulator that obtains the phase-modulated components b by shifting the phases of spatial frequency components of the original image by a second phase being a different phase than the first phase, wherein the phase-modulated components a include first components generated by giving a first weight to the original image, and phases of the phase-modulated components a are different relative to the phase of the original image by the first phase, the phase-modulated components b include second components generated by giving a second weight to the original image, and phases of the phase-modulated components b are different relative to the phase of the original image by the second phase, the first weight contains weight components different from each other that are given to regions different from each other, and the second weight contains weight components different from each other that are given to regions different from each other.

17. An image generation apparatus that generates images based on an original image, wherein the images based on the original image are an image A and an image B, the image A and the image B are for one who sees the image A with one eye and sees the image B with another eye to perceive a stereo image, and one who sees the image A and the image B with same eye(s) to perceive only the original image, and the image generation apparatus includes processing circuitry configured to implement:

a first manipulator that obtains the image A, which is an image generated by superposing the original image and phase-modulated components a which are generated by shifting phases of spatial frequency components of the original image by a first phase being $0.5\pi$, and a second manipulator that obtains the image B, which is an image generated by superposing the original image and phase-modulated components b which are generated by shifting the phases of spatial frequency components of the original image by a second phase being an opposite phase of the first phase, wherein the phase-modulated components a include first components generated by providing respective spatial frequency components of the original image with at least weights corresponding to spatial frequencies of the respective spatial frequency components of the original image, and the phases of the phase-modulated components a are different relative to the phase of the original image by the first phase, the phase-modulated components b include second components generated by providing respective spatial frequency components of the original image with at least weights corresponding to spatial frequencies of the respective spatial frequency components of the original image, and the phases of the phase-modulated components b are different relative to the phase of the original image by the second phase, and the weight corresponding to a first spatial frequency is equal to or smaller than the weight corresponding to a second spatial frequency higher than the first spatial frequency.

18. An image generation apparatus that generates images based on an original image, wherein the images based on the original image include an image A and an image B, the image A and the image B are for one who sees the image A with one eye and sees the image B with another eye to perceive a stereo image, and one who sees the image A and the image B with same eye(s) to perceive the original image, and the image generation apparatus includes processing circuitry configured to implement:

a first manipulator that obtains the image A, which is an image generated by superposing the original image and phase-modulated components a which are generated by shifting phases of spatial frequency components of the original image by a first phase, and a second manipulator that obtains the image B, which is an image generated by superposing the original image and phase-modulated components b which are generated by shifting the phases of spatial frequency components of the original image by a second phase being a different phase than the first phase, wherein the phase-modulated components a include first components generated by providing respective spatial frequency components of the original image with at least weights corresponding to spatial frequencies of the respective spatial frequency components of the original image, and the phases of the phase-modulated components a are different relative to the phase of the original image by the first phase, the phase-modulated components b include second components generated by providing respective spatial frequency components of the original image with at least weights corresponding to spatial frequencies of the respective spatial frequency components of the original image, and the phases of the phase-modulated components b are different relative to the phase of the original image by the second phase, and the weight corresponding to a first spatial frequency is equal to or smaller than the weight corresponding to a second spatial frequency higher than the first spatial frequency.

19. An image generation apparatus that generates images based on an original image, wherein the images based on the original image are an image containing phase-modulated components a and an image containing phase-modulated components b, the image containing phase-modulated components a and the image containing phase-modulated components b are for one who sees the original image or a subject represented by the original image and the image containing phase-modulated components a with one eye and sees the original image or the subject and the image containing phase-modulated components b with another eye to perceive a stereo image, and one who sees the original image or the subject, the image containing phase-modulated components a, and the image containing phase-modulated components b with same eye(s) to perceive only the original image, and the image generation apparatus includes processing circuitry configured to implement:
- a first manipulator that obtains the phase-modulated components a by shifting phases of spatial frequency components of the original image by a first phase being $0.5\pi$, and
- a second manipulator that obtains the phase-modulated components b by shifting the phases of spatial frequency components of the original image by a second phase being an opposite phase of the first phase, wherein the phase-modulated components a include first components generated by providing respective spatial frequency components of the original image with at least weights corresponding to spatial frequencies of the respective spatial frequency components of the original image, and the phases of the phase-modulated components a are different relative to the phase of the original image by the first phase, the phase-modulated components b include second components generated by providing respective spatial frequency components of the original image with at least weights corresponding to spatial frequencies of the respective spatial frequency components of the original image, and the phases of the phase-modulated components b are different relative to the phase of the original image by the second phase, and the weight corresponding to a first spatial frequency is equal to or smaller than the weight corresponding to a second spatial frequency higher than the first spatial frequency.

20. An image generation apparatus that generates images based on an original image, wherein the images based on the original image include an image containing phase-modulated components a and an image containing phase-modulated components b, the image containing phase-modulated components a and the image containing phase-modulated components b are for
- one who sees the original image or a subject represented by the original image and the image containing phase-modulated components a with one eye and sees the original image or the subject and the image containing phase-modulated components b with another eye to perceive a stereo image, and
- one who sees the original image or the subject, the image containing phase-modulated components a, and the image containing phase-modulated components b with same eye(s) to perceive the original image, and the image generation apparatus includes processing circuitry configured to implement:
- a first manipulator that obtains the phase-modulated components a by shifting phases of spatial frequency components of the original image by a first phase, and
- a second manipulator that obtains the phase-modulated components b by shifting the phases of spatial frequency components of the original image by a second phase being a different phase than the first phase, wherein the phase-modulated components a include first components generated by providing respective spatial frequency components of the original image with at least weights corresponding to spatial frequencies of the respective spatial frequency components of the original image, and the phases of the phase-modulated components a are different relative to the phase of the original image by the first phase, the phase-modulated components b include second components generated by providing respective spatial frequency components of the original image with at least weights corresponding to spatial frequencies of the respective spatial frequency components of the original image, and the phases of the phase-modulated components b are different relative to the phase of the original image by the second phase, and the weight corresponding to a first spatial frequency is equal to or smaller than the weight corresponding to a second spatial frequency higher than the first spatial frequency.

21. The image generation apparatus according to any one of claims 17 to 20, wherein the weight is determined on a per-pixel basis for each set of $\omega_\lambda$ and $\theta_\mu$ based on a parallax map Dmap, on a plurality of predetermined spatial frequencies $\omega_\lambda$, and on a plurality of predetermined orientations $\theta_\mu$, the parallax map Dmap represents a predetermined parallax corresponding to each pixel of the original image, and a parallax between an image generated by superposing the original image and the phase-modulated components a and an image generated by superposing the original image and the phase-modulated components b is the predetermined parallax.

22. The image generation apparatus according to claim 21, wherein the weight is determined for each pixel at each coordinate (x, y) and for each set of $\omega_\lambda$ and $\theta_\mu$ according to $$A_{\lambda,\mu}(x, y) = \tan\frac{G_{D_\lambda}(x, y)\omega_\lambda|\cos\theta_\mu|}{2},$$

and $G_{D_\lambda}(x, y)$ represents a value of each coordinate (x, y) in Gaussian pyramids of the parallax map Dmap that correspond to a spatial frequency band $\lambda$ corresponding to $\omega_\lambda$ and spatial frequency bands lower than the spatial frequency band $\lambda$.

23. The image generation apparatus according to claim 21, wherein the weight is determined for each pixel at each coordinate (x, y) and for each set of $\omega_\lambda$ and $\theta_\mu$ according to $$A_{\lambda,\mu}(x, y) = \tan\frac{\hat{G}_{D_\lambda}(x, y)\omega_\lambda|\cos\theta_\mu|}{2},$$

$$\hat{G}_{D_\lambda}(x, y) = \begin{cases} \frac{\pi}{2\omega_\lambda|\cos\theta_\mu|} & \text{if } G_{D_\lambda}(x, y) > \frac{\pi}{2\omega_\lambda|\cos\theta_\mu|} \\ -\frac{\pi}{2\omega_\lambda|\cos\theta_\mu|} & \text{if } G_{D_\lambda}(x, y) < -\frac{\pi}{2\omega_\lambda|\cos\theta_\mu|} \\ G_{D_\lambda}(x, y) & \text{otherwise} \end{cases},$$

and $G_{D_\lambda}(x, y)$ represents a value of each coordinate (x, y) in Gaussian pyramids of the parallax map Dmap that correspond to a spatial frequency band $\lambda$ corresponding to $\omega_\lambda$ and spatial frequency bands lower than the spatial frequency band $\lambda$.

24. An image generation apparatus that generates images based on an original image, wherein
the images based on the original image are an image A and an image B,
the image A and the image B are for
one who sees the image A with one eye and sees the image B with another eye to perceive a stereo image, and
one who sees the image A and the image B with same eye(s) to perceive only the original image, and
the image generation apparatus includes processing circuitry configured to implement:
a first manipulator that obtains the image A, which is an image generated by superposing the original image and phase-modulated components a which are generated by shifting phases of spatial frequency components of the original image by a first phase being $0.5\pi$, and
a second manipulator that obtains the image B, which is an image generated by superposing the original image and phase-modulated components b which are generated by shifting the phases of spatial frequency components of the original image by a second phase being an opposite phase of the first phase, wherein
the phase-modulated components a include first components generated by providing respective spatial frequency components of the original image with at least weights corresponding to orientations of the respective spatial frequency components of the original image, and the phases of the phase-modulated components a are different relative to the phase of the original image by the first phase,
the phase-modulated components b include second components generated by providing respective spatial frequency components of the original image with at least weights corresponding to orientations of the respective spatial frequency components of the original image, and the phases of the phase-modulated components b are different relative to the phase of the original image by the second phase, and
a weight corresponding to a first orientation is equal to or smaller than a weight corresponding to a second orientation which is closer to a predetermined orientation than the first orientation is.

25. An image generation apparatus that generates images based on an original image, wherein
the images based on the original image include an image A and an image B,
the image A and the image B are for
one who sees the image A with one eye and sees the image B with another eye to perceive a stereo image, and
one who sees the image A and the image B with same eye(s) to perceive the original image, and
the image generation apparatus includes processing circuitry configured to implement:
a first manipulator that obtains the image A, which is an image generated by superposing the original image and phase-modulated components a which are generated by shifting phases of spatial frequency components of the original image by a first phase, and
a second manipulator that obtains the image B, which is an image generated by superposing the original image and phase-modulated components b which are generated by shifting the phases of spatial frequency components of the original image by a second phase being a different phase than the first phase, wherein
the phase-modulated components a include first components generated by providing respective spatial frequency components of the original image with at least weights corresponding to orientations of the respective spatial frequency components of the original image, and the phases of the phase-modulated components a are different relative to the phase of the original image by the first phase,
the phase-modulated components b include second components generated by providing respective spatial frequency components of the original image with at least weights corresponding to orientations of the respective spatial frequency components of the original image, and the phases of the phase-modulated components b are different relative to the phase of the original image by the second phase, and
a weight corresponding to a first orientation is equal to or smaller than a weight corresponding to a second orientation which is closer to a predetermined orientation than the first orientation is.

26. An image generation apparatus that generates images based on an original image, wherein
the images based on the original image are an image containing phase-modulated components a and an image containing phase-modulated components b,
the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and
one who sees the original image or the subject, the image containing phase-modulated components a, and the image containing phase-modulated components b with same eye(s) to perceive only the original image, and
the image generation apparatus includes processing circuitry configured to implement:
a first manipulator that obtains the phase-modulated components a by shifting phases of spatial frequency components of the original image by a first phase being $0.5\pi$, and
a second manipulator that obtains the phase-modulated components b by shifting the phases of spatial frequency components of the original image by a second phase being an opposite phase of the first phase, wherein
the phase-modulated components a include first components generated by providing respective spatial frequency components of the original image with at least weights corresponding to orientations of the respective spatial frequency components of the original image, and the phases of the phase-modulated components a are different relative to the phase of the original image by the first phase,
the phase-modulated components b include second components generated by providing respective spatial frequency components of the original image with at least weights corresponding to orientations of the respective spatial frequency components of the original image, and the phases of the phase-modulated components b are different relative to the phase of the original image by the second phase, and a weight corresponding to a first orientation is equal to or smaller than a weight corresponding to a second orientation which is closer to a predetermined orientation than the first orientation is.

27. An image generation apparatus that generates images based on an original image, wherein
the images based on the original image include an image containing phase-modulated components a and an image containing phase-modulated components b,
the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and
one who sees the original image or the subject, the image containing phase-modulated components a, and the image containing phase-modulated components b with same eye(s) to perceive the original image, and
the image generation apparatus includes processing circuitry configured to implement:
a first manipulator that obtains the phase-modulated components a by shifting phases of spatial frequency components of the original image by a first phase, and
a second manipulator that obtains the phase-modulated components b by shifting the phases of spatial frequency components of the original image by a second phase being a different phase than the first phase, wherein
the phase-modulated components a include first components generated by providing respective spatial frequency components of the original image with at least weights corresponding to orientations of the respective spatial frequency components of the original image, and the phases of the phase-modulated components a are different relative to the phase of the original image by the first phase,
the phase-modulated components b include second components generated by providing respective spatial frequency components of the original image with at least weights corresponding to orientations of the respective spatial frequency components of the original image, and the phases of the phase-modulated components b are different relative to the phase of the original image by the second phase, and
a weight corresponding to a first orientation is equal to or smaller than a weight corresponding to a second orientation which is closer to a predetermined orientation than the first orientation is.

28. The image generation apparatus according to any one of claims 24 to 27, wherein
the weight is determined on a per-pixel basis for each set of $\omega_\lambda$ and $\theta_\mu$ based on a parallax map Dmap, on a plurality of predetermined spatial frequencies $\omega_\lambda$, and on a plurality of predetermined orientations $\theta_\mu$,
the parallax map Dmap represents a predetermined parallax corresponding to each pixel of the original image, and
a parallax between an image generated by superposing the original image and the phase-modulated components a and an image generated by superposing the original image and the phase-modulated components b is the predetermined parallax.

29. The image generation apparatus according to claim 28, wherein
the weight is determined for each pixel at each coordinate (x, y) and for each set of $\omega_\lambda$ and $\theta_\mu$ according to $$A_{\lambda,\mu}(x, y) = \tan\frac{G_{D_\lambda}(x, y)\omega_\lambda|\cos\theta_\mu|}{2},$$

and
$G_{D\lambda}(x, y)$ represents a value of each coordinate (x, y) in Gaussian pyramids of the parallax map Dmap that correspond to a spatial frequency band $\lambda$ corresponding to $\omega_\lambda$ and spatial frequency bands lower than the spatial frequency band $\lambda$.

30. The image generation apparatus according to claim 28, wherein
the weight is determined for each pixel at each coordinate (x, y) and for each set of $\omega_\lambda$ and $\theta_\mu$ according to $$A_{\lambda,\mu}(x, y) = \tan\frac{\hat{G}_{D_\lambda}(x, y)\omega_\lambda|\cos\theta_\mu|}{2},$$

$$\hat{G}_{D_\lambda}(x, y) = \begin{cases} \frac{\pi}{2\omega_\lambda|\cos\theta_\mu|} & \text{if } G_{D_\lambda}(x, y) > \frac{\pi}{2\omega_\lambda|\cos\theta_\mu|} \\ -\frac{\pi}{2\omega_\lambda|\cos\theta_\mu|} & \text{if } G_{D_\lambda}(x, y) < -\frac{\pi}{2\omega_\lambda|\cos\theta_\mu|} \\ G_{D_\lambda}(x, y) & \text{otherwise} \end{cases},$$

$G_{D\lambda}(X, y)$ represents a value of each coordinate (x, y) in Gaussian pyramids of the parallax map Dmap that correspond to a spatial frequency band $\lambda$ corresponding to $\omega_\lambda$ and spatial frequency bands lower than the spatial frequency band $\lambda$.

31. An image generation apparatus that generates images based on an original image, wherein
the images based on the original image are an image A and an image B,
the image A and the image B are for
one who sees the image A with one eye and sees the image B with another eye to perceive a stereo image, and
one who sees the image A and the image B with same eye(s) to perceive only the original image, and
the image generation apparatus includes processing circuitry configured to implement:
a first manipulator that obtains the image A, which is an image generated by superposing the original image and phase-modulated components a which are generated by shifting phases of spatial frequency components of the original image by a first phase being 0.5π, and
a second manipulator that obtains the image B, which is an image generated by superposing the original image and phase-modulated components b which are generated by shifting the phases of spatial frequency components of the original image by a second phase being an opposite phase of the first phase, wherein
the phase-modulated components a include first components generated by providing respective regions of the original image with at least weights corresponding to the respective regions of the original image, and the phases of the phase-modulated components a are different relative to the phase of the original image by the first phase, and the phase-modulated components b include second components generated by providing respective regions of the original image with at least weights corresponding to the respective regions of the original image, and the phases of the phase-modulated components b are different relative to the phase of the original image by the second phase.

32. An image generation apparatus that generates images based on an original image, wherein
the images based on the original image include an image A and an image B,
the image A and the image B are for
one who sees the image A with one eye and sees the image B with another eye to perceive a stereo image, and
one who sees the image A and the image B with same eye(s) to perceive the original image, and
the image generation apparatus includes processing circuitry configured to implement:
a first manipulator that obtains the image A, which is an image generated by superposing the original image and phase-modulated components a which are generated by shifting phases of spatial frequency components of the original image by a first phase, and
a second manipulator that obtains the image B, which is an image generated by superposing the original image and phase-modulated components b which are generated by shifting the phases of spatial frequency components of the original image by a second phase being a different phase than the first phase, wherein
the phase-modulated components a include first components generated by providing respective regions of the original image with at least weights corresponding to the respective regions of the original image, and the phases of the phase-modulated components a are different relative to the phase of the original image by the first phase, and
the phase-modulated components b include second components generated by providing respective regions of the original image with at least weights corresponding to the respective regions of the original image, and the phases of the phase-modulated components b are different relative to the phase of the original image by the second phase.

33. An image generation apparatus that generates images based on an original image, wherein
the images based on the original image are an image containing phase-modulated components a and an image containing phase-modulated components b,
the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and
one who sees the original image or the subject, the image containing phase-modulated components a, and the image containing phase-modulated components b with same eye(s) to perceive only the original image, and the image generation apparatus includes processing circuitry configured to implement:
a first manipulator that obtains the phase-modulated components a by shifting phases of spatial frequency components of the original image by a first phase being $0.5\pi$, and
a second manipulator that obtains the phase-modulated components b by shifting the phases of spatial frequency components of the original image by a second phase being an opposite phase of the first phase, wherein
the phase-modulated components a include first components generated by providing respective regions of the original image with at least weights corresponding to the respective regions of the original image, and the phases of the phase-modulated components a are different relative to the phase of the original image by the first phase, and
the phase-modulated components b include second components generated by providing respective regions of the original image with at least weights corresponding to the respective regions of the original image, and the phases of the phase-modulated components b are different relative to the phase of the original image by the second phase.

34. An image generation apparatus that generates images based on an original image, wherein
the images based on the original image include an image containing phase-modulated components a and an image containing phase-modulated components b,
the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and
one who sees the original image or the subject, the image containing phase-modulated components a, and the image containing phase-modulated components b with same eye(s) to perceive the original image, and
the image generation apparatus includes processing circuitry configured to implement:
a first manipulator that obtains the phase-modulated components a by shifting phases of spatial frequency components of the original image by a first phase, and
a second manipulator that obtains the phase-modulated components b by shifting the phases of spatial frequency components of the original image by a second phase being a different phase than the first phase, wherein
the phase-modulated components a include first components generated by providing respective regions of the original image with at least weights corresponding to the respective regions of the original image, and the phases of the phase-modulated components a are different relative to the phase of the original image by the first phase, and
the phase-modulated components b include second components generated by providing respective regions of the original image with at least weights corresponding to the respective regions of the original image, and the phases of the phase-modulated components b are different relative to the phase of the original image by the second phase.

35. The image generation apparatus according to any one of claims 31 to 34, wherein a spatial frequency of the weight corresponding to each of first regions of the original image is lower than the spatial frequency of the first region, and the spatial frequency of the the phase-modulated components a include first components generated by providing respective regions of the original image with at least weights corresponding to the respective regions of the original image, and the phases of the phase-modulated components a are different relative to the phase of the original image by the first phase, and the phase-modulated components b include second components generated by providing respective regions of the original image with at least weights corresponding to the respective regions of the original image, and the phases of the phase-modulated components b are different relative to the phase of the original image by the second phase.

36. A non-transitory computer-readable recording medium having stored thereon a program for causing a computer to function as the image generation apparatus according to any one of claims 1 to 4, 13 to 20, 24 to 27, and 31 to 34.

37. An image generation method for generating images based on an original image, wherein the images based on the original image include an image A and an image B, the image A and the image B are for
one who sees the image A with one eye and sees the image B with another eye to perceive a stereo image, and
one who sees the image A and the image B with same eye(s) to perceive the original image, and the image generation method includes
a first step for obtaining the image A, which is an image generated by superposing the original image and phase-modulated components a which are generated by shifting phases of spatial frequency components of the original image by a first phase, and
a second step for obtaining the image B, which is an image generated by superposing the original image and phase-modulated components b which are generated by shifting the phases of spatial frequency components of the original image by a second phase being a different phase than the first phase, wherein a second step for obtaining the phase-modulated components b by shifting the phases of spatial frequency components of the original image by a second phase being a different phase than the first phase, wherein the phase-modulated components a include first components generated by providing respective regions of the original image with at least weights corresponding to the respective regions of the original image, and the phases of the phase-modulated components a are different relative to the phase of the original image by the first phase, and the phase-modulated components b include second components generated by providing respective regions of the original image with at least weights corresponding to the respective regions of the original image, and the phases of the phase-modulated components b are different relative to the phase of the original image by the second phase.

38. An image generation method for generating images based on an original image, wherein the images based on the original image include an image containing phase-modulated components a and an image containing phase-modulated components b, the image containing phase-modulated components a and the image containing phase-modulated components b are for
one who sees the original image or a subject represented by the original image and the image containing phase-modulated components a with one eye and sees the original image or the subject and the image containing phase-modulated components b with another eye to perceive a stereo image, and
one who sees the original image or the subject, the image containing phase-modulated components a, and the image containing phase-modulated components b with same eye(s) to perceive the original image, and the image generation method includes
a first step for obtaining the phase-modulated components a by shifting phases of spatial frequency components of the original image by a first phase, and weight corresponding to each of second regions of the original image is lower than the spatial frequency of the second region.

* * * * *